(12) United States Patent
Weston et al.

(10) Patent No.: US 7,896,742 B2
(45) Date of Patent: Mar. 1, 2011

(54) APPARATUS AND METHODS FOR PROVIDING INTERACTIVE ENTERTAINMENT

(75) Inventors: Denise Chapman Weston, Wakefield, RI (US); Jonathan A. Barney, Newport Beach, CA (US)

(73) Assignee: Creative Kingdoms, LLC, Springfield, IL (US)

( * ) Notice: Subject to any disclaimer, the term of this patent is extended or adjusted under 35 U.S.C. 154(b) by 824 days.

(21) Appl. No.: 11/777,874

(22) Filed: Jul. 13, 2007

(65) Prior Publication Data

US 2008/0014835 A1    Jan. 17, 2008

Related U.S. Application Data

(63) Continuation of application No. 11/274,760, filed on Nov. 15, 2005, which is a continuation-in-part of application No. 10/889,974, filed on Jul. 13, 2004, which is a continuation of application No. 09/792,282, filed on Feb. 22, 2001, now Pat. No. 6,761,637, and a continuation-in-part of application No. 10/954,025, filed on Sep. 29, 2004, now Pat. No. 7,445,550, which is a continuation-in-part of application No. 10/397,054, filed on Mar. 25, 2003, now Pat. No. 7,500,917, which is a continuation-in-part of application No. 09/792,282, filed on Feb. 22, 2001, now Pat. No. 6,761,637.

(60) Provisional application No. 60/184,128, filed on Feb. 22, 2000.

(51) Int. Cl.
   *A63F 9/24* (2006.01)
(52) U.S. Cl. .................................................. 463/37

(58) Field of Classification Search .................. 463/42, 463/37
See application file for complete search history.

(56) References Cited

U.S. PATENT DOCUMENTS 3,395,920 A    8/1968    Moe (Continued)

FOREIGN PATENT DOCUMENTS

EP    0 546 844 A    6/1993

(Continued)

OTHER PUBLICATIONS

Benbasat, "An Inertial Measurement Unit for User Interfaces," Massachusetts Institute of Technology Dissertation, (Sep. 2000), 135 pages.

(Continued)

*Primary Examiner*—Peter DungBa Vo
*Assistant Examiner*—Omkar Deodhar
(74) *Attorney, Agent, or Firm*—Knobbe, Martens, Olson & Bear LLP

(57) ABSTRACT

Embodiments of the invention provide a unique interactive game that includes multiple dynamic layers in which a participant may complete a variety of challenges and/or tasks. For example, the participant may obtain a toy "wand" from a retail phase that is usable in an interactive entertainment phase. The interactive entertainment phase may include multiple interrelated layers such that progress in one or more layers may affect the participant's experience in one or more other layers. The participant may also receive training on how to use the wand and/or complete one or more special effects, adventures and/or quests. During or following the interactive entertainment phase, the participant may use accumulated points and/or powers to redeem prizes and/or compete against other participants, such as in a duel.

53 Claims, 44 Drawing Sheets

U.S. PATENT DOCUMENTS

| | | |
|---|---|---|
| 3,707,055 A | 12/1972 | Pearce |
| 3,997,156 A | 12/1976 | Barlow et al. |
| 4,063,111 A | 12/1977 | Dobler |
| 4,175,665 A | 11/1979 | Dogliotti |
| 4,282,681 A | 8/1981 | McCaslin |
| 4,296,929 A | 10/1981 | Meyer et al. |
| 4,318,245 A | 3/1982 | Stowell et al. |
| 4,412,205 A | 10/1983 | Von Kemenczky |
| 4,450,325 A | 5/1984 | Luque |
| 4,540,176 A | 9/1985 | Baer |
| 4,578,674 A | 3/1986 | Baker et al. |
| 4,595,369 A | 6/1986 | Downs |
| 4,678,450 A | 7/1987 | Scolari et al. |
| 4,695,058 A | 9/1987 | Carter, III et al. |
| 4,695,953 A | 9/1987 | Blair et al. |
| 4,787,051 A | 11/1988 | Olson |
| 4,817,950 A * | 4/1989 | Goo ............................ 463/36 |
| 4,858,930 A | 8/1989 | Sato |
| 4,891,032 A | 1/1990 | Davis |
| 4,904,222 A | 2/1990 | Gastgeb et al. |
| 4,910,677 A | 3/1990 | Remedio et al. |
| 4,967,321 A | 10/1990 | Cimock |
| 4,969,647 A | 11/1990 | Mical et al. |
| 5,036,442 A | 7/1991 | Brown |
| 5,045,843 A | 9/1991 | Hansen |
| 5,048,831 A | 9/1991 | Sides |
| 5,068,645 A | 11/1991 | Drumm |
| 5,076,584 A | 12/1991 | Openiano |
| 5,114,155 A | 5/1992 | Tillery et al. |
| 5,114,344 A | 5/1992 | Fumagalli et al. |
| 5,138,154 A | 8/1992 | Hotelling |
| 5,177,311 A | 1/1993 | Suzuki et al. |
| 5,194,006 A | 3/1993 | Zaenglein, Jr. |
| 5,194,048 A | 3/1993 | Briggs |
| 5,236,200 A | 8/1993 | McGregor et al. |
| 5,292,124 A | 3/1994 | Carpenter |
| 5,292,254 A | 3/1994 | Miller et al. |
| 5,319,548 A | 6/1994 | Germain |
| 5,320,358 A | 6/1994 | Jones |
| 5,329,276 A | 7/1994 | Hirabayashi |
| 5,339,095 A | 8/1994 | Redford |
| 5,354,057 A | 10/1994 | Pruitt et al. |
| 5,356,343 A | 10/1994 | Lovetere |
| 5,363,120 A | 11/1994 | Drumm |
| 5,365,214 A | 11/1994 | Angott et al. |
| 5,366,229 A | 11/1994 | Suzuki |
| 5,373,857 A | 12/1994 | Travers et al. |
| 5,378,197 A | 1/1995 | Briggs |
| 5,382,026 A | 1/1995 | Harvard et al. |
| 5,393,074 A | 2/1995 | Bear et al. |
| 5,396,265 A | 3/1995 | Ulrich et al. |
| 5,411,269 A | 5/1995 | Thomas |
| 5,421,575 A | 6/1995 | Triner |
| 5,453,758 A | 9/1995 | Sato |
| 5,459,489 A | 10/1995 | Redford |
| 5,469,194 A | 11/1995 | Clark et al. |
| 5,482,510 A | 1/1996 | Ishii et al. |
| 5,485,171 A | 1/1996 | Copper et al. |
| 5,488,362 A | 1/1996 | Ullman et al. |
| 5,498,002 A | 3/1996 | Gechter |
| 5,506,605 A | 4/1996 | Paley |
| 5,516,105 A | 5/1996 | Eisenbrey et al. |
| 5,526,022 A | 6/1996 | Donahue et al. |
| 5,550,721 A | 8/1996 | Rapisarda |
| 5,554,033 A | 9/1996 | Bizzi et al. |
| 5,574,479 A | 11/1996 | Odell |
| 5,580,319 A | 12/1996 | Hamilton |
| 5,587,558 A | 12/1996 | Matsushima |
| 5,587,740 A | 12/1996 | Brennan |
| 5,598,187 A | 1/1997 | Ide et al. |
| 5,602,569 A | 2/1997 | Kato |
| 5,605,505 A | 2/1997 | Han |
| 5,611,731 A | 3/1997 | Bouton et al. |
| 5,613,913 A | 3/1997 | Ikematsu et al. |
| 5,624,117 A | 4/1997 | Ohkubo et al. |
| 5,627,565 A | 5/1997 | Morishita et al. |
| 5,640,152 A | 6/1997 | Copper |
| 5,647,796 A | 7/1997 | Cohen |
| 5,651,049 A | 7/1997 | Easterling et al. |
| 5,655,053 A | 8/1997 | Renie |
| 5,666,138 A | 9/1997 | Culver |
| 5,674,128 A | 10/1997 | Holch et al. |
| 5,679,004 A | 10/1997 | McGowan et al. |
| 5,682,181 A | 10/1997 | Nguyen et al. |
| 5,701,131 A | 12/1997 | Kuga |
| 5,702,323 A | 12/1997 | Poulton |
| 5,734,371 A | 3/1998 | Kaplan |
| 5,739,811 A | 4/1998 | Rosenberg et al. |
| 5,741,182 A | 4/1998 | Lipps et al. |
| 5,746,602 A | 5/1998 | Kikinis |
| 5,751,273 A | 5/1998 | Cohen |
| 5,752,880 A | 5/1998 | Gabai et al. |
| 5,752,882 A | 5/1998 | Acres et al. |
| 5,757,305 A | 5/1998 | Xydis |
| 5,757,360 A | 5/1998 | Nitta et al. |
| 5,770,533 A | 6/1998 | Franchi |
| 5,771,038 A | 6/1998 | Wang |
| 5,772,508 A | 6/1998 | Sugita et al. |
| 5,775,998 A | 7/1998 | Ikematsu et al. |
| 5,785,592 A | 7/1998 | Jacobsen |
| 5,786,626 A | 7/1998 | Brady et al. |
| 5,810,666 A | 9/1998 | Mero et al. |
| 5,811,896 A | 9/1998 | Grad |
| 5,819,206 A | 10/1998 | Horton et al. |
| 5,820,462 A | 10/1998 | Yokoi et al. |
| 5,825,350 A | 10/1998 | Case, Jr. et al. |
| 5,830,065 A | 11/1998 | Sitrick |
| 5,831,553 A | 11/1998 | Lenssen et al. |
| 5,833,549 A | 11/1998 | Zur et al. |
| 5,835,077 A | 11/1998 | Dao et al. |
| 5,835,156 A | 11/1998 | Blonstein et al. |
| 5,835,576 A | 11/1998 | Katz |
| 5,836,817 A | 11/1998 | Acres et al. |
| 5,841,409 A | 11/1998 | Ishibashi et al. |
| 5,851,149 A | 12/1998 | Xidos et al. |
| 5,853,332 A | 12/1998 | Briggs |
| 5,854,622 A | 12/1998 | Brannon |
| 5,855,483 A | 1/1999 | Collins et al. |
| 5,865,680 A | 2/1999 | Briggs |
| 5,867,146 A | 2/1999 | Kim et al. |
| 5,874,941 A | 2/1999 | Yamada |
| 5,875,257 A | 2/1999 | Marrin et al. |
| 5,898,421 A | 4/1999 | Quinn |
| 5,901,246 A | 5/1999 | Hoffberg et al. |
| 5,912,612 A | 6/1999 | DeVolpi |
| 5,913,727 A | 6/1999 | Ahdoot |
| 5,923,317 A | 7/1999 | Sayler et al. |
| 5,924,695 A | 7/1999 | Heykoop |
| 5,929,841 A | 7/1999 | Fujii |
| 5,942,969 A | 8/1999 | Wicks |
| 5,944,533 A | 8/1999 | Wood |
| 5,946,444 A | 8/1999 | Evans et al. |
| 5,947,868 A | 9/1999 | Dugan |
| 5,963,136 A | 10/1999 | O'Brien |
| 5,964,660 A | 10/1999 | James et al. |
| 5,971,270 A | 10/1999 | Barna |
| 5,982,352 A | 11/1999 | Pryor |
| 5,984,788 A | 11/1999 | Lebensfeld et al. |
| 5,989,120 A | 11/1999 | Truchsess |
| 5,991,085 A | 11/1999 | Rallison et al. |
| 5,996,033 A | 11/1999 | Chiu-Hao |
| 6,001,015 A | 12/1999 | Nishiumi et al. |
| 6,009,458 A | 12/1999 | Hawkins et al. |
| 6,011,526 A | 1/2000 | Toyoshima et al. |

| | | | | | | |
|---|---|---|---|---|---|---|
| 6,012,984 | A | 1/2000 | Roseman | 6,426,741 | B1 | 7/2002 | Goldsmith et al. |
| 6,013,007 | A | 1/2000 | Root et al. | 6,463,257 | B1 | 10/2002 | Wood |
| 6,025,830 | A | 2/2000 | Cohen | 6,463,859 | B1 | 10/2002 | Ikezawa |
| 6,059,576 | A | 5/2000 | Brann | 6,482,067 | B1 | 11/2002 | Pickens |
| 6,066,075 | A | 5/2000 | Poulton | 6,490,409 | B1 | 12/2002 | Walker |
| 6,069,594 | A | 5/2000 | Barnes et al. | 6,494,457 | B2 | 12/2002 | Conte et al. |
| 6,072,467 | A | 6/2000 | Walker | 6,509,217 | B1 | 1/2003 | Reddy |
| 6,075,443 | A | 6/2000 | Schepps et al. | 6,525,660 | B1 | 2/2003 | Surintrspanont |
| 6,076,734 | A | 6/2000 | Dougherty et al. | 6,526,158 | B1 | 2/2003 | Goldberg |
| 6,077,106 | A | 6/2000 | Mish | 6,530,841 | B2 | 3/2003 | Bull et al. |
| 6,084,577 | A | 7/2000 | Sato et al. | 6,545,661 | B1 * | 4/2003 | Goschy et al. ............... 345/158 |
| 6,110,039 | A | 8/2000 | Oh | 6,551,188 | B2 | 4/2003 | Toyama et al. |
| 6,115,028 | A | 9/2000 | Balakrishnan | 6,554,707 | B1 | 4/2003 | Sinclair et al. |
| 6,129,549 | A | 10/2000 | Thompson | 6,565,438 | B2 | 5/2003 | Ogino |
| 6,144,367 | A | 11/2000 | Berstis | 6,567,536 | B2 | 5/2003 | McNitt et al. |
| 6,148,100 | A | 11/2000 | Anderson et al. | 6,582,380 | B2 | 6/2003 | Kazlausky et al. |
| 6,150,947 | A | 11/2000 | Shima | 6,589,120 | B1 | 7/2003 | Takahashi |
| 6,154,723 | A | 11/2000 | Cox et al. | 6,590,536 | B1 | 7/2003 | Walton |
| 6,155,926 | A | 12/2000 | Miyamoto et al. | 6,592,461 | B1 | 7/2003 | Raviv et al. |
| 6,160,540 | A | 12/2000 | Fishkin et al. | 6,626,728 | B2 | 9/2003 | Holt |
| 6,160,986 | A | 12/2000 | Gabai et al. | 6,629,019 | B2 | 9/2003 | Legge et al. |
| 6,162,123 | A | 12/2000 | Woolston | 6,632,142 | B2 | 10/2003 | Keith |
| 6,181,329 | B1 | 1/2001 | Stork et al. | 6,634,949 | B1 | 10/2003 | Briggs et al. |
| 6,196,893 | B1 | 3/2001 | Casola et al. | 6,641,482 | B2 | 11/2003 | Masuyama et al. |
| 6,198,470 | B1 | 3/2001 | Agam et al. | 6,672,962 | B1 | 1/2004 | Ozaki et al. |
| 6,198,471 | B1 | 3/2001 | Cook | 6,676,524 | B1 | 1/2004 | Botzas |
| 6,200,216 | B1 | 3/2001 | Peppel | 6,681,629 | B2 | 1/2004 | Foxlin et al. |
| 6,200,219 | B1 | 3/2001 | Rudell et al. | 6,682,074 | B2 | 1/2004 | Weston |
| 6,210,287 | B1 | 4/2001 | Briggs | 6,693,622 | B1 | 2/2004 | Shahoian et al. |
| 6,220,965 | B1 | 4/2001 | Hanna et al. | 6,702,672 | B1 | 3/2004 | Angell et al. |
| 6,224,486 | B1 | 5/2001 | Walker et al. | 6,709,336 | B2 | 3/2004 | Siegel et al. |
| 6,231,451 | B1 | 5/2001 | Briggs | 6,716,102 | B2 | 4/2004 | Whitten et al. |
| 6,234,803 | B1 | 5/2001 | Watkins | 6,729,934 | B1 | 5/2004 | Driscoll et al. |
| 6,238,289 | B1 | 5/2001 | Sobota et al. | 6,733,390 | B2 | 5/2004 | Walker et al. |
| 6,239,806 | B1 | 5/2001 | Nishiumi et al. | 6,746,334 | B1 | 6/2004 | Barney |
| RE37,220 | E | 6/2001 | Rapisarda et al. | 6,747,690 | B2 | 6/2004 | Molgaard |
| 6,241,611 | B1 | 6/2001 | Takeda et al. | 6,753,849 | B1 | 6/2004 | Curran et al. |
| 6,244,987 | B1 | 6/2001 | Ohsuga et al. | 6,761,637 | B2 | 7/2004 | Weston et al. |
| 6,248,019 | B1 | 6/2001 | Mudie et al. | 6,765,553 | B1 | 7/2004 | Odamura |
| 6,254,101 | B1 | 7/2001 | Young | 6,773,325 | B1 | 8/2004 | Mawle et al. |
| 6,254,394 | B1 | 7/2001 | Draper et al. | 6,773,344 | B1 | 8/2004 | Gabai et al. |
| 6,261,180 | B1 | 7/2001 | Lebensfeld et al. | 6,786,877 | B2 | 9/2004 | Foxlin |
| 6,264,202 | B1 | 7/2001 | Briggs | 6,796,908 | B2 | 9/2004 | Weston |
| 6,264,558 | B1 | 7/2001 | Nishiumi et al. | 6,846,238 | B2 | 1/2005 | Wells |
| 6,265,984 | B1 | 7/2001 | Molinaroli | 6,872,139 | B2 | 3/2005 | Sato et al. |
| 6,273,425 | B1 | 8/2001 | Westfall et al. | 6,894,686 | B2 | 5/2005 | Stamper et al. |
| 6,273,819 | B1 | 8/2001 | Strauss et al. | 6,902,483 | B2 | 6/2005 | Lin |
| 6,280,327 | B1 * | 8/2001 | Leifer et al. ................ 463/39 | 6,918,833 | B2 | 7/2005 | Emmerson et al. |
| 6,280,328 | B1 | 8/2001 | Holch et al. | 6,932,698 | B2 | 8/2005 | Sprogis |
| 6,283,871 | B1 | 9/2001 | Briggs | 6,932,706 | B1 | 8/2005 | Kaminkow |
| 6,290,565 | B1 | 9/2001 | Galyean, III et al. | 6,939,232 | B2 | 9/2005 | Tanaka et al. |
| 6,290,566 | B1 | 9/2001 | Gabai et al. | 6,956,564 | B1 | 10/2005 | Williams |
| 6,302,793 | B1 | 10/2001 | Fertitta, III et al. | 6,967,563 | B2 | 11/2005 | Bormaster |
| 6,302,796 | B1 | 10/2001 | Lebensfeld et al. | 6,967,566 | B2 | 11/2005 | Weston et al. |
| 6,311,982 | B1 | 11/2001 | Lebensfeld et al. | 6,982,697 | B2 | 1/2006 | Wilson et al. |
| 6,320,495 | B1 | 11/2001 | Sporgis | 7,000,469 | B2 | 2/2006 | Foxlin et al. |
| 6,328,648 | B1 | 12/2001 | Walker et al. | 7,029,400 | B2 | 4/2006 | Briggs |
| 6,328,650 | B1 | 12/2001 | Fukawa et al. | 7,031,875 | B2 | 4/2006 | Ellenby et al. |
| 6,330,427 | B1 | 12/2001 | Tabachnik | 7,055,101 | B2 | 5/2006 | Abbott et al. |
| 6,332,840 | B1 | 12/2001 | Nishiumi et al. | 7,066,781 | B2 | 6/2006 | Weston |
| 6,342,010 | B1 * | 1/2002 | Slifer ......................... 463/39 | 7,098,891 | B1 | 8/2006 | Pryor |
| 6,352,478 | B1 * | 3/2002 | Gabai et al. ................. 463/42 | 7,102,616 | B1 | 9/2006 | Sleator |
| 6,368,177 | B1 | 4/2002 | Gabai et al. | 7,126,584 | B1 | 10/2006 | Nishiumi et al. |
| 6,369,794 | B1 | 4/2002 | Sakurai et al. | 7,183,480 | B2 | 2/2007 | Nishitani et al. |
| 6,369,908 | B1 | 4/2002 | Frey et al. | 7,220,220 | B2 | 5/2007 | Stubbs et al. |
| 6,371,375 | B1 | 4/2002 | Ackley et al. | RE39,818 | E | 9/2007 | Slifer |
| 6,375,578 | B1 | 4/2002 | Briggs | 7,297,059 | B2 | 11/2007 | Vancura et al. |
| 6,383,079 | B1 | 5/2002 | Takech et al. | 7,301,648 | B2 | 11/2007 | Foxlin |
| 6,400,996 | B1 | 6/2002 | Hoffberg et al. | 7,395,181 | B2 | 7/2008 | Foxlin |
| 6,404,409 | B1 | 6/2002 | Solomon | 7,419,428 | B2 | 9/2008 | Rowe |
| 6,409,379 | B1 | 6/2002 | Gabathuler et al. | 7,445,550 | B2 | 11/2008 | Barney et al. |
| 6,414,589 | B1 | 7/2002 | Angott et al. | 7,488,231 | B2 | 2/2009 | Weston |
| 6,424,333 | B1 | 7/2002 | Tremblay | 7,500,917 | B2 | 3/2009 | Barney et al. |

| | | |
|---|---|---|
| 7,502,759 B2 | 3/2009 | Hannigan et al. |
| 7,572,191 B2 | 8/2009 | Weston et al. |
| 7,749,089 B1 | 7/2010 | Briggs et al. |
| 2001/0039206 A1 | 11/2001 | Peppel |
| 2001/0054082 A1 | 12/2001 | Rudolph et al. |
| 2002/0005787 A1 | 1/2002 | Gabai et al. |
| 2002/0032067 A1 | 3/2002 | Barney |
| 2002/0038267 A1 | 3/2002 | Can et al. |
| 2002/0052238 A1 | 5/2002 | Muroi |
| 2002/0068500 A1 | 6/2002 | Gabai et al. |
| 2002/0090985 A1 | 7/2002 | Tochner et al. |
| 2002/0090992 A1 | 7/2002 | Legge et al. |
| 2002/0107591 A1 | 8/2002 | Gabai et al. |
| 2002/0118147 A1 | 8/2002 | Solomon |
| 2003/0022736 A1 | 1/2003 | Cass |
| 2003/0027634 A1 | 2/2003 | Matthews, III |
| 2003/0036425 A1 | 2/2003 | Kaminkow et al. |
| 2003/0069077 A1 | 4/2003 | Korienek |
| 2003/0134679 A1 | 7/2003 | Siegel et al. |
| 2003/0195046 A1 | 10/2003 | Bartsch |
| 2003/0234914 A1 | 12/2003 | Solomon |
| 2004/0033833 A1 | 2/2004 | Briggs et al. |
| 2004/0077423 A1 | 4/2004 | Weston et al. |
| 2004/0102247 A1 | 5/2004 | Smoot et al. |
| 2004/0121834 A1 | 6/2004 | Libby et al. |
| 2004/0152499 A1 | 8/2004 | Lind et al. |
| 2004/0204240 A1 | 10/2004 | Barney |
| 2005/0143173 A1 | 6/2005 | Barney |
| 2005/0156883 A1 | 7/2005 | Wilson et al. |
| 2005/0277465 A1 | 12/2005 | Whitten et al. |
| 2006/0030385 A1 | 2/2006 | Barney et al. |
| 2006/0154726 A1 | 7/2006 | Weston et al. |
| 2007/0066396 A1 | 3/2007 | Weston et al. |

FOREIGN PATENT DOCUMENTS

| | | |
|---|---|---|
| JP | 63-186687 | 8/1988 |
| JP | 3-210622 | 9/1991 |
| JP | 8-191953 | 7/1996 |
| JP | 09-149915 | 6/1997 |
| JP | 09-164273 | 6/1997 |
| JP | 10-235019 | 8/1998 |
| JP | 2000-33184 | 2/2000 |
| JP | 2000-176150 | 6/2000 |
| JP | 2000-300839 | 10/2000 |
| JP | 2000-308756 | 11/2000 |
| JP | 2001-265521 | 9/2001 |
| JP | 2002-07057 | 1/2002 |
| JP | 2002-78969 | 3/2002 |
| JP | 2002-126375 | 5/2002 |
| WO | WO 97/28864 | 8/1997 |
| WO | WO 00/33168 | 6/2000 |
| WO | WO 02/47013 | 6/2002 |
| WO | WO 03/043709 | 5/2003 |
| WO | WO 03/044743 A2 | 5/2003 |

OTHER PUBLICATIONS

Benbasat, et al., "An Inertial Measurement Framework for Gesture Recognition and Applications," Gesture and Sign Language in Human-Computer Interaction, International Gesture Workshop, GW 2001, London, UK, 2001 Proceedings, LNAI 2298, at 9-20, I. Wachsmuth and T. Sowa (eds.), Springer-Verlag Berlin Heibelberg, 12 pages.

Bishop, "The Self-Tracker: A Smart Optical Sensor on Silicon," Ph.D. Dissertation, Univ. Of North Carolina at Chapel Hill (1984), 65 pages.

Business Wire, "Free-space 'Tilt' Game Controller for Sony Playstation Uses Scenix Chip; SX Series IC Processes Spatial Data in Real Time for On-Screen" (Dec. 1999), 3 pages.

Business Wire, "Mind Path Introduces GYROPOINT RF Wireless Remote" (Jan. 2000), 3 pages.

Canaday, R67-26 "The Lincoln Wand," IEEE Transactions on Electronic Computers, vol. EC-16, No. 2, p. 240 (Apr. 1967), 1 page.

Hinckley et al., "The VideoMouse: A Camera-Based Multi-Degree-of-Freedom Input Device" A59, ACM UIST'99 Symposium on User Interface Software & Technology, CHI Letters 1 (1), pp. 103-112. (Jan. 1999), 10 pages.

Newswire PR, "Five New Retailers to Carry Gyration's Gyropoint Point and Gyropoint Pro" (1996), 3 pages.

Youngblut, et al., "Review of Virtual Environment Interface Technology," Institute for Defense Analyses (Jul. 1996), 270 pages.

General info: History of Laser Tag; http://lasertag.org/general/history.html; Mar. 1984; pp. 1-5.

Laser Tag Branded Gear, http://home.comcast.net/~ferret1963. Laxer_Tag_Brand.HTML; Sep. 26, 2006; pp. 1-25.

"Nintendo Wii Controller Invented by Americans: Midway Velocity Controller Technology Brief," Presentation dated Jun. 28, 2000, obtained from http://www.youtube.com/watch?v=wjLhSrSxFNw on Jun. 30, 2010, 1 page.

Richard Borovoy et al., "Groupwear: Nametags That Tell About Relationships," Chi 98, Apr. 1998, pp. 329-330.

Jonathan Green et al., "Camping in the Digital Wilderness: Tents and Flashlights As Interfaces to Virtual Worlds," Chi 2002, Apr. 2002, pp. 780-781.

Mitchel Resnick et al., "Digital Manipulatives: New Toys to Think With," Chi 98; Apr. 1998; pp. 281-287.

Vanessa Colella et al., "Participatory Simulations: Using Computational Objects to Learn about Dynamic Systems," Chi 98; Apr. 1998, pp. 9-10.

R. Borovoy et al., "Things that Blink: Computationally Augmented Name Tags," IBM Systems Journal, vol. 35, Nos. 3 & 4, 1996; pp. 488-495.

Allison Druin et al., "Robots for Kids: Exploring New Technologies for Learning," Academic Press, 2000; Chap. 1, 27 pages.

Badler et al., "Multi-Dimensional Input Techniques and Articulated Figure Positioning by Multiple Constraints," Interactive 3D Graphics, Oct. 1986; pp. 151-169.

Cheok et al., "Micro-Accelerometer Based Hardware Interfaces for Wearable Computer Mixed Reality Applications," 6th International Symposium on Wearable Computers (ISWC'02), 8 pages.

James H. Clark, "Designing Surfaces in 3-D," Graphics and Image Processing-Communications of the ACM, Aug. 1976; vol. 19; No. 8; pp. 454-460.

James H. Clark, "Three Dimensional Man Machine Interaction," Siggraph '76, July 14-16 Philadelphia, Pennsylvania, 1 page.

Michael F. Deering, "HoloSketch A Virtual Reality Sketching Animation Tool," ACM Transactions on Computer-Human Interaction, Sep. 1995; vol. 2, No. 3; pp. 220-238.

Robert E. Drzymala et al., "A Feasibility Study Using a Stereo-Optical Camera System to Verify Gamma Knife Treatment Specification," Proceedings of 22nd Annual EMBS International Conference, Jul. 2000; pp. 1486-1489.

Hunter G. Hoffman, "Physically Touching Virtual Objects Using Tactile Augmentation Enhances the Realism of Virtual Environments," IEEE Virtual Reality Annual International Symposium '98, Atlanta, Georgia, 1998, 5 pages.

D.W. Kormos et al., "Intraoperative, Real-Time 3-D Digitizer for Neurosurgical Treatment and Planning," 1993; 1 page.

Nintendo Tilt Controller Ad, Electronic Gaming Monthly, 1994, 1 page.

Interfax Press Release, "Tsinghua Tongfang Releases Unique Peripheral Hardware for 3D Gaming," 2002, 1 page.

New Strait Times Press Release, "Microsoft's New Titles," 1998, 1 page.

Digital ID Cards The next generation of 'smart' cards will have more than a one-track mind. Wall Street Journal, Jun. 25, 2001.

Tech Designers Rethink Toys: Make Them Fun. Wall Street Journal, Dec. 17, 2001.

Pajama Sam: No Need to Hide When It's Dark Outside Infogames, Sep. 6, 2002.

"Raise High the 3D Roof Beam: Kids shape these PC games as they go along." By Anne Field, article as featured in Business Week 2001.

"212 Series of Decoders" HT12D/HT12F by HOLTEK-Product Specification (Nov. 2002).

"212 Series Encoders" HT12A/HT12E by HOLTEK-Product Specification (Apr. 2000).

"Enchanted Spell-Casting Sorcerers Wand" by Ken Holt as featured on www.inventionconnection.com online advertisement (Dec. 2002).

"Owl Magic Wand and Owl Magic Orb" Press Release by Emerald Forest Toys (Nov. 2001).

"The Magic Labs Conjure Wands" as featured on www.magic-lab.com Product Specification Dec. 2002.

"Tilt Switch" by Fuji & Co. as featured on www.fuji-piezo.com online advertisement May 2001.

"Toy Wand Manufacturer Selects MEMSIC Sensor: Magic Labs cuts costs with MEMSIC sensor" Press Release by MEMSIC, Inc. as featured on www.memsic.com May 2002.

"Ollivanders: Makers of Fine Wands." Dec. 2, 2002. [online] [retrieved on Mar. 30, 2005], Retrieved from Internet <URL:http//www.cim.mcgill.edu/ljer/courses/hci/assignments/2002/www.ece.mcgill.ca/%7Eeuryd>.

* cited by examiner

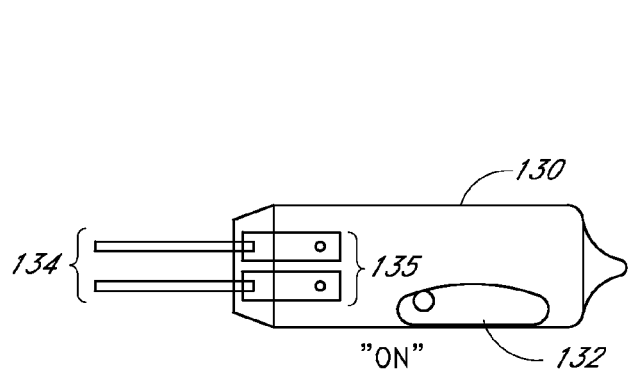
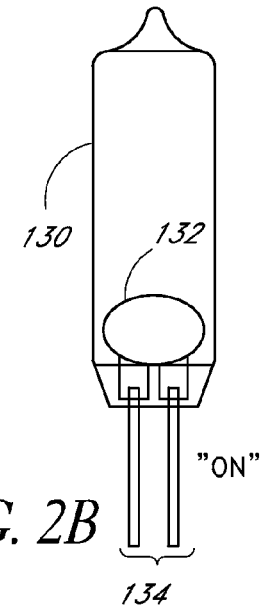
FIG. 2A    FIG. 2B
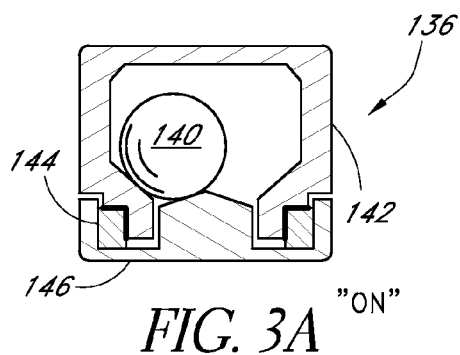
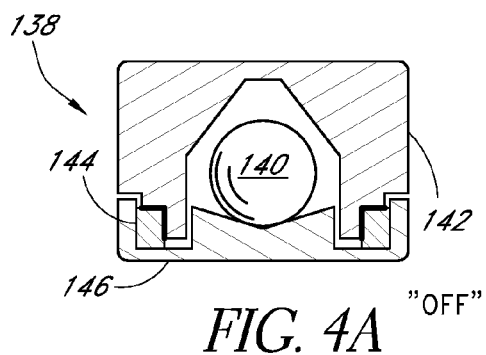
FIG. 3A "ON"    FIG. 4A "OFF"
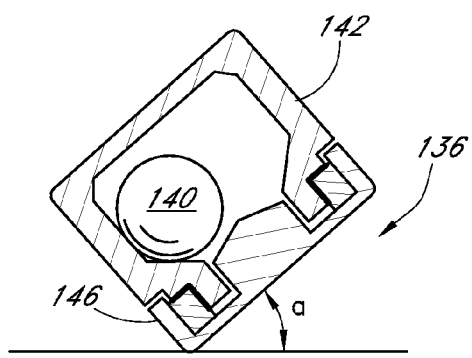
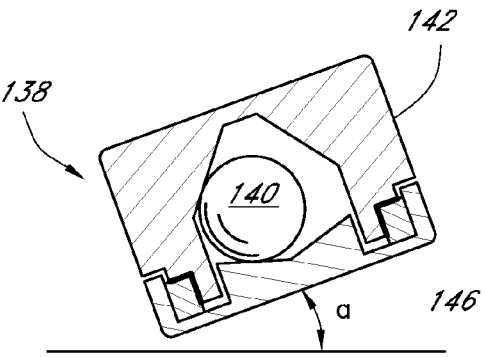
FIG. 3B "OFF"    FIG. 4B "ON"

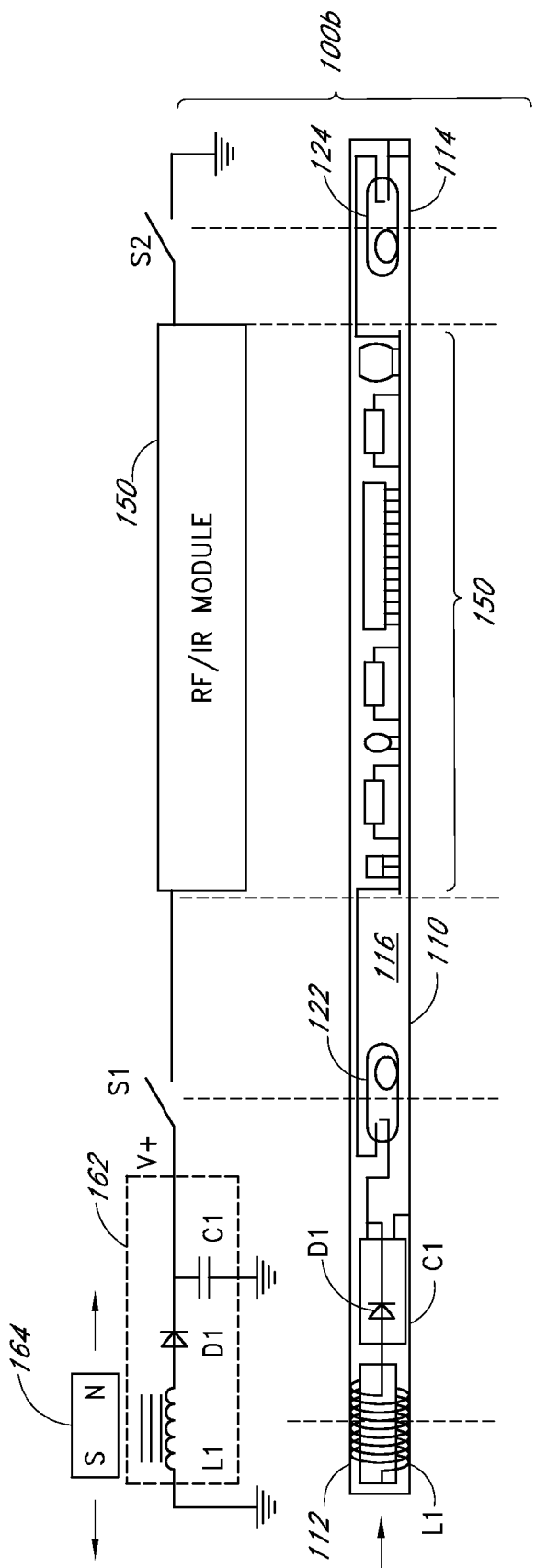
FIG. 8

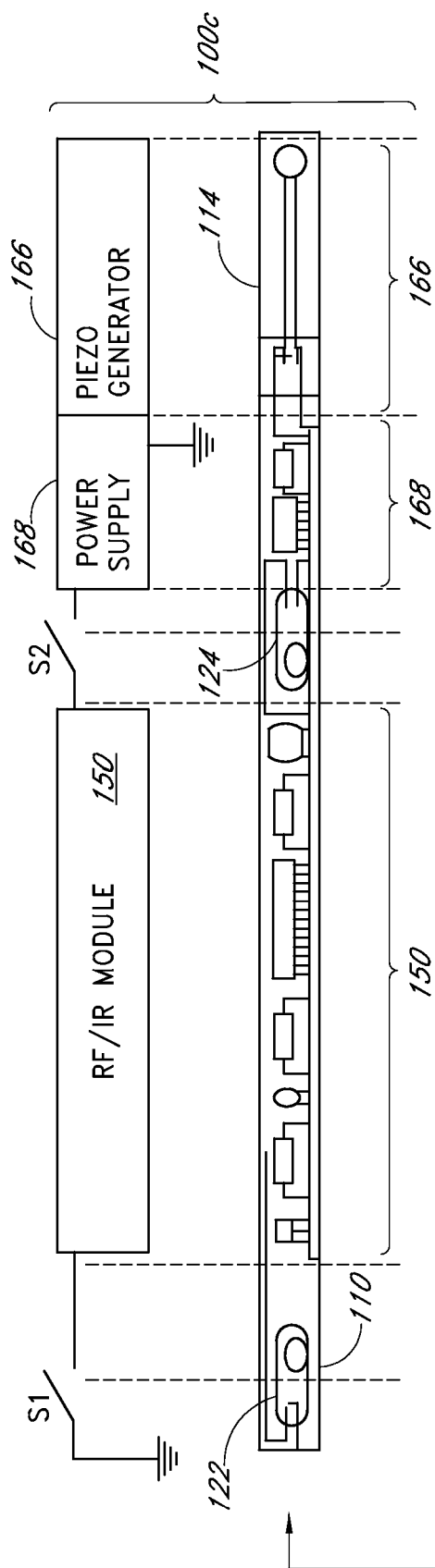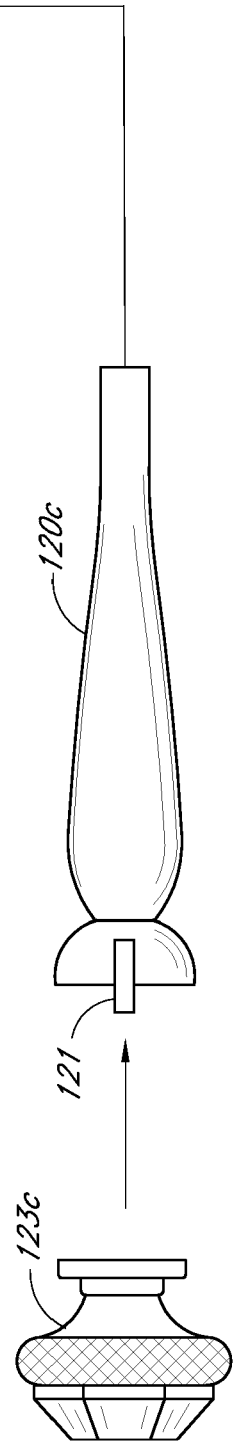
FIG. 9

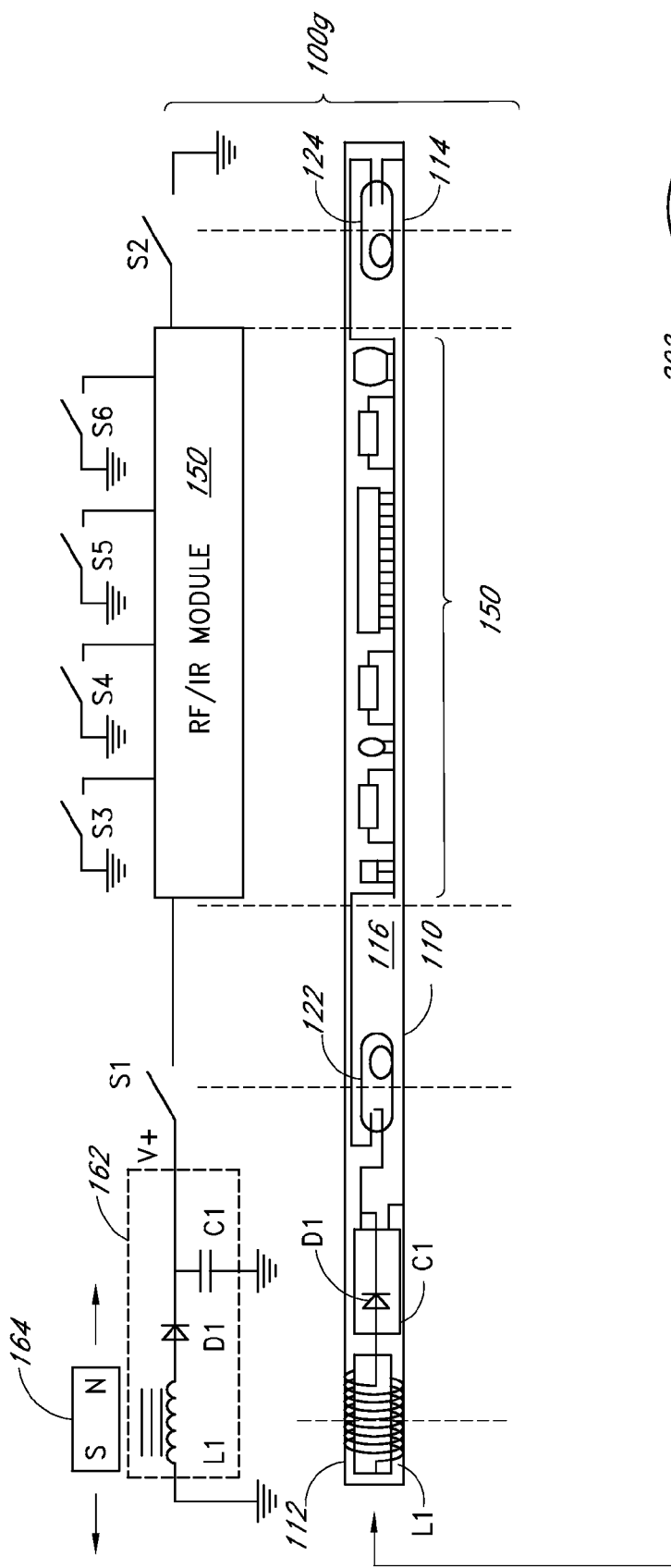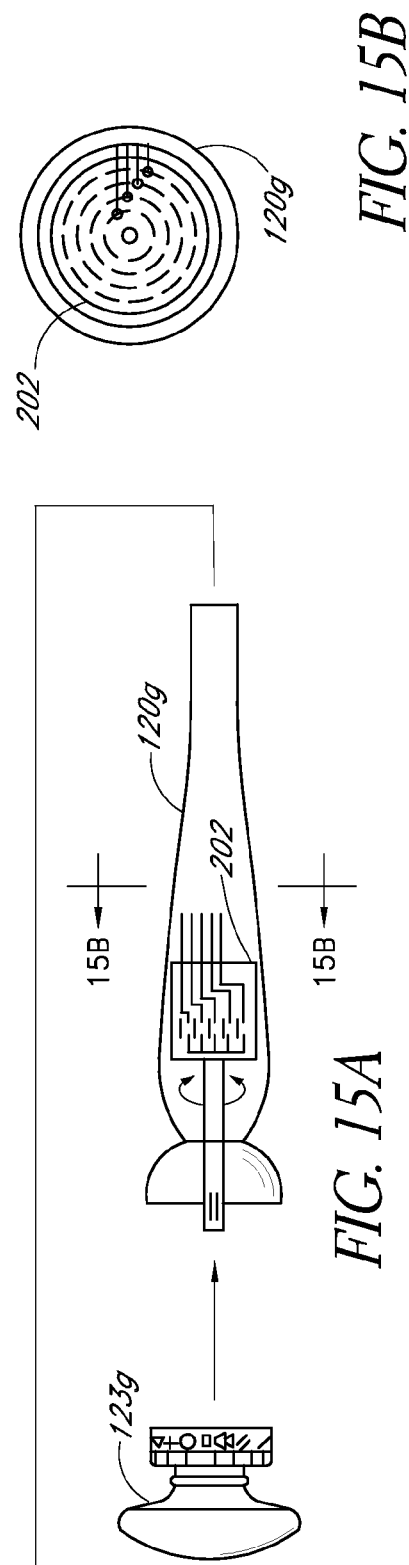
FIG. 15A
FIG. 15B

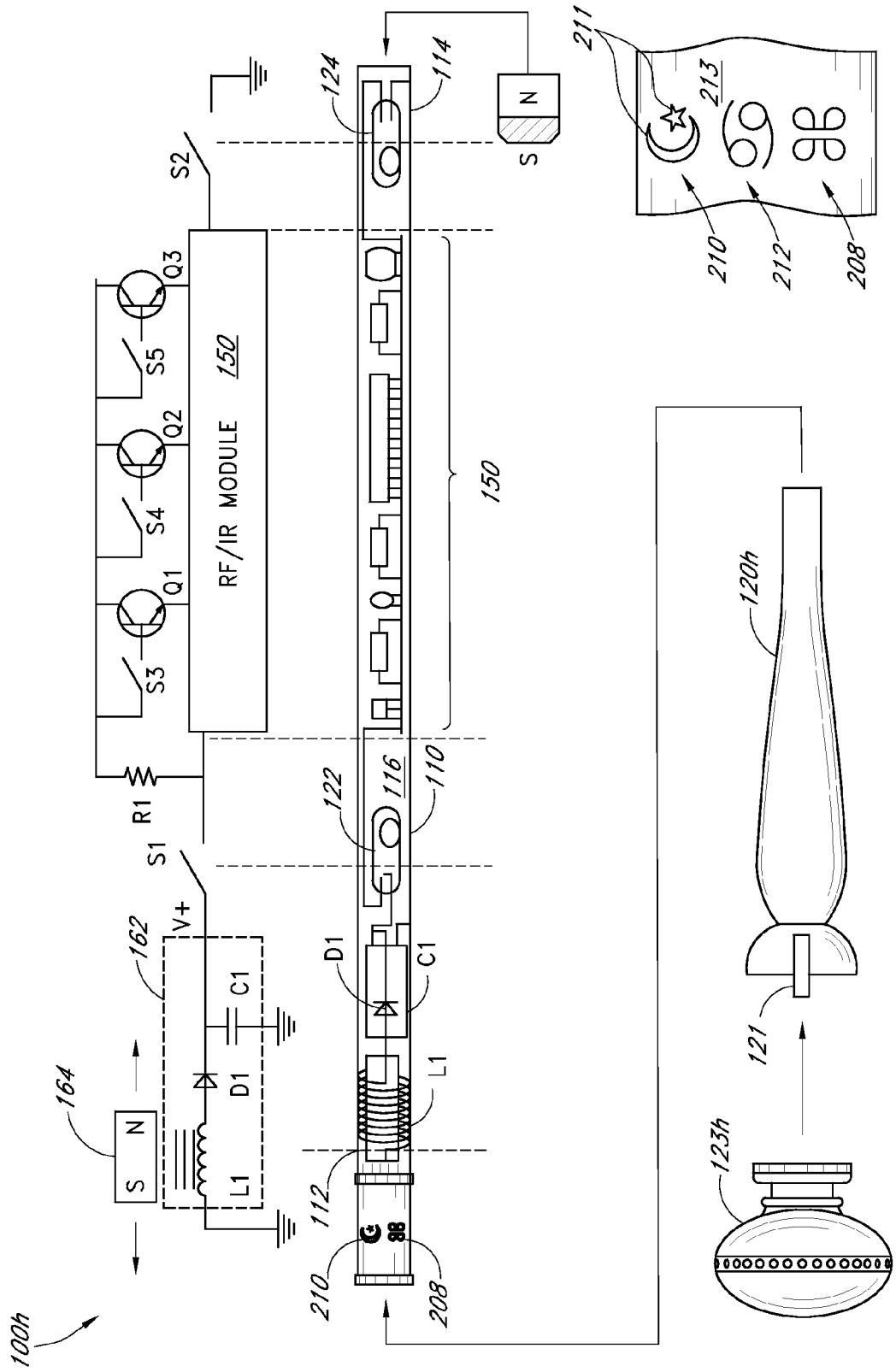

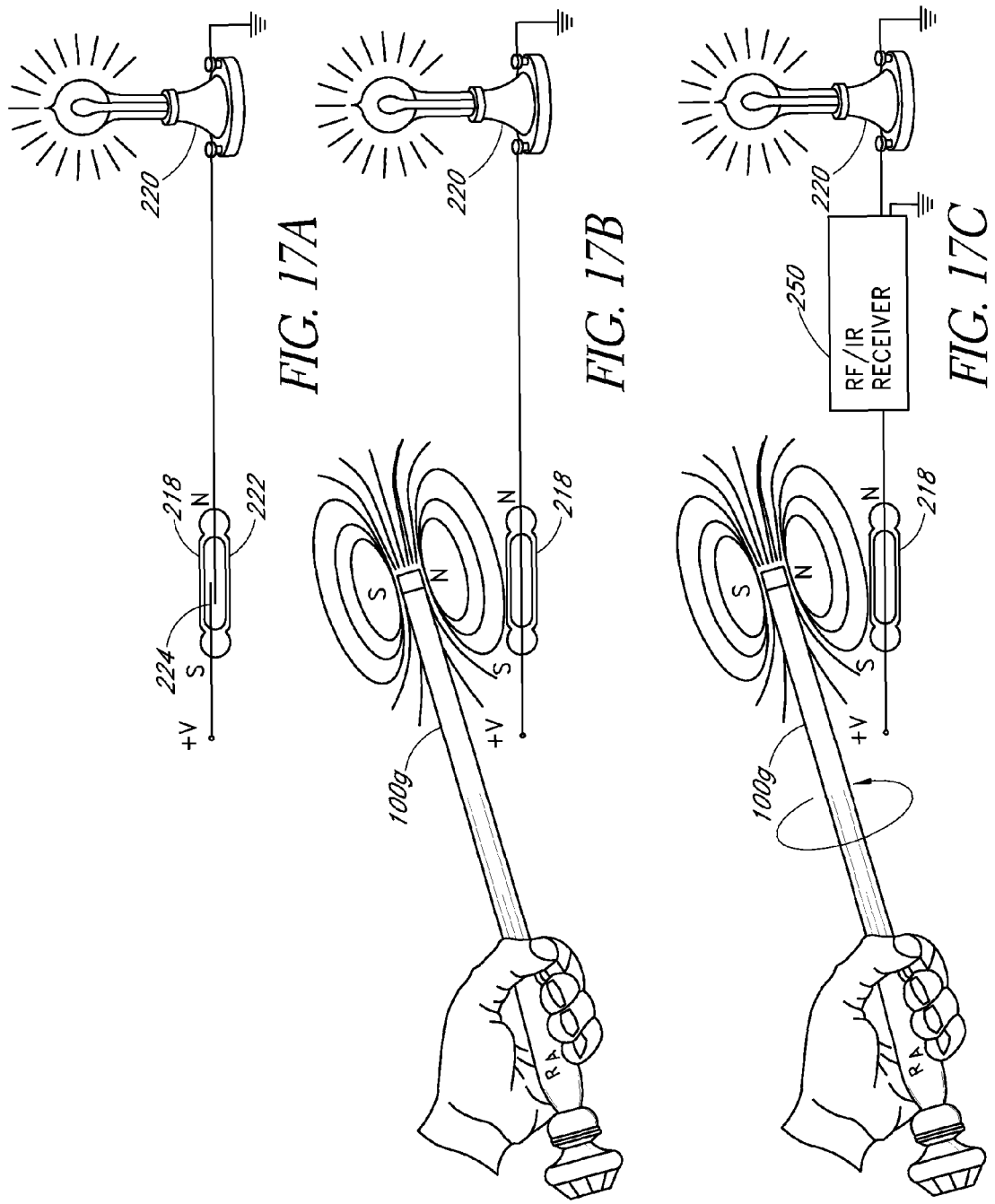

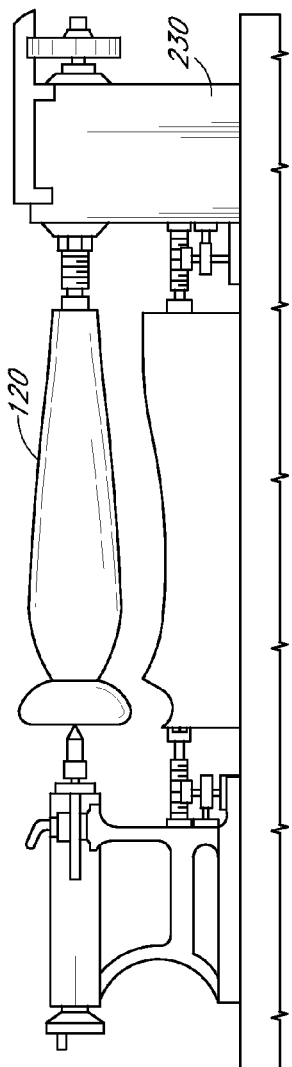
FIG. 18A
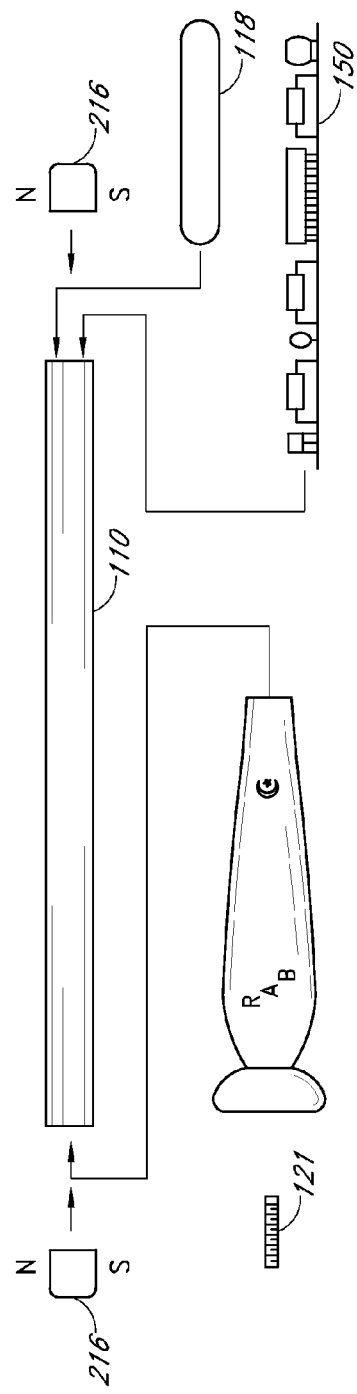
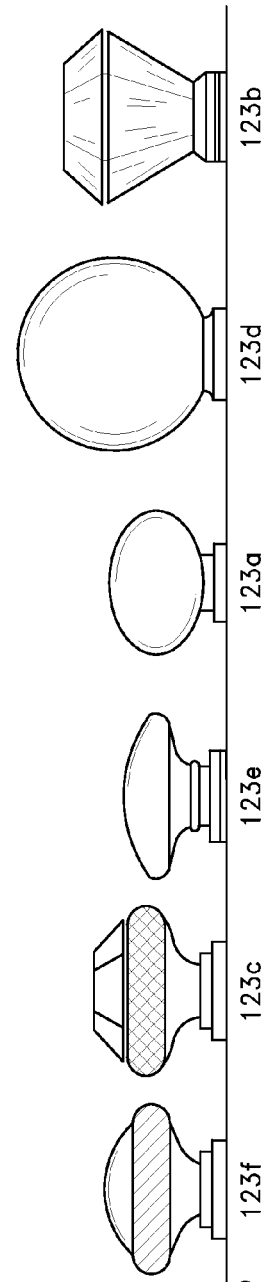
FIG. 18B

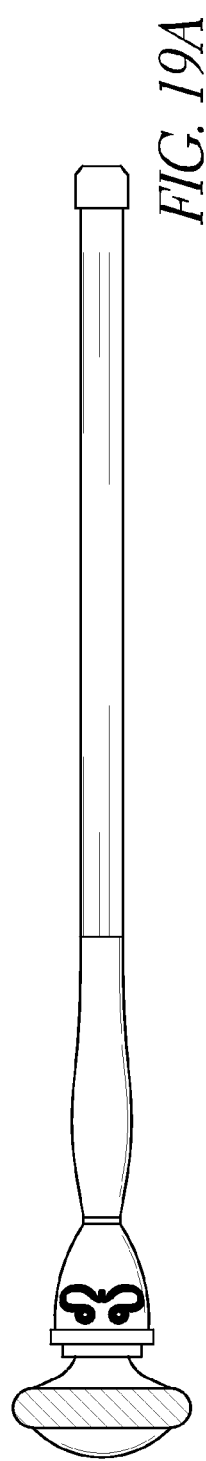
FIG. 19A
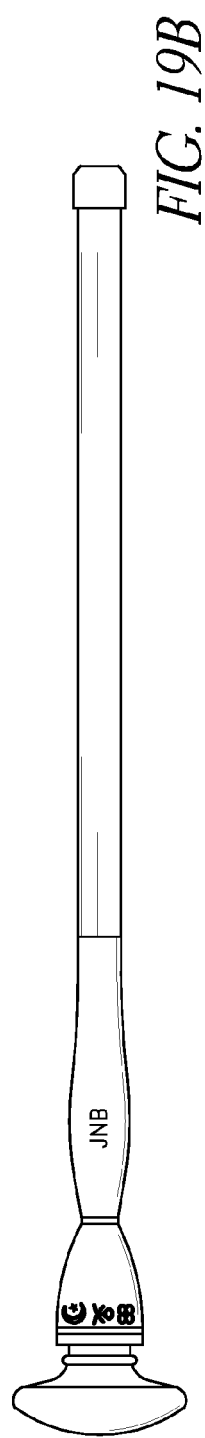
FIG. 19B
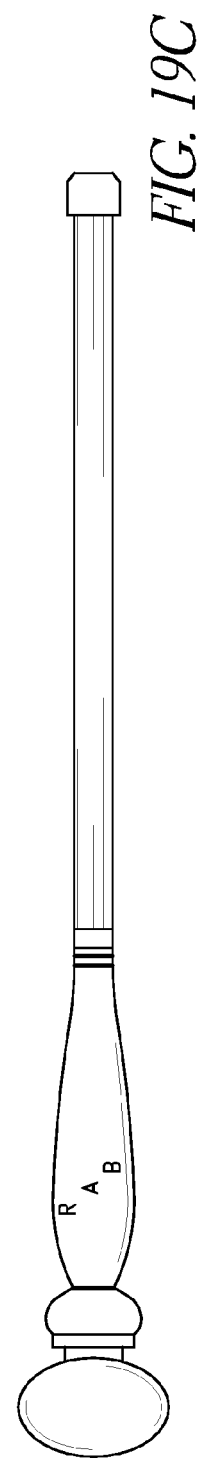
FIG. 19C
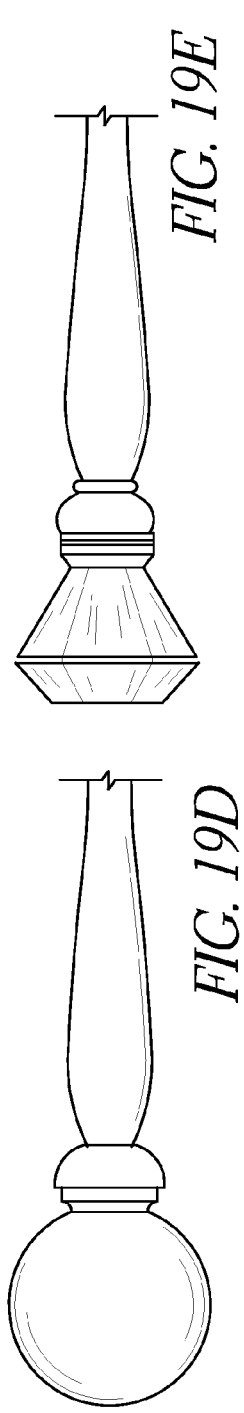
FIG. 19E
FIG. 19D
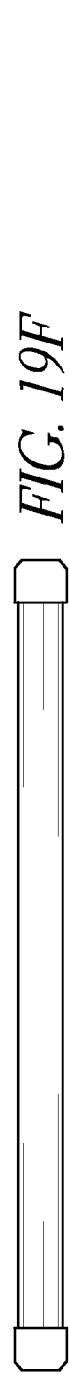
FIG. 19F

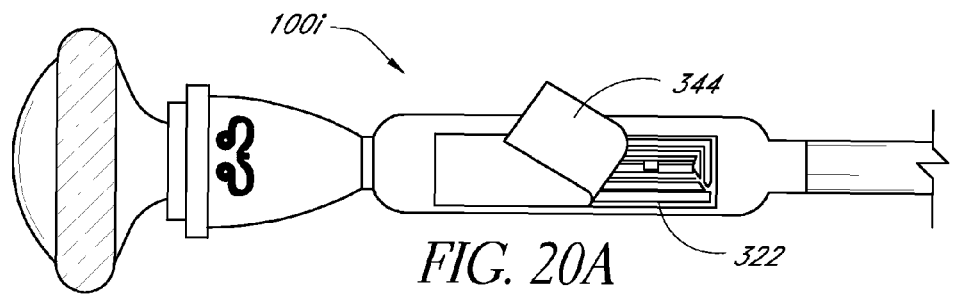
FIG. 20A
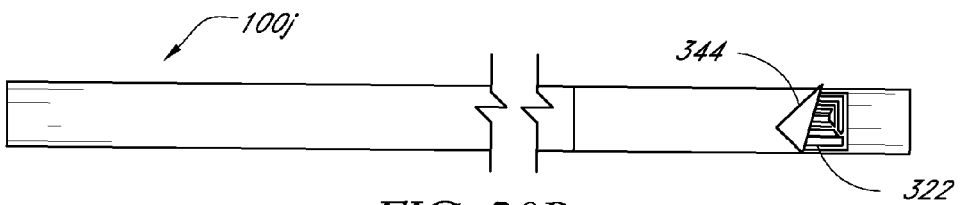
FIG. 20B
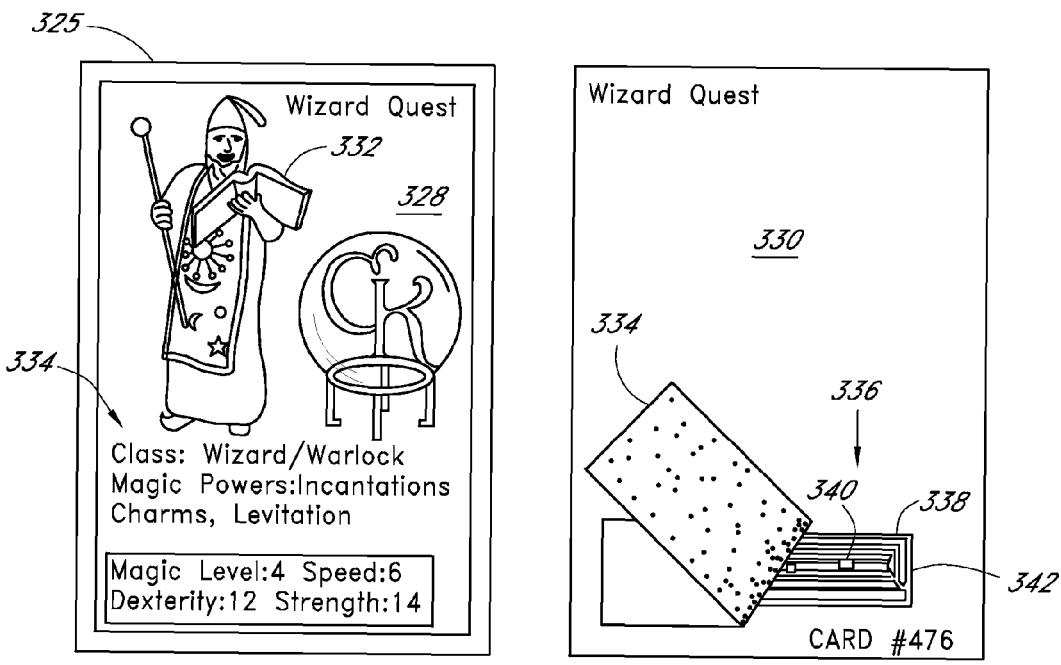
FIG. 20C
FIG. 20D
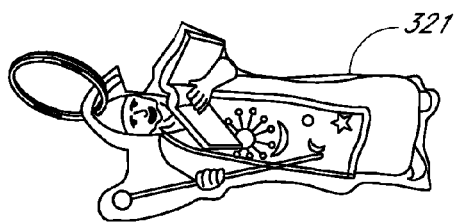
FIG. 20E
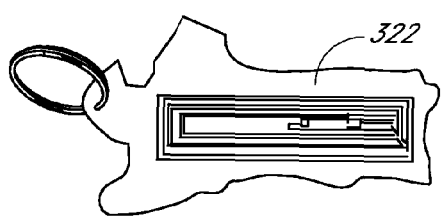
FIG. 20F

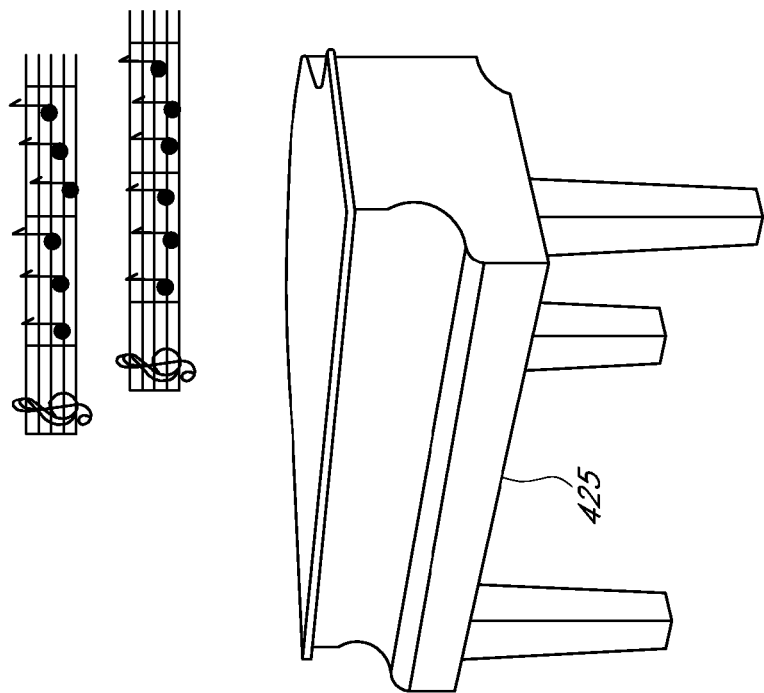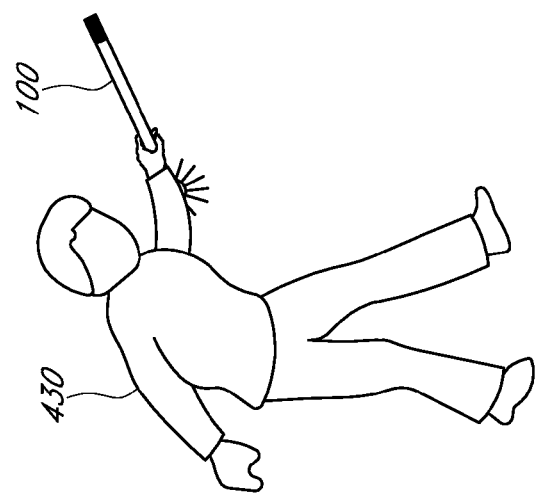
FIG. 28

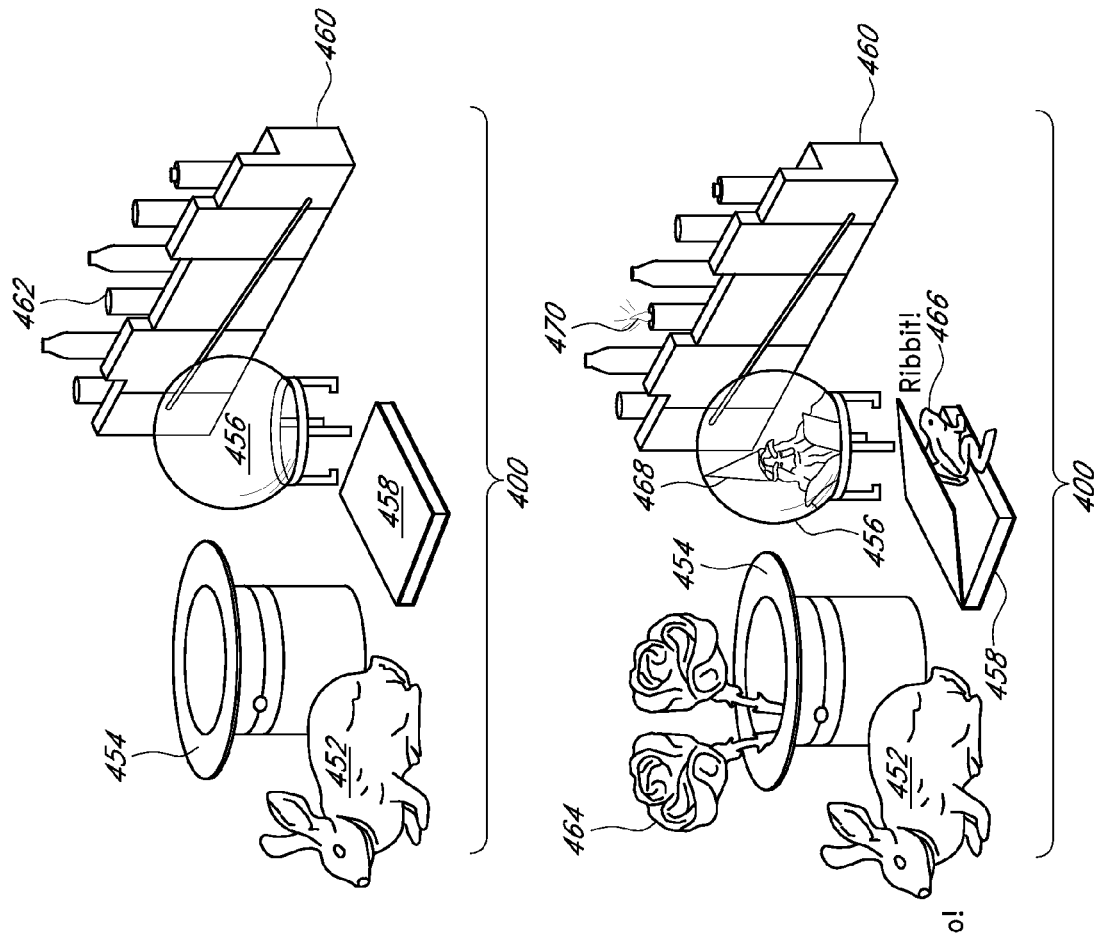
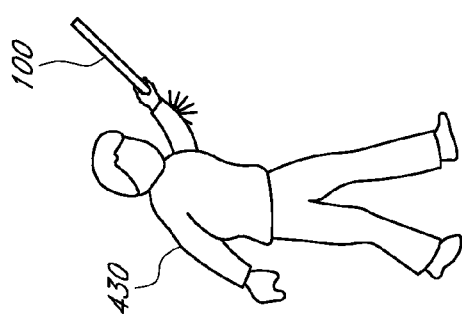
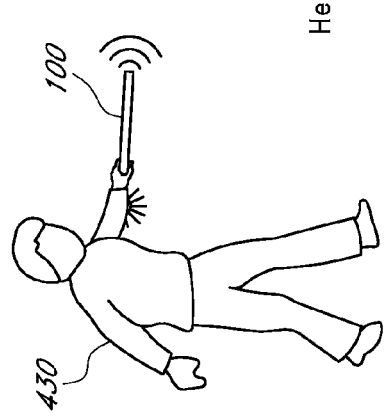
FIG. 31A
FIG. 31B

US 7,896,742 B2

APPARATUS AND METHODS FOR PROVIDING INTERACTIVE ENTERTAINMENT

RELATED APPLICATIONS

The present application is a continuation application of U.S. patent application Ser. No. 11/274,760, filed Nov. 15, 2005, which is: (1) a continuation-in-part of U.S. patent application Ser. No. 10/889,974, filed Jul. 13, 2004, which is a continuation of U.S. patent application Ser. No. 09/792,282, filed Feb. 22, 2001, now U.S. Pat. No. 6,761,637, issued Jul. 13, 2004, which claims priority benefit under 35 U.S.C. §119(e) to U.S. Provisional Application No. 60/184,128, filed Feb. 22, 2000, and (2) a continuation-in-part of U.S. patent application Ser. No. 10/954,025, filed Sep. 29, 2004, now U.S. Pat. No. 7,445,550, which is a continuation-in-part of U.S. patent application Ser. No. 10/397,054, filed Mar. 25, 2003, now U.S. Pat. No. 7,500,917, which is a continuation-in-part of U.S. patent application Ser. No. 09/792,282, filed Feb. 22, 2001, now U.S. Pat. No. 6,761,637, issued Jul. 13, 2004, which claims priority benefit under 35 U.S.C. §119(e) to U.S. Provisional Application No. 60/184,128, filed Feb. 22, 2000, each of which is hereby incorporated herein by reference in its entirety.

The present application also contains subject matter that is related to U.S. patent application Ser. No. 10/410,583, filed Apr. 7, 2003, now U.S. Pat. No. 6,967,566, issued Nov. 22, 2005, which is hereby incorporated herein by reference in its entirety.

BACKGROUND OF THE INVENTION

1. Field of the Invention

The present invention generally relates to children's games and, in particular, to magic wands and interactive games and play systems utilizing wireless transponders and receivers for providing a magical interactive play experience.

2. Description of the Related Art

Games, toys, play structures and other similar entertainment systems are well known for providing play and interaction among children and adults. A variety of commercially available play toys and games are also known for providing valuable learning and entertainment opportunities for children, such as role playing, reading, memory stimulation, tactile coordination and the like.

Magic and wizardry are classic play themes that continue to capture imaginations and entertain new generations of children and adults like. Magic and the seemingly limitless possibilities of fun and exciting things brought to life through magic challenge children's imaginations, creativity and social interactivity.

While there are many games and toys that specifically target magic and wizardry as a central play theme, most offer only a superficially engaging play experience, particularly for older children. Very few offer a fully immersive play experience that allows participants to carry out and immerse themselves in a realistic fantasy experience of practicing, performing and mastering "real" magic. For example, many such games are performed through a computer and/or video game, wherein the user manages the game through a particular electronic input device, such as a keyboard or a joystick.

SUMMARY OF THE INVENTION

In view of the foregoing, a need exists for more exciting and entertaining games and toys that increase learning and entertainment opportunities for children and stimulate creativity and imagination.

Embodiments of the present invention provide a unique play experience carried out utilizing an interactive "wand" and/or other seemingly magical actuation/tracking device. The wand or other actuation device allows play participants to electronically and "magically" interact with their surrounding play environment(s), thereby giving play participants the realistic illusion of practicing, performing and mastering "real" magic.

The play environment may either be real or imaginary (i.e., computer/TV generated), and either local or remote, as desired. Optionally, multiple play participants, each provided with a suitable "wand" and/or other actuation/tracking device, may play and interact together, either within or outside one or more compatible play environments, to achieve desired goals, master certain magical spells and/or produce desired seemingly magical effects within the play environment.

In accordance with one embodiment the present invention provides a toy wand or other seemingly magical object which provides a basic foundation for a complex, interactive entertainment system to create a seemingly magic interactive play experience for play participants who possess and learn to use the magical wand toy.

In accordance with another embodiment the present invention provides a "magic" training facility wherein play participants can select and/or build and then learn to use a "real" magic wand. The wand allows play participants to electronically and "magically" interact with their surrounding play environment simply by pointing, touching or using their wands in a particular manner to achieve desired goals or produce desired effects within the play environment. Various wireless receivers or actuators are distributed throughout the play facility to facilitate such interaction and to facilitate full immersion in the fantasy of practicing, performing and mastering "real" magic.

In accordance with another embodiment the present invention provides a wand actuator device for actuating interactive various play effects within a compatible play environment. The wand comprises an elongated hollow pipe or tube having a proximal end or handle portion and a distal end or transmitting portion. An internal cavity may be provided to receive one or more batteries to power optional lighting, laser or sound effects and/or to power long-range transmissions such as via an infrared LED transmitter device or RF transmitter device. The distal end of the wand may be fitted with an RFID (radio frequency identification device) transponder that is operable to provide relatively short-range RF communications (<60 cm) with one or more receivers or transceivers distributed throughout a play environment. A magnetic tip may also be provided for actuating various effects via one or more magnetically operated reed switches. The handle portion of the wand may be fitted with an ornamental knob that is selected by play participants from an available assortment. Knobs may be fitted with an optional rotary switch that may be selectably rotated to indicate different spells, commands or combinations of spells and commands for activating or controlling various associated special effects.

In accordance with another embodiment the present invention provides a wand having an RFID transponder or tag. The transponder contains certain electronics comprising a radio frequency tag pre-programmed with a unique person identifier number ("UPIN"). The UPIN may be used to identify and track individual play participants and/or wands within the play facility. Optionally, each tag may also include a unique group identifier number ("UGIN"), which may be used to match a defined group of individuals having a predetermined relationship. The RFID transponder or other identifying device is preferably used to store certain information identifying each play participant and/or describing certain powers or abilities possessed by an imaginary role-play character. Players advance in a magic adventure game by finding clues, casting spells and solving various puzzles presented. Players may also gain (or lose) certain attributes, such as magic skills, magic strength, fighting ability, various spell-casting abilities, combinations of the same or the like. All of this information is preferably stored on the RFID transponder and/or an associated database indexed by UPIN so that the character attributes may be easily and conveniently transported to other similarly-equipped play facilities, computer games, video games, home game consoles, hand-held game units, and the like. In this manner, an imaginary role-play character is created and stored on a transponder device that is able to seamlessly transcend from one play environment to the next.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which:

FIGS. 2A and 2B are schematic illustrations of a mercury tilt switch for use in accordance with one embodiment of the present invention and being shown in the OFF and ON conditions, respectively;

FIGS. 3A and 3B are schematic illustrations of a micro-ball tilt switch (normally closed configuration) for use in accordance with one embodiment of the present invention and being shown in the ON and OFF conditions, respectively;

FIGS. 4A and 4B are schematic illustrations of a micro-ball tilt switch (normally open configuration) for use in accordance with one embodiment of the present invention and being shown in the ON and OFF conditions, respectively;

FIG. 8 is a schematic illustration of a further alternative embodiment of an interactive wand toy including an optional magnetic inductance energy source having features and advantages in accordance with the present invention;

FIG. 9 is a schematic illustration of a further alternative embodiment of an interactive wand toy including an optional piezo generator energy source having features and advantages in accordance with the present invention;

FIG. 15A is a schematic illustration of a further alternative embodiment of an interactive wand toy including optional rotary switch having features and advantages in accordance with the present invention;

FIG. 15B is a detail transverse cross-sectional view of the handle portion of the interactive wand toy of FIG. 15A illustrating one preferred embodiment of a rotary switch having features and advantages in accordance with the present invention;

FIG. 16A is a schematic illustration of a further alternative embodiment of an interactive wand toy including optional touch sensor elements having features and advantages in accordance with the present invention;

FIG. 16B is a detail view of one embodiment of a touch sensor element of FIG. 16A having features and advantages in accordance with the present invention;

FIGS. 17A-17B are time-sequenced illustrations of one embodiment of a wand-actuated effect using the interactive wand toy of FIG. 16 with optional magnetic tip and a magnetic reed switch having features and advantages in accordance with the present invention;

FIG. 17C is an alternative embodiment of a wand-actuated effect using the interactive wand toy of FIG. 16 with optional magnetic tip, a magnetic reed switch and an optional RF/IR receiver having features and advantages in accordance with the present invention;

FIGS. 18A and 18B are schematic illustrations showing one preferred method for fabricating, assembling and finishing an interactive wand toy having features and advantages in accordance with the present invention;

FIGS. 20A and 20B are schematic illustrations showing two alternative preferred embodiments of an RFID-enabled wand toy having features and advantages in accordance with the present invention;

FIGS. 20C and 20D are front and back views, respectively, of a preferred embodiment of an RFID-enabled trading card having features and advantages in accordance with the present invention;

FIGS. 20E and 20F are front and back views, respectively, of a preferred embodiment of an RFID-enabled key chain trinket having features and advantages in accordance with the present invention;

FIG. 28 is a perspective illustration of one preferred embodiment of a wand-actuated play effect comprising a player piano controlled at least in part by the output of an RF receiver and/or magnetic reed switch having features and advantages in accordance with the present invention;

FIGS. 31A and 31B are time-sequenced perspective views of a magic training center comprising various wand-actuated play effects controlled at least in part by the output of one or more RF receivers and/or magnetic reed switches having features and advantages in accordance with the present invention;

DETAILED DESCRIPTION OF THE PREFERRED EMBODIMENTS

Figure 1:
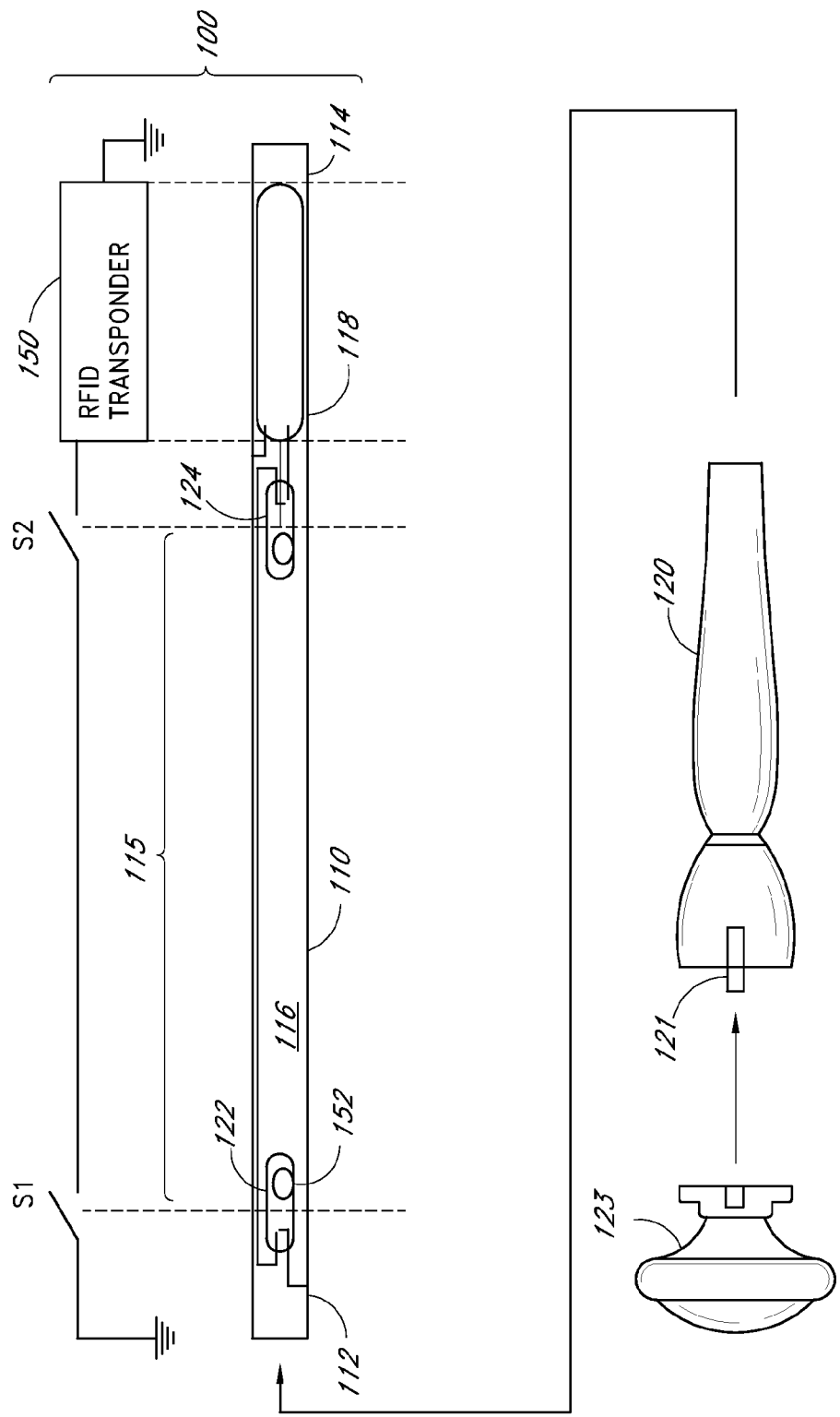
FIG. 1 is a schematic illustration of one embodiment of an interactive wand toy having features and advantages in accordance with embodiments of the present invention.

For convenience of description and for better clarity and understanding of the invention similar elements to those previously described may be identified with similar or identical reference numerals. However, not all such elements in all embodiments are necessarily identical as there may be differences that become clear when read and understood in the context of each particular disclosed preferred embodiment.

Interactive Wand

A wand is provided that allows play participants to electronically and "magically" interact with their surrounding play environment simply by pointing or using their wands in a particular manner to achieve desired goals or produce desired effects within the play environment. Use of the wand may be as simple as touching it to a particular surface or "magical" item within a suitably configured play environment or it may be as complex as shaking or twisting the wand a predetermined number of times in a particular manner and/or pointing it accurately at a certain target desired to be "magically" transformed or otherwise affected.

For example, various wand-compatible receivers may be distributed throughout a play facility that will allow wand users to activate various associated play effects and/or to play a game using the wand. As play participants play and interact within each play environment they learn more about the "magical" powers possessed by the wand and become more adept at using the wand within various game contexts to achieve desired goals or desired play effects. Optionally, play participants may collect points or earn additional magic levels or ranks for each play effect or task they successfully achieve. In this manner, play participants may compete with one another to see who can score more points and/or achieve the highest magic level.

FIG. 1 illustrates the basic construction of one preferred embodiment of an interactive "magic" wand toy 100 having features and advantages in accordance with the present invention. While a magic wand is specifically contemplated and described herein as the most preferred embodiment of the invention, those skilled in the art will readily appreciate from the disclosure herein that the invention is not limited to wands, but may be carried using any number or variety of other objects and toys for which it may be desirable to imbue special "magic" powers or other functionalities described herein. Other suitable magical objects and toys may include, for example and without limitation, ordinary sticks, tree branches, flowers, swords, staffs, scepters, whips, paddles, numb chucks, cricket bats, baseball bats, various sporting balls, brooms, feather dusters, paint brushes, wooden spoons, chop sticks, pens, pencils, crayons, umbrellas, walking canes, candy canes, candle sticks, candles, tapers, musical instruments (for example, flutes, recorders, drum sticks), books, diaries, flashlights, telescopes, kaleidoscopes, laser pointers, ropes, tassels, gloves, coats, hats, shoes and other clothing items, fishing rods and simulated fishing rods, dolls, action figures, stuffed animals, rings, bracelets necklaces and other jewelry items, key chain trinkets, lighters, rocks, crystals, crystal balls, prisms, and various simulated play objects such as apples, arranges, bananas, carrots, celery and other fruits/vegetables. However, magic wands are particularly preferred because they are highly versatile, can transcend a wide variety of different play themes and play environments, and wands can be customized and personalized in their fabrication, assembly and finish as will be described herein in more detail.

As illustrated in FIG. 1, the wand 100 essentially comprises an elongated hollow pipe or tube 110 having a proximal end 112 and a distal end 114. An internal cavity 116 is preferably provided to receive and safely house various circuitry for activating and operating the wand and various wand-controlled effects (described later). Batteries, optional lighting, laser or sound effects and/or the like may also be provided and housed within cavity 116, if desired, as will be described in more detail later. While a hollow metal or plastic tube 110 is preferred, it will be appreciated that virtually any other mechanical structure or housing may be used to support and contain the various components and parts described herein, including integrally molded or encapsulated containment structures such as epoxy resins and the like. If a metal tube is selected, care must be taken to ensure that it does not unduly interfere with any of the magnetic, RFID or RF/IR devices described herein. Thus, for example, any RF antennas should preferably be mounted near or adjacent an end opening and/or other opening of the tube 110 to ensure adequate operating range and desired directionality.

The proximal end 112 of tube 110 is preferably adapted to secure the tube 110 to an optional handle 120. The handle 120 may further include securement means, such as threaded stud 121, snap latches, mating magnets or the like, for receiving and securing an optional decorative knob 123. For example, knobs 123 may be purchased, selected and/or earned by play participants as they advance in a game and/or when they play different games. The distal end 114 of the wand is preferably fitted with an RFID (radio frequency identification) transponder or tag 118 that is operable to provide relatively short-range RF communications (less than about 200 cm) using one or more RFID reader units or reader/writer units, described in more detail later. The transponder 118 contains certain electronics comprising a radio frequency tag pre-programmed with a unique person identifier number ("UPIN"). The UPIN may be used to identify and track individual wands and/or play participants. Optionally, each tag may also include a unique group identifier number ("UGIN") which may be used to match a defined group of individuals having a predetermined or desired relationship.

The RFID transponder is preferably used to store certain information identifying each play participant and/or describing certain powers or abilities possessed by an imaginary role-play character. For example, players may advance in a magic adventure game by finding clues, casting spells and solving various puzzles presented. Players may also gain (or lose) certain attributes, such as magic skills, magic strength, fighting ability, various spell-casting abilities, combinations of the same or the like, based on game play, skill-level and/or the purchase of collateral play objects. Some or all of this information is preferably stored on the RFID transponder 118 so that the character attributes may be easily and conveniently transported to various compatible play facilities, games, video games, home game consoles, hand-held game units, and the like. Alternatively, only the UPIN and/or UGIN are stored on the transponder 118 and all other desired information is stored on a computer-accessible database indexed by UPIN and/or UGIN.

Operation of the transponder 118 (and/or other wireless communication devices described later) is preferably controlled by internal activation circuitry 115 comprising, in the particular embodiment illustrated, a pair of series-connected mercury tilt sensors 122 and 124 (represented in the corresponding schematic diagram as switches S1 and S2, respectively). As illustrated in FIGS. 2A and 2B each mercury tilt sensor 122, 124 comprises a sealed, evacuated glass bulb 130 within which is contained a small ball of liquid mercury. A pair of electrical leads 134 extends through the glass bulb 130 at the sealed end thereof and form closely spaced contacts 136. In one orientation (for example, FIG. 2B) the ball of mercury 132 is drawn by gravity to cover or envelope the contacts 136, thus completing the electrical circuit and closing the switch S1/S2 (ON state). In all other orientations (for example, FIG. 2A) the ball of mercury 132 does not contact or envelope both contacts 136 and, thus, the circuit remains open (OFF state). The particular orientation and tilt angle required to trigger either ON or OFF conditions will depend on the size of the glass bulb 130, amount of contained mercury 132 and the size and spacing of contacts 136. If mercury sensors are used, preferably they are encased in a metal and/or epoxy jacket so as to ensure against breakage and possible health and environmental hazards. Preferably, each mercury sensor is encased in epoxy within a sealed stainless steel ferule.

Alternatively, one or more micro-ball tilt sensors 136 or 138 may be used instead of or in addition to mercury switches 122, 124. For example, FIGS. 3A and 3B are schematic illustrations of a micro-ball tilt switch 136 (normally closed configuration) that may be adapted for use in accordance with an alternative embodiment of the invention. The tilt switches 136, 138 generally comprise upper and lower conductive enclosures 142, 146, respectively, separated by a suitable insulating material 144 and a conductive ball 140 that is free to move within. In one orientation (for example, FIG. 3A) the internally contained conductive ball 140 rests within an annular groove completing the electrical circuit between the top conductive enclosure 142 and bottom conductive enclosure 146 (ON state). But, when the sensor 136 is tilted by an amount greater than angle a (FIG. 3B), the ball 140 rolls away from the lower conductive enclosure 141 and, thus, the circuit is opened (OFF state).

FIGS. 4A and 4B are schematic illustrations of another embodiment of a micro-ball tilt switch 138 (normally open configuration) that may also be adapted for use in accordance with a further alternative embodiment of the present invention. In this case, in a first orientation (for example, FIG. 4A) an internally contained conductive ball 140 rests within a central conical pocket formed in the lower conductive enclosure 146 and is thereby prevented from contacting and completing electrical connection to the upper conductive enclosure 142 (OFF state). But, when the sensor 138 is tilted by an amount greater than angle a (FIG. 4B) the ball 140 rolls out of the conical pocket, touching and completing the circuit with the upper conductive enclosure 142 (ON state). The particular orientation and range of tilt angles required to trigger either ON or OFF conditions of micro-ball sensors 136, 138 can be varied and/or adjusted to meet varying needs and skill levels of wand users.

Figure 5A:
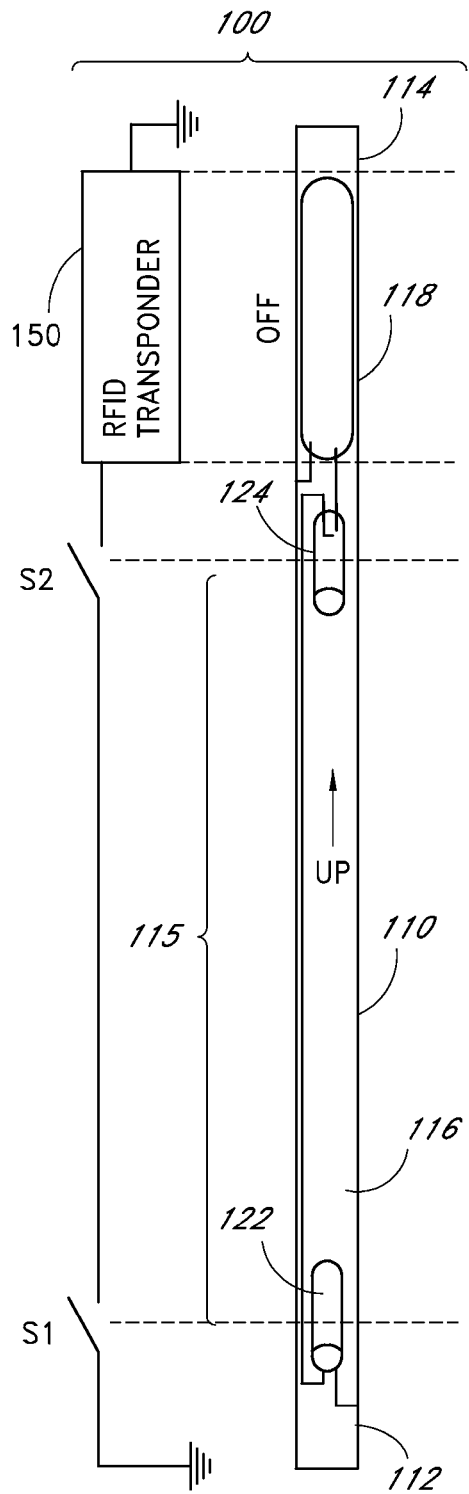
FIGS. 5A and 5B are schematic illustrations of the interactive wand toy of FIG. 1 in upward and downward orientations, respectively.
Figure 5B:
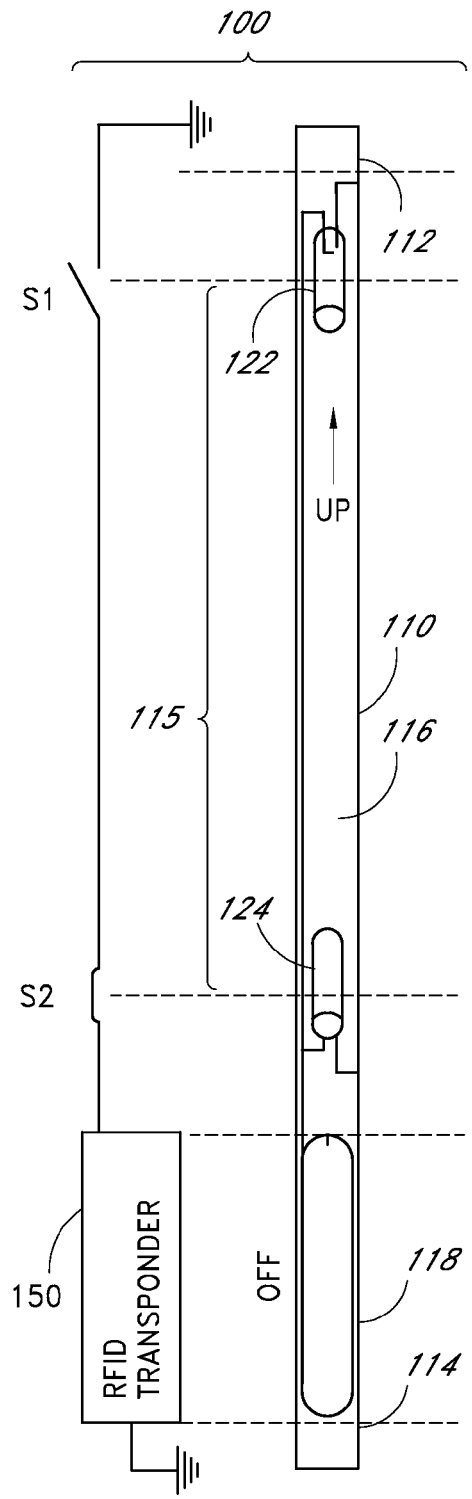

Referring to FIGS. 5A and 5B tilt sensors 122 and 124 are preferably oppositely oriented and spaced apart between opposite ends of the tube 110, as illustrated. Those skilled in the art will appreciate from the disclosure herein that in virtually any static position of the wand 100 at least one of tilt sensors 122, 124 will be in the OFF state. Thus, the transponder 118 can essentially only be activated when the wand is in a non-static condition or, in other words, when the wand is in motion. More specifically, the placement and orientation of the tilt sensors 122, 124 is preferably such that different accelerations or motions are required at the proximal and distal ends 112 and 114 in order to trigger both tilt sensors 122, 124 to their ON positions (or OFF positions, as the case may be) and, thus, to enable or activate transponder 118 (or other wireless communication devices described later).

As illustrated in FIG. 5A, when the wand 100 is held in an upright orientation, tilt sensor 122 (S1) is in its ON state (Static-ON) and tilt sensor 124 (S2) is in its OFF state (Static-OFF). Because the sensors are wired in series, the activation circuit 115 is OFF (open circuit) and the transponder 118 is disabled. Of course, those skilled in the art will readily appreciate from the disclosure herein that if transponder 118 requires a short circuit to disable, then the sensors 122 and 124 would preferably be wired in parallel and, in the orientation shown, the activation circuit 115 would be shorted through S1. On the other hand, when the wand 100 is held in an upside down orientation (FIG. 5B), tilt sensor 122 (S1) is in its OFF state (Static-OFF) and tilt sensor 124 (S2) is in its ON state (Static-ON) such that the activation circuit 115 remains OFF (open circuit) and the transponder 118 remains disabled. Again, if transponder 118 requires a short circuit to disable, then the sensors 122 and 124 would preferably be wired in parallel and, in the orientation shown, the activation circuit 115 would be shorted through S2.

Figure 6:
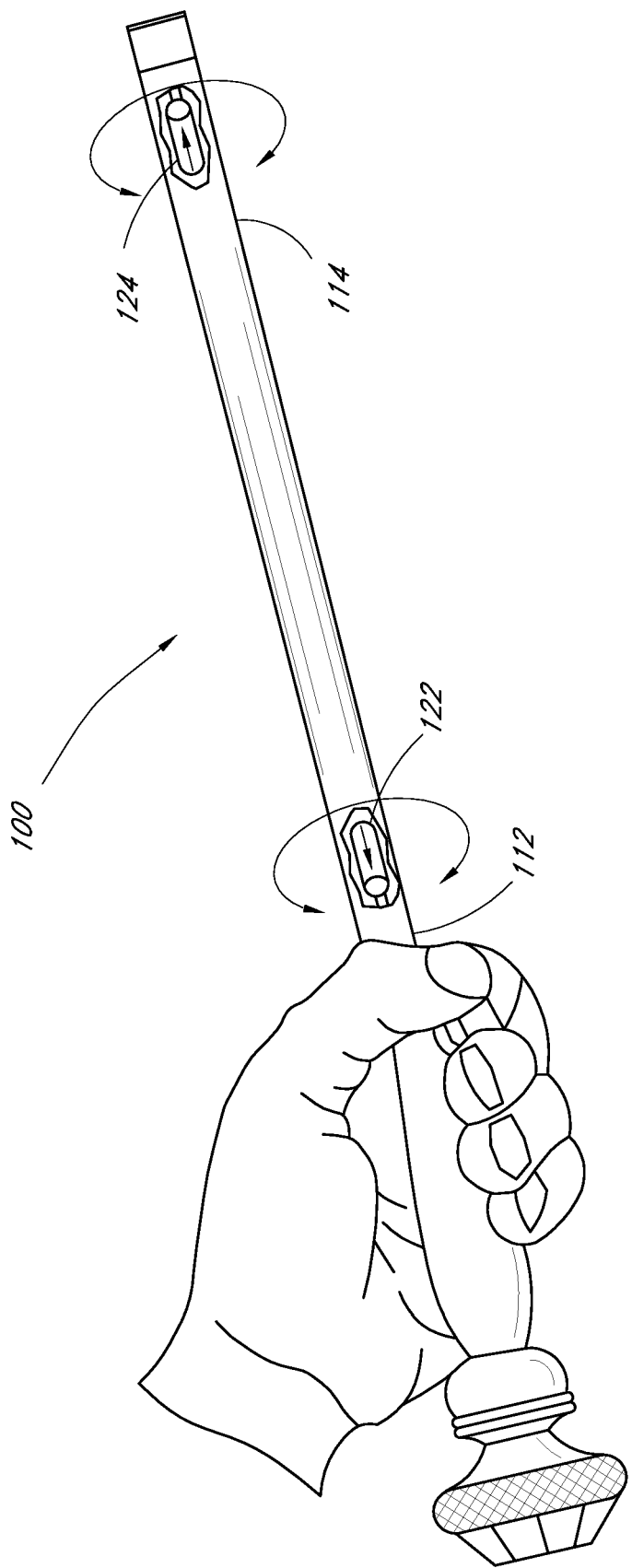
FIG. 6 is a partial perspective view of a user waiving the interactive wand toy of FIG. 1 in such a way to produce actuation thereof.

Advantageously, the wand activation circuit 115 in accordance with the above-described preferred embodiment is essentially only activated (and transponder 118 is only enabled) when a user actively moves the wand 100 in such particular way as to impart different transient acceleration forces on the distal and proximal ends of the wand 100 (or wherever the sensors are located if not at the distal and proximal ends). In particular, the transient acceleration forces must be sufficient enough at one end of the wand to overcome the gravitational forces acting on the upper sensor (Static-OFF), but not sufficient enough at the other end to overcome the gravitational forces acting on the lower sensor (Static-ON). This transient condition is illustrated in FIG. 6.

The wand activation circuit 115 (and, thus, transponder 118) is activated by holding the wand tilted slightly upward in one hand while gently and smoothly waiving it so that the distal end 114 of the wand follows an upward-cresting arcing pattern while the proximal end 112 remains relatively steady or follows a smaller, more gentle arcing pattern. The acceleration forces caused by the upward arcing motion at the distal end 114 counteract gravitational forces on the tilt sensor 124 and cause it to switch from its OFF state to its ON state. At the same time, the smaller arcing motion and acceleration forces at the proximal end 112 are not sufficient to counteract the gravitation forces on the tilt sensor 122 and, thus, it remains in its ON state. The result is that both sensors 122 and 124 are momentarily in their ON state and the wand activation circuit 115 thereby momentarily activates the transponder 118. The complexity and learnability of the described motion is similar to a golf swing. Only with this particular motion (or other similar learned motions) executed in a precise and repeatable fashion will the transient conditions be satisfied to cause both sensors 122 and 124 to switch to their ON state, thereby momentarily activating transponder 118. If the arcing motion is too fast or too pronounced, the lower sensor 122 will switch to its OFF state. On the other hand, if the arcing motion is too slow or too shallow, the upper sensor 124 will not switch to its ON state. Thus, successful operation of the wand 100 requires real skill, patience and training.

Those skilled in the art will readily appreciate and understand from the disclosure herein that various additional and/or alternative wand activation circuits can be designed and configured so as to respond to different desired wand activation motions. For example, this may be achieved by adding more sensors and/or by changing sensor positions and orientations. For example, one wand motion may trigger a first wand activation circuit (and a first wand effect) while a different wand motion may trigger a second wand activation circuit (and a second wand effect). The number, type and complexity of wand motions and corresponding wand activation circuits are limited only by design and cost considerations and user preferences. Most desirably 6-12 unique wand activation motions and corresponding wand activation circuits are provided. Of course, those skilled in the art will recognize from the disclosure herein that multiple wand activation circuits may share one or more sensors and/or other supporting circuitry and components, as required or desired. Alternatively, a single, multi-mode wand activation circuit may be provided that can respond to multiple wand motions.

The degree of difficulty and skill required to master each wand motion can preferably be adjusted to suit the age and skill-level of each user. Generally speaking, selecting tilt sensors 122, 124 having narrow activation ranges increases the difficulty level of the wand, as it makes it more difficult to satisfy the transient conditions required to turn each sensor to its ON or active state. Similarly, adding more sensors also increases the difficulty level, as it decreases the probability that all required transient conditions can be satisfied in a given moment. Placement and orientation of the sensors 122 and 124 (and any other sensors) can also make a difference in the degree of difficulty and skill required. For example, spacing the sensors closer together (for example, 3-5 cm apart) generally makes it more difficult to operate the wand as it becomes harder and harder to create different transient conditions relative to each sensor location. Conversely, spacing sensors farther apart (for example, 10-35 cm apart) makes it easier. An optimal sensor spacing is about 8-12 cm. Optionally, some or all of these degree-of-difficulty parameters can be adjusted or changed as skill-levels increase or as other circumstances warrant.

Of course, those skilled in the art will appreciate from the disclosure herein that the wand activation circuitry 115 is not limited to those including mercury or micro-ball tilt sensors, as illustrated, but may be practiced using a wide variety of other motion and/or tilt sensors and/or other supporting circuitry elements and components that are selected and adapted to the purposes described herein. These include, without limitation, impact sensors, micro-sensors, gyro-sensors, force sensors, micro-switches, momentum sensors, vibration sensors, gravity sensors, accelerometers, and all variety of reed switches (gravity, momentum, magnetic or otherwise). Moreover, any one or more of these and/or other similar sensor devices may also be used in conjunction with other supporting circuitry elements or components (either internal or external to the wand 100) as desired, including microprocessors, computers, controller boards, PID circuitry, input/output devices, combinations of the same and the like. Mercury and micro-ball tilt sensors as illustrated and described above are particularly preferred as they are relatively inexpensive and reliable.

Figure 7:
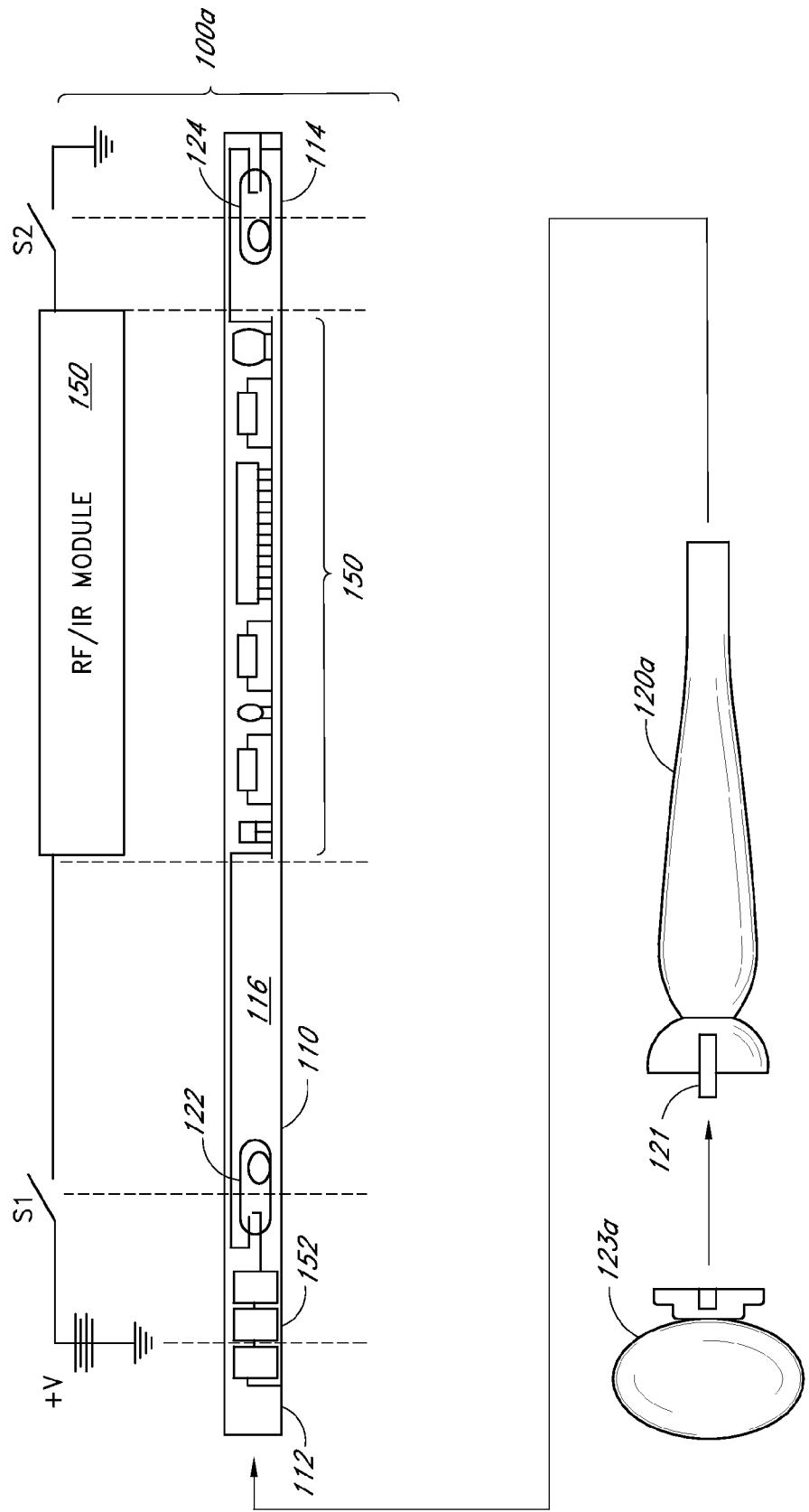
FIG. 7 is a schematic illustration of an alternative embodiment of an interactive wand toy including an optional RF/IR module and having features and advantages in accordance with the present invention.

FIG. 7 is a schematic illustration of an alternative embodiment of an interactive wand 100a including an optional RF/IR module adapted for long-range wireless communications (up to about 100 meters). Wand 100a is essentially the same as wand 100 illustrated and described above in connection with FIG. 1, except longer-range wand operation is achieved by replacing the RFID transponder 118 in wand 100 (FIG. 1) with an auxiliary RF/IR transmitter 150 (see FIGS. 22 and 25 accompanying discussion for circuit schematic and other details). If line of sight or directional actuation is desired, an infrared LED transmitter of the type employed in standard television remote controls may be provided instead of or in addition to the RF transmitter 118, as those skilled in the art will readily appreciate. In the latter case, a hole (not shown) would preferably be provided in the distal end 114 of the wand to accommodate the transmitting LED of the IR transmitter circuit. Of course, a wide variety of other wireless communications devices, as well as various optional sound and lighting effects may also be provided, as desired.

RF/IR transmitter module 150 and/or any other desired optional effects may be actuated using the wand activating circuit 115 substantially as illustrated and described above in connection with FIGS. 1-6. As illustrated in FIG. 7, tilt sensors 122, 124 (S1/S2) are wired in series with the RF/IR module, between batteries 152 (voltage source V+) and ground (all or part of tube 110). Thus, RF/IR module 150 is powered when sensors 122 and 124 are both in their ON state (switches S1 and S2 are both closed). Again, this transient state can essentially only be achieved when a skilled user actively moves the wand 100a in such particular way as to impart different transient acceleration forces on the distal and proximal ends of the wand 100a, as illustrated and described above in connection with FIG. 6. Other than as noted above it will be understood that the wand 100a is in all other material respects essentially the same as wand 100 illustrated and described in connection with FIGS. 1-5. Note that the handle 120a and knob 123a are slightly modified, as these elements are preferably uniquely customized/personalized for each wand and/or wand user as will be discussed in more detail later.

Furthermore, the wand activation circuitry 115 may advantageously comprise a microprocessor that communicates with the sensors 122, 124 and the transmitter module 150. In one embodiment, the microprocessor receives at least one signal from the sensors 122, 124 indicative of the state of the sensors. For instance, the microprocessor may determine when each of the sensors 122, 124 are in an ON or an OFF state or when one of the sensors 122, 124 switches states. Based on the states of the sensors 122, 124, the microprocessor then outputs a signal to the transmitter module 150 that causes activation or deactivation of the transmitter module 150.

In an embodiment, the microprocessor is capable of measuring a duration of time related to the operational states of the sensors 122, 124. For example, the microprocessor may use a clock signal or an external timer to determine the duration of time during which at least one of the sensors 122, 124 is in an ON state. The microprocessor may then use this duration of time when outputting a signal to the transmitter module 150. For example, the microprocessor may correlate the duration of time that a sensor 122, 124 is activated (for example, in an ON state) with an intensity, level, or type of a "spell" being cast by the user. For instance, if the user, while "casting a spell," is able to move the wand 100 so as to keep at least one of the sensors 122, 124 activated for a certain period of time, the microprocessor may assign a particular level or intensity to the spell being cast. Thus, the microprocessor may output different signals, which represent different spells or spell intensities, to the transmitter module 150 based on the length of time of the sensor activation. In one embodiment, the microprocessor may associate longer durations of sensor activation with higher intensity spells.

In yet other embodiments, the microprocessor calculates the duration of time between successive activations, or triggering, of the sensors 122, 124. For example, the microprocessor may determine how much time passes between the activation of the sensor 122 and the activation of the sensor 124, which are caused by the user's operation of the wand 100. For instance, the microprocessor may associate simultaneous or shorter durations of time between the activations of the two sensors 122, 124 with a more advanced, or higher-level, spell. Thus, the user that operates the wand 100 so as to activate each of the sensors 122, 124 within a relatively short period of time is able to cast higher-level spells. On the other hand, if there is a greater delay between the activations of the sensors 122, 124, the microprocessor assigns a lower intensity level to the spell being cast. In yet other embodiments, the time during or between the sensor activations is used by the microprocessor to determine which of a variety of spells is achieved by the user.

In other embodiments, the microprocessor may compare the duration of time of sensor activation or time between successive activations, to a predetermined time. For example, if the duration of time between successive activations is less than the predetermined time, the "spell" may be assigned a higher intensity level. If the duration of time between successive activations is greater than the predetermined time, the "spell" may be assigned a higher lower level. In addition, in some embodiments, the microprocessor does not calculate the specific value of the duration of time but determines if the duration of time exceeds or does not exceed a predetermined time.

In yet other embodiments of the invention, the duration of time during or between activation of the sensors 122, 124 is output to a receiver external to the wand 100. The receiver then processes the duration of time in determining which effect, or which level of an effect, is caused by the particular wand activation motions and associated duration(s) of time. In yet other embodiments, the foregoing microprocessor may be used in a wand 100 comprising a transponder 118 instead of, or in combination with, the transmitter module 150.

In another embodiment, the microprocessor accesses a look-up table that associates specific durations of time, or ranges of durations of time, with the intensity or the type of the spell being cast. For example, the look-up table may associate durations of time less than 0.1 seconds between successive sensor activations with a higher level spell, durations of time from 0.1 to 0.2 seconds with a mid-level spell, and durations of time greater than 0.2 seconds with a lower level spell. In one embodiment, the look-up table is stored in a memory, such as for example a read-only memory (ROM), on the wand 100. The look-up table may be internal or external to the microprocessor. In yet other embodiments, the look-up table may be accessible by the receiver of the signal from the wand 100.

FIG. 8 is a schematic illustration of a further alternative embodiment of an interactive wand toy including an optional magnetic inductance energy source. Wand 100b is essentially the same as wand 100 illustrated and described above in connection with FIG. 1, except that batteries 152 are replaced with a magnetic inductance energy generator 162. The magnetic inductance energy generator 162 comprises an inductance coil L1 sized and arranged such that when it is exposed to a fluctuating magnetic field (for example, a moving permanent magnet 164 rubbed back and forth and/or an externally generated electromagnetic field) an alternating current is generated. This generated current is rectified by diode D1 or, alternatively, a full wave bridge rectifier (not shown), and charges preferably an electrolytic capacitor C1 until it reaches a predetermined operating voltage V+. If desired, a voltage regulator device, such as a zener diode (not shown) and/or active regulation circuitry may be added to stabilize and increase the efficiency of the magnetic inductance energy generator 162.

Alternatively, those skilled in the art will appreciate from the disclosure herein that a various magnetic field effect sensors, such as Wiegand sensors and the like, may readily be used in place of or in addition to inductor L1 where, for example, it is desired to increase the energy-generating efficiency of the circuit 162. For example, U.S. Pat. No. 6,191,687 to Dlugos discloses a Wiegand effect energy generator comprising a Wiegand wire that changes its magnetic state in response to being exposed to an alternating magnetic field. The Wiegand wire has core and shell portions with divergent magnetic properties. The magnetic properties of the wire are such that it produces an output power signal that corresponds to the strength and rate of change of a magnetic field to which the Wiegand wire is exposed. Such energy pulses generally are between about 5 and 6 volts and 10 microseconds in width. Such energy pulses have sufficient voltage and duration to power a low power transmitter such as RF/IR module 150. One suitable Wiegand sensor that may be utilized in accordance with the present invention is the series 2000 sensor sold by EHD Corp. The Series 2000 Wiegand sensor produces pulses in response to alternating magnetic fields or permanent magnets that pass near the sensor.

The energy generating circuit 162 is preferably such that the wand 100b has no movable parts and requires no maintenance such as replacing batteries or the like over its anticipated life. All energy is generated and stored by rubbing the wand back and forth with a permanent magnet and/or by placing the wand within an externally generated electromagnetic field. Preferably, the inductor L1 (or Wiegand wire) and capacitor C1 are selected such that 5-10 seconds of exposure to an external fluctuating magnetic field will fully charge the capacitor C1, thus enabling the wand RF/IR transmitter to be activated at least once and preferably 5-20 times without having to recharge. Advantageously, the absence of replaceable batteries or other visible electronic technology significantly increases the reality and full immersion experience of the magical fantasy and gives users the feeling of practicing, performing and mastering "real" magic using a "real" magic wand 100b. Optionally, a non-replaceable permanent rechargeable battery and/or a factory replaceable battery (not shown) may be provided in place of or in addition to the energy generating circuit 162 where it is desired to provide long-term energy storage. Other than replacing batteries 152 with magnetic inductance energy generator 162, the wand 100b is in all other material respects essentially the same as wand 100a illustrated and described above in connection with FIG. 7. Note that the handle 120b and knob 123b are slightly modified, as these elements are preferably uniquely customized/personalized for each wand and/or wand user as will be discussed in more detail later.

FIG. 9 is a schematic illustration of a further alternative embodiment of an interactive wand toy including an optional piezoelectric generator. Wand 100c is essentially the same as wand 100b illustrated and described above in connection with FIG. 8, except that magnetic inductance energy generator 162 has been replaced with a piezo generator 166 and power supply 168.

Piezoelectricity refers to a unique property of certain materials such as quartz, Rochelle salt, and certain solid-solution ceramic materials such as lead zirconate-titanate (Pb(ZrlxTix)03) ("PZT") that causes induced stresses to produce an electric voltage or, conversely, that causes applied voltages to produce an induced stress. In a "generator" mode, electricity is developed when a piezoelectric ("piezo") crystal is mechanically stressed. Conversely, in a "motor" mode, the piezo crystal reacts mechanically when an electric field is applied.

PZT is one of the leading piezoelectric materials used today. It can be fabricated in bimorph or unimorph structures (piezo elements), and operated in flexure mode. These structures have the ability to generate high electrical output from a source of low mechanical impedance (conversely, to develop large displacement at low levels of electrical excitation). Typical applications include force transducers, spark pumps for cigarette lighters and boiler ignition, microphone heads, stereophonic pick-ups, etc.

It is known that piezo elements can be used to generate small a mounts of useful energy from motion. For example, U.S. Pat. No. 3,456,134 to Ko, incorporated in its entirety by reference herein, discloses a piezoelectric energy converter for electronic implants, wherein body motion is converted into electrical energy using a piece of piezoelectric PZT in the form of a resonant cantilever beam. See also, U.S. Pat. No. 6,438,193 to Ko et. al, which discloses a similar piezo generator for self-powered tire revolution counter. Such piezo generators have particular application and benefit to battery-less toys and wands of the type disclosed and described herein.

Figure 10:
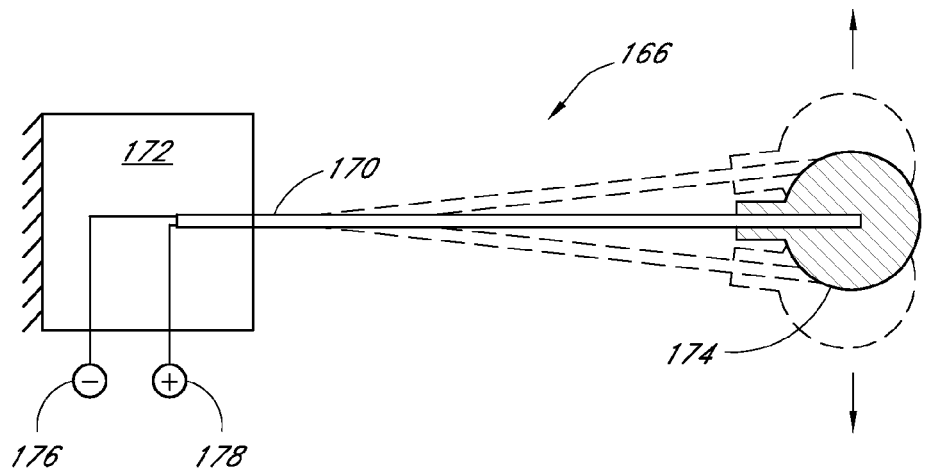
FIG. 10 is a schematic illustration of a piezo armature for use in a piezo generator having features and advantages in accordance with the present invention.

FIG. 10 is a cross-sectional view of such a piezo generator 166 comprising a "bimorph" piezo element 170 rigidly mounted at one end forming a cantilever beam. A "bimorph" is a flexing-type piezoelectric element, which has the capacity for handling larger motions and smaller forces than single piezoelectric plates. The bimorph piezo element 170 comprises two planar piezo crystals secured together face-to-face with a shim or vane therebetween. Mechanical bending of the element 170 causes it to produce a corresponding voltage between output electrodes 176, 178.

Figure 11:
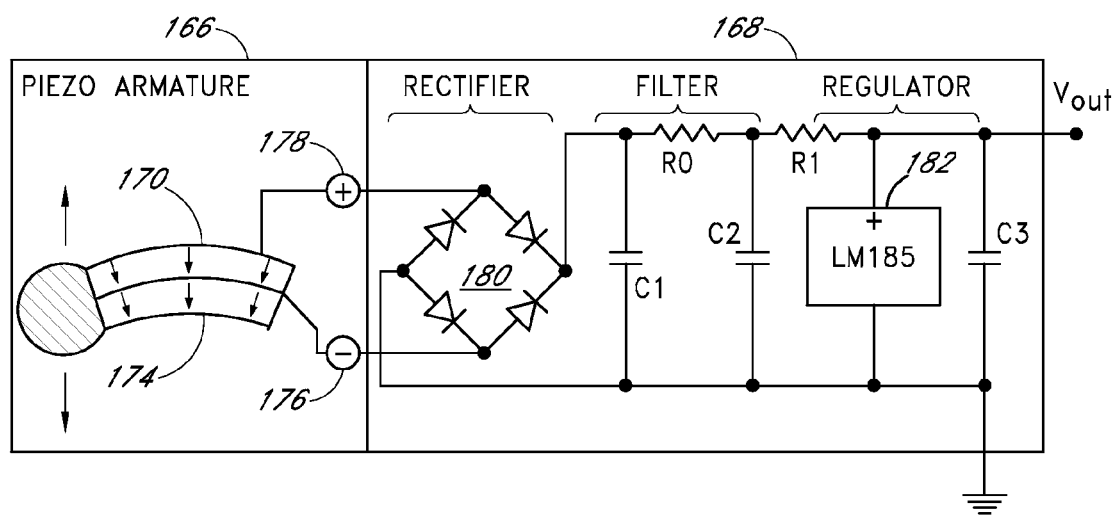
FIG. 11 is a schematic circuit diagram of the piezo generator and power supply of FIG. 9 having features and advantages in accordance with the present invention.

The piezoelectric element 170 is mounted and enclosed within the distal end of tube 110 (FIG. 9) and its free end is loaded with a small weight 174 selected to resonate at a suitable frequency corresponding to the likely or anticipated movement of the wand 100c. A typical measured oscillation frequency is on the order of 10-100 Hz. As the wand is moved periodically, the piezo element 170 vibrates back and forth producing electrical pulses. These electrical pulses are then rectified by a full wave bridge rectifier 180 (FIG. 11), are filtered by a filter circuit comprising capacitors C1, C2 and resisters R0, R1 and are stored in an energy storage capacitor C3, preferably a low-voltage electrolytic capacitor.

In order to draw maximum power from the piezo element 170, the power supply circuit 168 "load" impedance preferably is selected to match the output impedance of the piezo element 170. In order to minimize the ripple effect (peak-topeak magnitude of rippling imposed on the nominal DC voltage level) energy storage capacitor C3 is preferably selected to be as large as possible, given available space constraints. To improve the stability of the power-supply an optional voltage regulator 182 may be added. For example, an LM185 IC band-gap voltage regulator may be chosen.

The piezo generator and power supply circuits 166, 168 preferably have sufficient power output under normal operating conditions such that the wand 100c requires no other internal energy sources such as replaceable batteries or the like. All energy is generated and stored by normal motion of the wand during use, e.g. during spell casting or during normal walking or running while carrying the wand 100c. Preferably, the energy storage capacitor C3 is selected such that when fully charged, it provides sufficient stored energy to enable the wand to be activated at least once and preferably 50-100 times without having to recharge. Advantageously, the absence of replaceable batteries or other visible electronic technology significantly increases the reality and full immersion experience of the fantasy and gives users the feeling of practicing, performing and mastering "real" magic using a "real" magic wand 100c. Optionally, a non-replaceable permanent rechargeable battery and/or a factory replaceable battery (not shown) may be provided in place of or in addition to the energy generating circuit 166 where it is desired to provide long-term energy storage. The wand 100c in all other material respects is essentially the same as wand 100b illustrated and described above in connection with FIG. 8. Note that the handle 120c and knob 123c are slightly modified, as these elements are preferably uniquely customized/personalized for each wand and/or wand user as will be discussed in more detail later.

Figure 12:
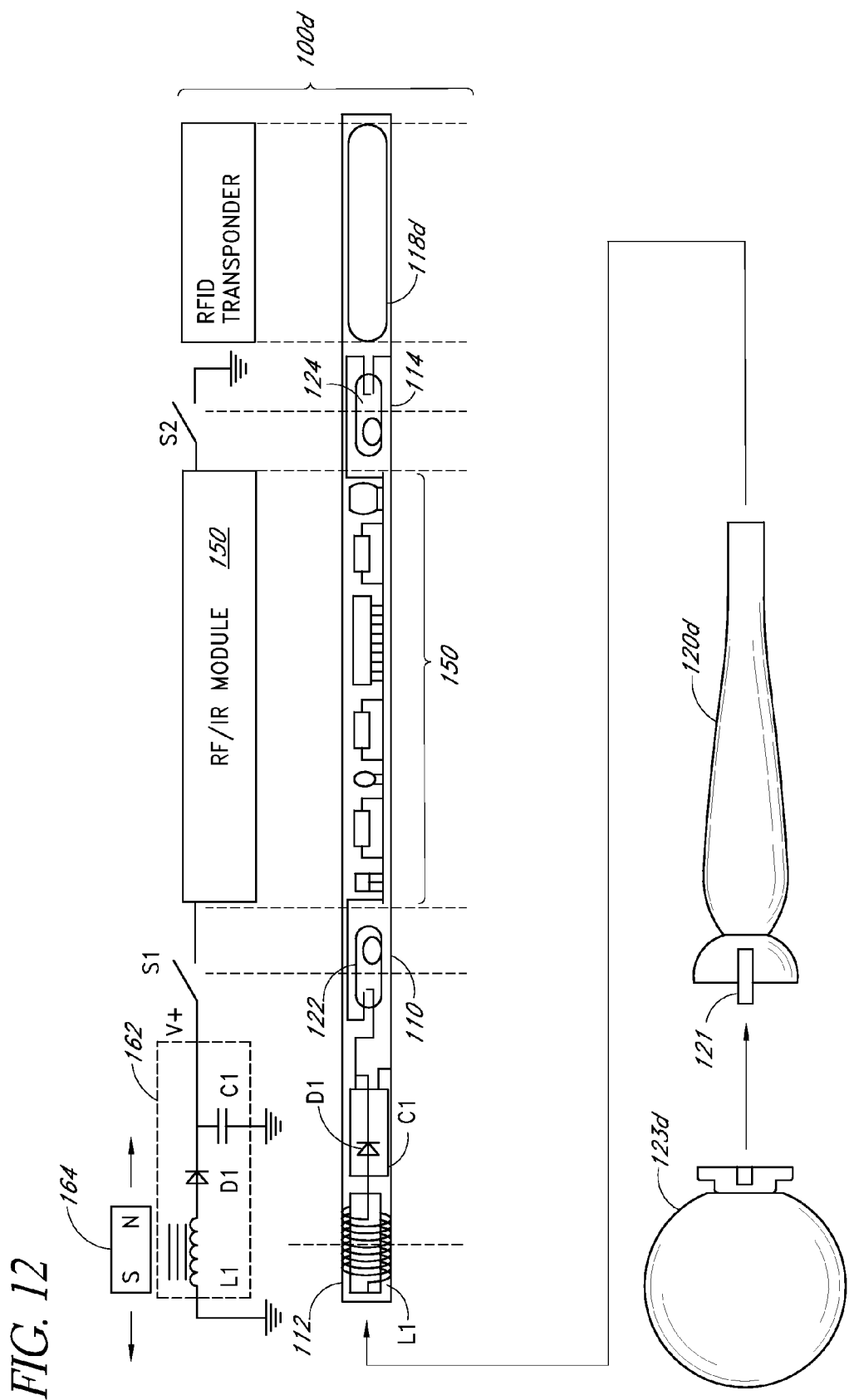
FIG. 12 is a schematic illustration of a further alternative embodiment of an interactive wand toy including an RF/IR module and optional RFID transponder having features and advantages in accordance with the present invention.

FIG. 12 is a schematic illustration of a further alternative embodiment of an interactive wand toy including an RF/IR module and optional RFID transponder. Wand 100d is essentially the same as wand 100b illustrated and described above in connection with FIG. 8, except for the addition of optional RFID transponder 118d.

As with the RFID transponder 118 illustrated and described above in connection with FIG. 1, RFID transponder 118d is operable to provide relatively short-range RF communications (less than about 200 cm) using one or more RFID reader units or reader/writer units, described in more detail later. The transponder 118d also preferably contains certain electronics comprising a radio frequency tag pre-programmed with a unique person identifier number ("UPIN"). The UPIN may be used to identify and track individual wands and/or play participants. Optionally, each tag 118d may also include a unique group identifier number ("UGIN") which may be used to match a defined group of individuals having a predetermined or desired relationship.

The RFID transponder is preferably used to store certain information identifying each play participant and/or describing certain powers or abilities possessed by an imaginary role-play character. For example, players may advance in a magic adventure game by finding clues, casting spells and solving various puzzles presented. Players may also gain (or lose) certain attributes, such as magic skills, magic strength, fighting ability, various spell-casting abilities, combinations of the same or the like, based on game play, skill-level and/or the purchase of collateral play objects. Some or all of this information is preferably stored on the RFID transponder 118d so that the character attributes may be easily and conveniently transported to various compatible play facilities, games, video games, home game consoles, hand-held game units, and the like. Alternatively, only the UPIN and UGIN are stored on the transponder 118 and all other desired information is stored on a computer-accessible database indexed by UPIN and/or UGIN.

If desired, RFID transponder 118d may be electronically interlocked and controlled by a corresponding wand activation circuit such as illustrated and described above in connection with FIG. 1. More preferably, however, the RFID tag 118d is not interlocked, but is always activated. In this manner, transponder 118d can be easily read at short range using an RFID reader/writer (described later) to sense and track play participants and/or to activate various simple wand effects. Longer range RF communications via RF/IR module 150 are preferably only enabled when an appropriate wand activation motion is executed as described above in connection with FIGS. 1-6. The wand 100d in all other material respects is essentially the same as wand 100b illustrated and described above in connection with FIG. 8. Note that the handle 120d and knob 123d are slightly modified, as these elements are preferably uniquely customized/personalized for each wand and/or wand user as will be discussed in more detail later.

Figure 13:
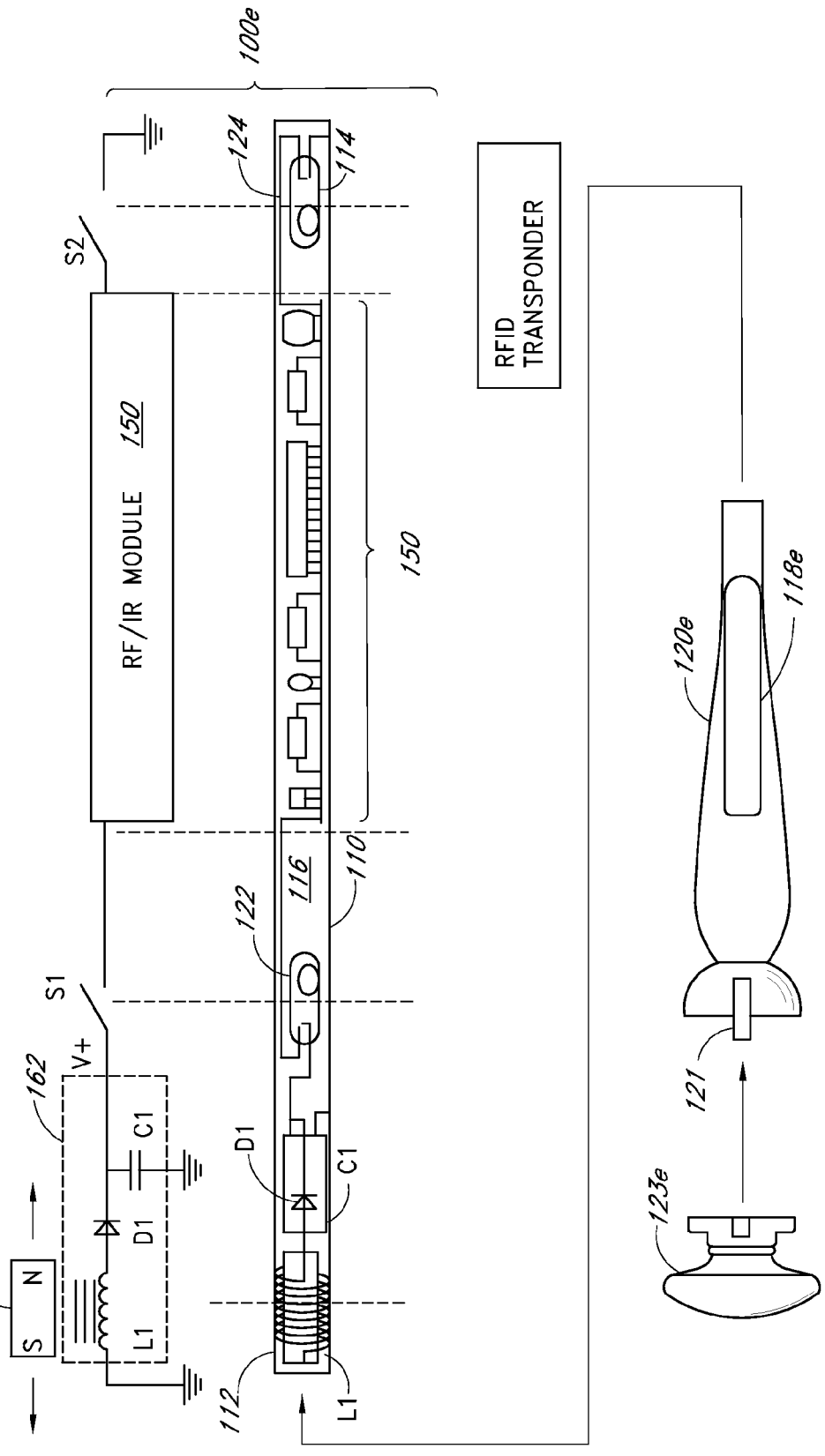
FIG. 13 is a schematic illustration of a further alternative embodiment of an interactive wand toy including an RF/IR module and optional RFID transponder having features and advantages in accordance with the present invention.

FIG. 13 is a schematic illustration of a further alternative embodiment of an interactive wand toy including an RF/IR module and optional RFID transponder. Wand 100e is essentially the same as wand 100d illustrated and described above in connection with FIG. 12, except for the location and placement of the RFID transponder 118e.

As with the RFID transponder 118d illustrated and described above in connection with FIG. 12, RFID transponder 118e provides relatively short-range RF communications using one or more RFID reader units or reader/writer units, described in more detail later. The transponder 118e also preferably contains certain electronics comprising a radio frequency tag pre-programmed with a unique person identifier number ("UPIN") and unique group identifier number ("UGIN"). Preferably, RFID tag 118e is always activated so that it can be easily read at short range using an RFID reader/writer (described later) to sense and track play participants and/or to activate various simple wand effects. Placing the RFID tag 118e in the handle 120e, allows for modular construction and functionality of a wand 100e as auxiliary handles may be interchanged having other unique RFID tags with unique stored information. Optionally, the tag-containing handle 120e and knob 123e may be omitted altogether in the case, for example, where a less expensive wand is desired.

As described above, longer range RF communications via RF/IR module 150 are preferably enabled only when an appropriate wand activation motion is executed as described above in connection with FIGS. 1-6. The wand 100e in all other material respects is essentially the same as wand 100d illustrated and described above in connection with FIG. 12. Note that the handle 120e and knob 123d are slightly modified, as these elements are preferably uniquely customized/personalized for each wand and/or wand user as will be discussed in more detail later.

In certain advanced applications, it is desirable to wirelessly communicate specific data and commands to achieve different or varied wand effects. For example, it may desirable to wirelessly send one command signal that turns a certain object (for example, a lamp) "OFF" and another command signal that turns an object "ON." As described above in connection with FIGS. 1-6, this functionality may be achieved using multiple wand activation circuits (or a single multi-mode circuit) responsive to various unique wand motions whereby each wand motion, if executed successfully, causes a different RF or IR signal to be transmitted to control or activate the desired effect (for example, turning a light ON or OFF or simulating the levitation of an object).

Figure 14A:
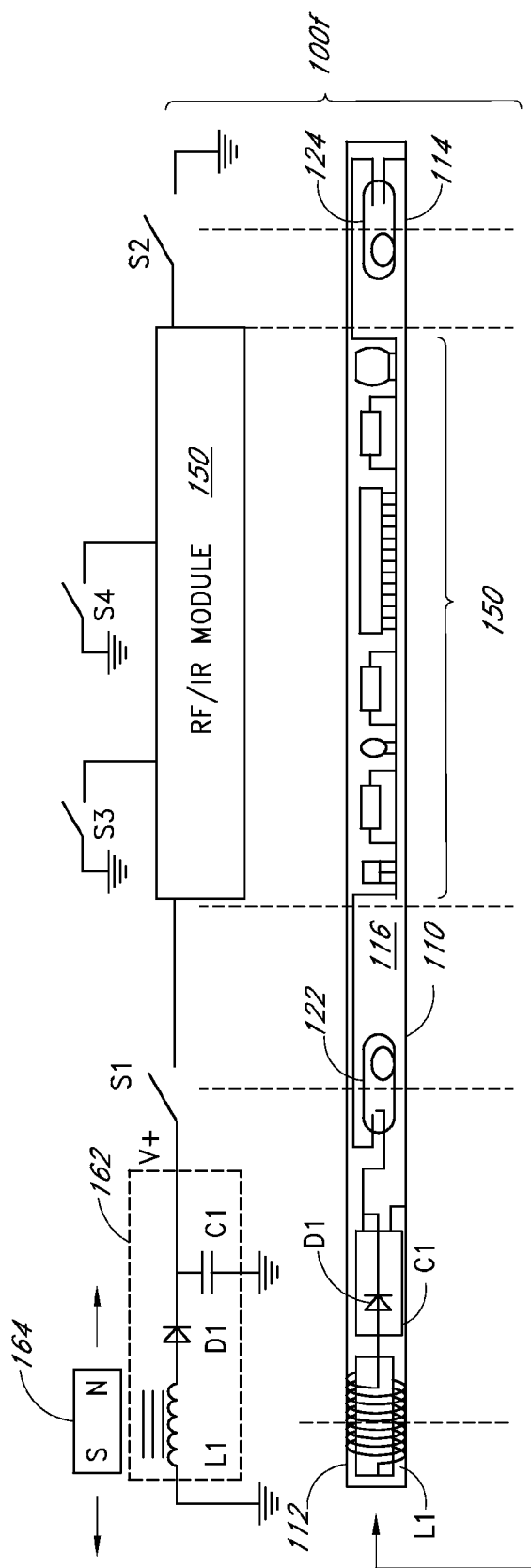
FIG. 14A is a schematic illustration of a further alternative embodiment of an interactive wand toy including optional orientation sensors having features and advantages in accordance with the present invention.

Another convenient way to achieve similar functionality is to load data bits representing specific desired commands directly into a data buffer of RF/IR module 150*f* (FIG. 14A) and then, using only a single wand activation circuit and a single learned wand motion, cause an RF or IR signal to be transmitted, thereby carrying the command signal and data to an RF or IR receiver and associated effect. Thus, for example, one or more tilt sensors 192, 194 (illustrated schematically as switches S3/S4) may be provided in a convenient location within the wand 100*f* (for example, within the handle 120). These sensors are preferably mounted and oriented such that axial rotation of the wand shaft 110 and/or wand handle 120*f* causes the sensors to alternately switch from their ON to their OFF state. As illustrated in the circuit schematic accompanying FIG. 14A, Each sensor controls one data input bit of the RF/IR module data bus (for example, S3, S4).

Figure 14B:
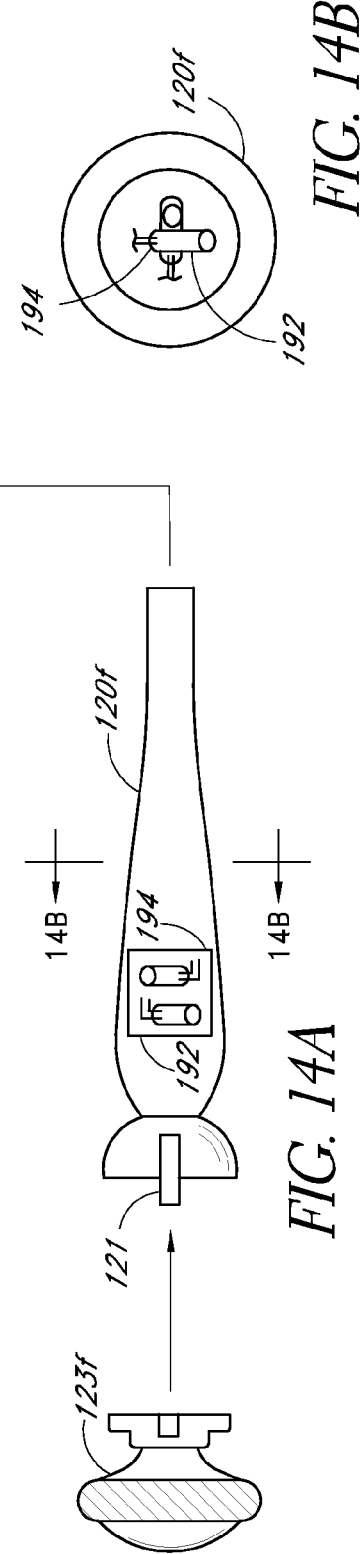
FIG. 14B is a detail transverse cross-sectional view of the handle portion of the interactive wand toy of FIG. 14A, illustrating the preferred placement and orientation of the optional orientation sensors and having features and advantages in accordance with the present invention.

Preferably, sensors 192, 194 are disposed at an angle of between about 60 and 120 degrees (most preferably about 90 degrees) from one another within a transverse plane of the wand (see, for example, FIG. 14B). Those skilled in the art will readily appreciate that in this manner, four possible wand orientations are possible resulting in four unique sensor pair states as follows: ON/ON; OFF/OFF; ON/OFF and OFF/ON. These four sensor states can represent, for example, four unique command signals sent using the RF/IR module 150*f*. The wand 100*f* in all other material respects is essentially the same as wand 100*b* illustrated and described above in connection with FIG. 8. Note that the handle 120*f* and knob 123*f* are slightly modified, as these elements are preferably uniquely customized/personalized for each wand and/or wand user as will be discussed in more detail later.

Where it is desired to send a larger number of unique command signals, various combinations of additional orientation sensors and/or wand activation circuits may be added, as desired. Alternatively, various dials, switches and/or other inputs may be provided for selecting from a number of unique wand commands or "spells." For example, in one preferred embodiment illustrated in FIGS. 15A-C a wand 100*g* is provided including a knob-actuated rotary switch 202 which directly loads up to 4 data bits (up to 16 possible unique codes) representing specific desired commands directly into a data buffer of RF/IR module 150*g* (FIG. 15A).

Figure 15C:
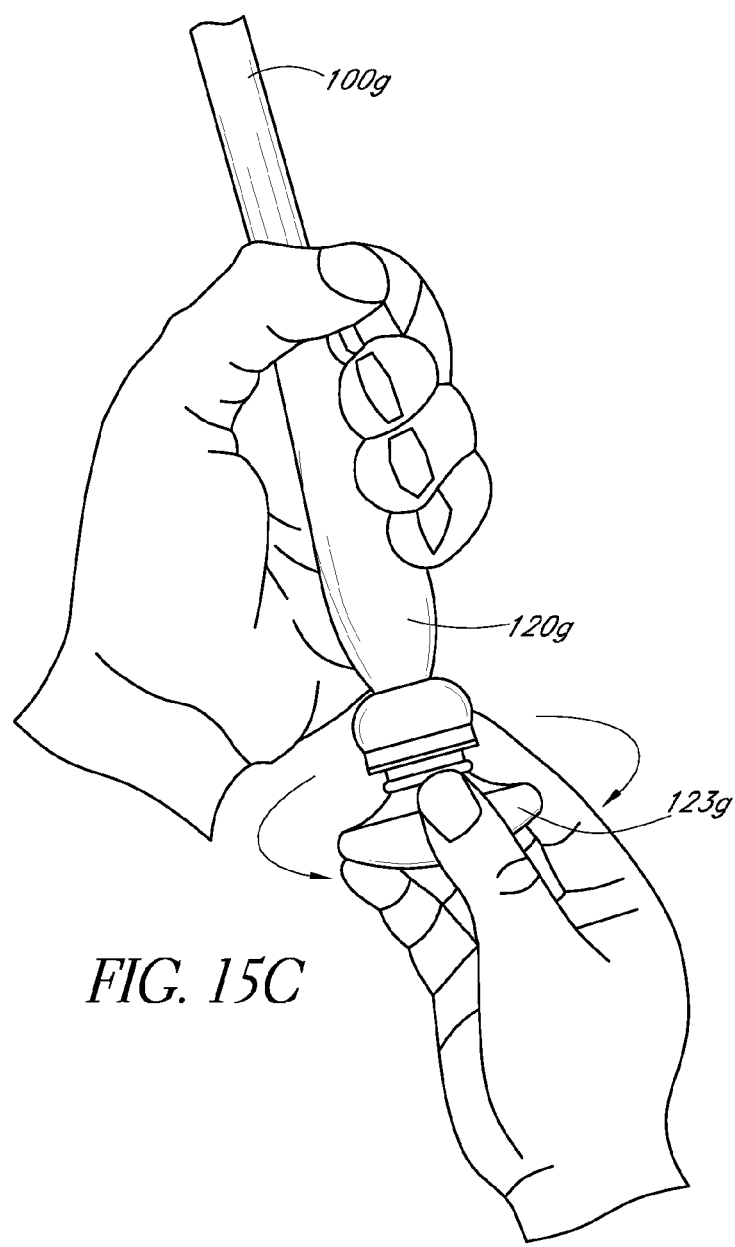
FIG. 15C is a partial perspective view of a user rotating the knob of the interactive wand toy of FIG. 15A in such a way to produce a desired wand operation or effect.
Figure 15D:
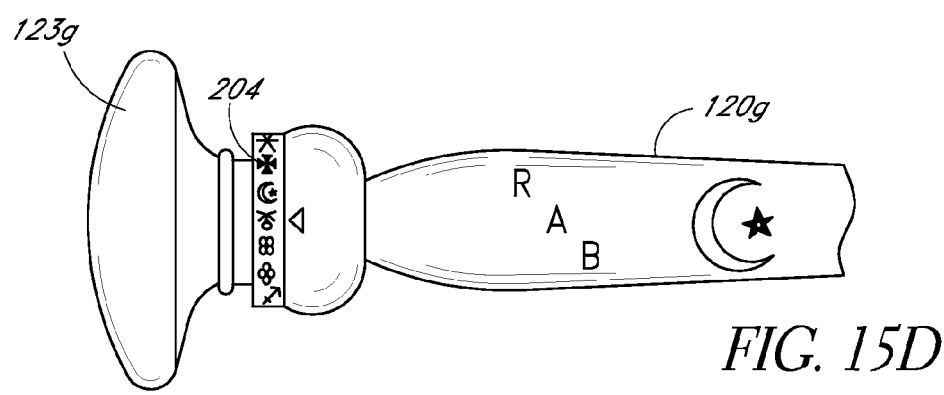
FIG. 15D is a detail view of the handle portion and rotatable knob of the interactive wand toy of FIGS. 15A and 15B.

As illustrated in FIG. 15C a user rotates the knob 123*g* and sets it to the desired spell represented by magic symbols 204 (FIG. 15D). Then, using only a single wand activation circuit and a single learned wand motion, the user causes an RF or IR signal to be transmitted, carrying the unique command signal/data to an RF or IR receiver, thereby controlling or activating an associated effect. Alternatively, a potentiometer may be used in conjunction with an A/D converter circuit instead of rotary switch 202 for selecting wand functions/spells. The wand 100*g* in all other material respects is essentially the same as wand 100*b* illustrated and described above in connection with FIG. 8. Note that the handle 120*g* and knob 123*g* are slightly modified, as these elements are preferably uniquely customized/personalized for each wand and/or wand user as will be discussed in more detail later.

FIG. 16A is a schematic illustration of a further alternative embodiment of an interactive wand toy including optional touch sensor elements for selecting one or more wand spell commands. Wand 100*h* is essentially the same as wand 100*f* illustrated and described above in connection with FIGS. 14A and 14B, except for the substitution of touch sensor elements 208, 210, 212 for tilt sensors 192, 194.

Touch sensor elements 208, 210, 212 (represented in the accompanying schematic as S3, S4, S5) comprise solid-state electronic switches (no buttons or moving parts) that are activated by the simple touch of a finger. Most preferably, these are solid state touch switches of the type illustrated and described in U.S. Pat. No. 4,063,111 to Dobler et al., the entire contents of which are incorporated herein by reference. As illustrated in FIG. 16B, each touch switch contact element 208, 210, 212 is preferably formed from a pair of conductive electrodes 211 surrounded by, and preferably flush with, an insulating material 213. If desired, the electrodes 211 may be shaped in the form of magic symbols or other shapes consistent with a desired magic theme, as illustrated. During use, the user's finger 217 is placed over the pair of electrodes 211 and thereby forms a portion of an electronic circuit to change the state of a corresponding solid state electronic switching device Q1, Q2, Q3 in communication therewith, such as a MOSFET or PNP transistor. The touch sensor is thereby actuated.

Each touch sensor preferably controls one data input bit of the RF/IR module data bus (for example, S3, S4, S5). One or more touch switches may be activated during a single wand transmission. Thus, those skilled in the art will readily appreciate that eight possible combinations of touch switch activations are possible corresponding to eight unique command input data sets as follows: ON/ON/ON; OFF/OFF/ON; ON/OFF/ON, OFF/ON/ON, ON/ON/OFF; OFF/OFF/OFF; ON/OFF/OFF, and OFF/ON/OFF These eight sensor states can represent, for example, eight unique command signals sent using the RF/IR module 150*h*.

Figure 16C:
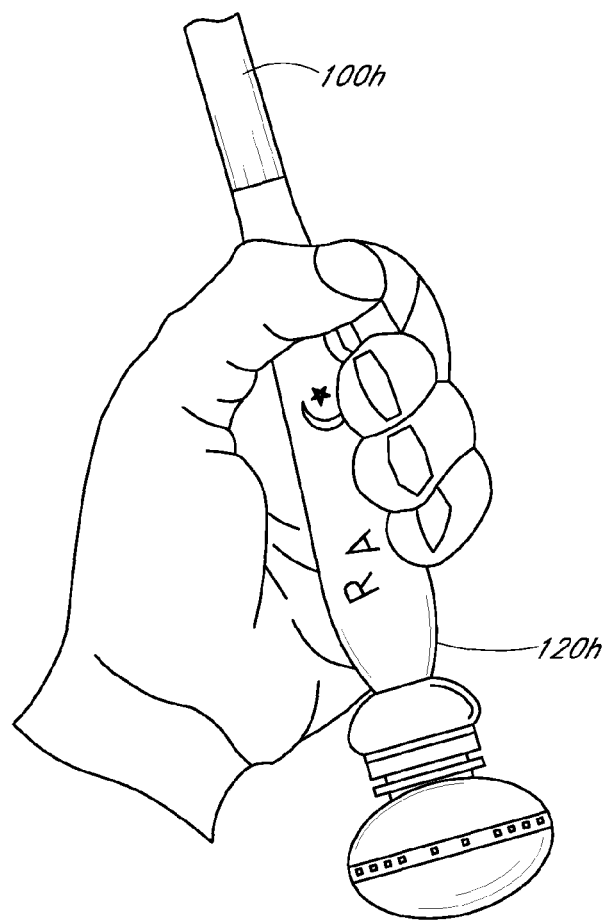
FIG. 16C is a partial perspective view of a user operating the touch-sensor-enabled interactive wand toy of FIG. 15A in such a way to produce a desired wand operation of effect.
Figure 16D:
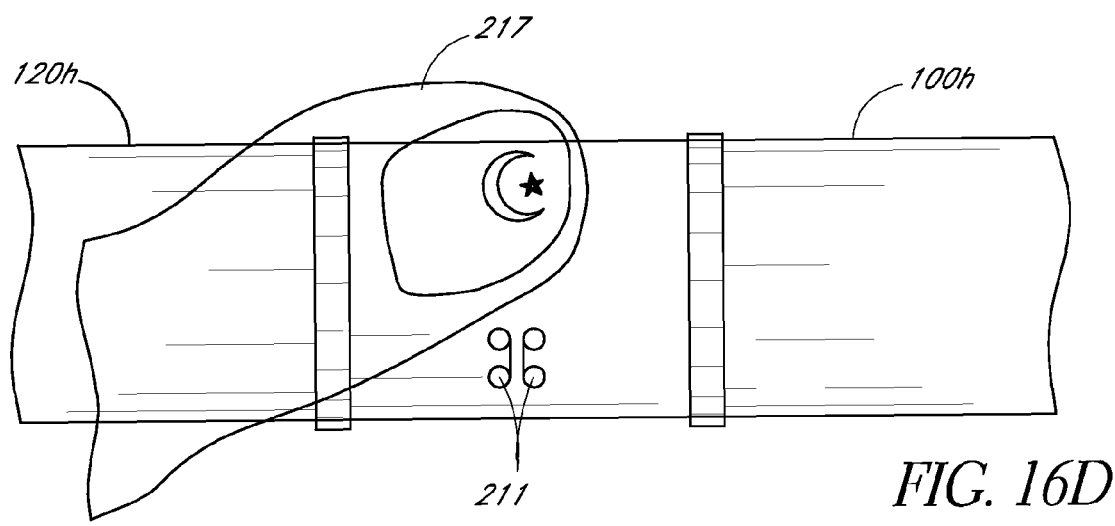
FIG. 16D is a detail view of the handle portion and touch sensor contact elements of the interactive wand toy of FIGS. 16A and 16C.

As illustrated in FIGS. 16C and 16D, a user may select a spell by touching one or more selected magic symbols. Then, while holding the fingers over the selected magic symbols and using only a single wand activation circuit and a single learned wand motion, the user causes an RF or IR signal to be transmitted, carrying the unique command signal/data to an RF or IR receiver, thereby controlling or activating an associated effect.

Optionally, wand 100*h* includes a magnetic tip 216, as illustrated in FIG. 16A. This can be especially useful and entertaining for close-range activation of various play effects, such as turning lights on/off, triggering special sound and/or lighting effects. For example, FIGS. 17A-17B are time-sequenced illustrations of one embodiment of a magnetically actuated lighting effect using the interactive wand toy 100*h* with optional magnetic tip 216. A magnetic reed switch 218 is provided in series between the desired lighting effect 220 and a power source (V+). The reed switch is constructed in the normal fashion. Contacts 222, 224 are normally open and, thus, the lighting effect 220 is in its OFF state. But, when the magnetic tip 216 of wand 100*h* is brought into relatively close proximity (2-3 cm) with the reed switch 218, contact elements 222, 224 are magnetized by the magnetic field lines and are drawn toward each other. This causes the contacts 222, 224 to immediately attract, closing the gap and completing the circuit to turn on the lighting effect 220. Of course, those skilled in the art will appreciate from the disclosure herein that various relays, power controllers and the like may be required or desirable to provide adequate control of larger, more complex effects. But all such effects, no matter how small/simple or large/complex, may be triggered with a simple reed switch 218 and a wand 100*h* having a magnetic tip 216, as described above.

The magnetic tip 216 is especially useful and synergistic in combination with the other disclosed functions and features of wand 100*h*. Thus, for example, as illustrated in FIG. 17C, a desired lighting effect is controlled by RF/IR receiver 250, which is adapted to receive an RF and/or IR command signal from wand 100h. The RF/IR receiver 250 (and/or the lighting effect 220) is also controlled by series-connected magnetic reed switch 218, as illustrated and described above (FIGS. 17A, 17B). Desirably, this allows a user to use the wand 100h and the magnetic tip 216 thereof to select one or more effects he or she wishes to control or activate. For example, the closure of the magnetic reed switch 218 sends an activation signal to RF/IR receiver 250. In response, the receiver initiates a timer (for example, 5-10 seconds) wherein its RF and/or IR receiver circuitry is activated and ready to receive one or more transmitted commands for controlling the associated effect 220. Thus, a user may select to control the lighting effect 220 by activating the reed switch 218 with the magnetic tip 216 of wand 100h. Then the user may cast a spell (cause the wand 100h to transmit an RF or IR command signal) that commands the RF/IR receiver 250 to turn the lighting effect ON or OFF, to change the lighting effect (for example, change its color or intensity), and/or launch a related effect (for example, simulated levitation of the lighting source or other desired effects). In this manner, users can maintain direct and precise control over any number of individual play effects as may be desired. The wand 100h in all other material respects is essentially the same as wand 100f illustrated and described above in connection with FIG. 14. Note that handle 120h and knob 123h are slightly modified, as these elements are preferably uniquely customized/personalized for each wand and/or wand user as will be discussed in more detail later.

While it is particularly preferred to provide batteryless RF-enabled, RFID-enabled or IR-enabled wand 100, those skilled in the art will recognize from the disclosure herein that the invention may be carried out in a variety of other ways that incorporate some or all of the inventive features disclosed and described herein. For example, wand activation circuit 115 may be implemented in a variety of other gaming and entertainment applications such as, for example, a wireless or hard-wired wand input device for a video game, computer game or home game console, an arcade or redemption challenge device, home-operated amusement device using simple bells and buzzers, or the like. Alternatively, some or all of the various circuitry and components described herein above may be externally implemented such that the wand 100 may not be entirely self-contained, but may rely on certain external components and circuitry for some or all of its functionality. Alternatively, some or all of the various circuitry and components described herein can be implemented in a user-wearable format such that various interactive play effects and the like, as described herein, may be actuated through particular hand or arm motions without the use of a wand.

Proximity Sensor

In yet another embodiment, the wand 100 further comprises a proximity sensor usable to provide a "hover" effect that is indicative of the initialization of a control interlock. When the proximity sensor in the wand 100 is moved with a particular distance of a receiver, such as the RF/IR receiver 150, and/or an effects controller, a "hover" effect occurs, such as, for example, the turning on of a light, the movement or vibration of an object, or any other perceptible signal (visual or audible) that notifies the user that a play effect may be initiated.

For instance, one embodiment of the invention may include a play effect that comprises the moving of a book. When the user brings the wand 100 within a predetermined distance from the book (for example, one meter), the proximity sensor in the wand 100 causes the wand to output a command signal to a receiver and/or effects controller near the book to initiate a control interlock and to generate a "hover" effect, such as the turning on of a light. At this point, the user is notified that he or she may then cast the appropriate spell, such as by appropriately motioning the wand 100, which causes the book to move. If the user attempts to cast the spell outside of the predetermined distance, the book does not move. This is because the appropriate control interlock is not initiated between the wand 100 and the receiver and/or effects controller.

Furthermore, the foregoing described "hover" effect may be used with passive RFID technology to conserve energy or battery power of the wand 100. In one embodiment, the wand 100 comprises a passive RFID circuit in addition to an activation circuit (for example, activation circuit 115 of FIG. 1) and may operate in an "active" or a "sleep" mode. During the sleep mode, the activation circuit does not engage in significant activity, which reduces the energy consumption of the wand 100. In addition, during the "sleep" mode, the user may not be able to cast spells with the wand 100. When the passive RFID circuit of the wand 100 is brought with a certain range of an RF transmitter, such as positioned near the effects controller, the passive RFID circuit receives the transmitted RF signal and "awakens" the wand activation circuit into the "active" state. At this point, the user is able to engage in spell casting, such as by motioning the wand, as is described herein. In further embodiments, a perceptible signal, such as a light or a noise, alerts the user when the wand 100 awakens to an "active" mode.

Although disclosed with reference to particular embodiments, a skilled artisan will recognize from the disclosure herein a wide variety of methods and/or devices usable to cause a "hover" effect. For example, the user may use certain voice commands, such as a particular magic word or phrase, to cause the "hover" effect and to initiate a control interlock. In other embodiments, an RFID tag in the wand 100, the receiver, and/or the effects controller is used to initiate the "hover" effect. In yet other embodiments, the proximity sensor in located remote to the wand 100, such as near or in the receiver and/or effects controller.

Wand Operation

A magic wand as disclosed and described herein may be used to cast an infinite possibility of "spells" or commands based on a single wand activation circuit, a single learned wand motion and only a few unique wand command signals selected using any of the various circuits and structures described above in connection with FIGS. 14-16 (of course more complex operations are also possible and desirable). For example, using the wand 100g illustrated and described in connection with FIGS. 16A-16D a user can easily transmit three distinct command codes selected by each of the three touch sensors 108, 110, 112. Touching either the "+" or the "−" symbols and waiving the wand in the required motion triggers the internal wand activation circuit and causes the wand to transmit a radio frequency (RF) or infrared (IR) signal corresponding to an "ON/CAST" or "OFF/BLOCK" command or spell, respectively. This can be useful, for example, for turning on/off various play effects over long distances (up to 100 meters) and for basic game play such as spell casting competitions, target practice, and the like.

If it is desired to provide signal directionality so that the command signal or spell can be aimed or cast at various particular selected play effects or objects, then a directional signal source such as IR and/or directionalized RF is preferably selected. Alternatively, a combination of directional (for example, IR) and omni-directional (for example, RF) signal sources may be used effectively to provide a desired directional spell-casting capability. For example, a momentum-actuated switch or accelerometer (not shown) internally disposed within the tip of wand 100 can be used to activate a directional signal source (for example, a light bulb or LED shining a beam or cone of light) when a predetermined momentum force or acceleration is reached. Such a wand with internal wand activation circuitry and/or a directional signal source may replace, for example, a gun or a rifle in a conventional shooting gallery or target game such as disclosed in U.S. Pat. No. 4,296,929 to Meyer et al. and U.S. Pat. No. 5,785,592 to Jacobsen, both of which are incorporated by reference herein in their entireties.

Waiving and activating the wand while touching the "*" symbol preferably initiates the beginning of a "complex" spell comprising multiple combinations of the first two (base-2 coding) or all three wand motions (base-3 coding). Of course, those skilled in the art will appreciate that with three touch sensors, up to base-8 coding is possibly by including combinations of simultaneously activated sensors. Thus, various spell "recipes" or incantations can be described and carried out using a sequence of individual commands and corresponding wand motions as represented, for example, by the three distinct magic symbols. Table 3, below, illustrates some examples of complex spells/commands that are possible using base-3 coding.

TABLE 1

| Spell Formula | Effect |
| --- | --- |
| + | "on" or "cast spell" |
| − | "off" or "block spell" |
| * | "start complex spell" |
| *+ | "move object" |
| *− | "stop object" |
| *−*+ | "start/increase levitation" |
| *−*− | "stop/decrease levitation" |
| *+*+ | "unlock/open door" |
| ***− | "lock/close door" |
| *++ | "Fire Spell" |
| *+− | "Block Fire spell" |
| *+++ | "Ice Spell" |
| *++− | "Block Ice Spell" |

Using up to 6 combinations of 2 wand motions (base-2), wand users can produce 126 different spells. Using up to 6 combinations of 3 wand motions (base-3), wand users can produce 1092 different spells. Using up to 6 combinations of 8 wand motions (base-8) produces 299,592 different possible spells. There is virtually no limit to the number of different spells that can be created and executed in this fashion. Preferably, once a complex spell is initiated and during each further step thereof a timer is initiated by the associated active receiver module and/or effects controller. If an additional command signal is not received within a predetermined time period (e.g. 0.5-3 seconds) the complex spell is considered "completed" and the effects controller actuates the appropriate relay to trigger whatever appropriate effect(s) correspond to the complex spell received. If the spell is incomplete or is inaccurate in any way, preferably only a "swoosh" or similar sound effect is triggered indicating that a spell was cast but did not work.

If desired, the active receiver module or associated effects controller can also be configured to give users audible and/or visual cues as each complex spell is being cast. This is in order to help users cast complex spells and help them identify when they have made a mistake or if they are about to cast the wrong or an unintended spell. For example, various themed feedback effects such as glowing lights, halo effects or escalating sound effects can be provided as each step in a complex spell is successfully completed. Again, this helps users learn the spells and understand where they perhaps went wrong in casting a particular spell. It also helps users discover and learn new spells by trial and error experimentation and by memorizing various spell sequences/commands that are observed to produce desired effects.

Preferably, users participate and advance in an interactive magic experience or game over time (for example, weeks, months or years) according to a predetermined progression of gaming levels, wand levels and/or experience levels. For example, the various RF receivers disposed within a compatible play space could be programmed so that users of Level-1 wands may only be able to cast spells by actually touching their wands to whatever object they wish to control/actuate. Users of Level-2 wands would be able to cast simple (for example, on/cast and off/block) spells over short and medium range distances, but not complex spells. Users of Level-3 wands would be able to cast simple spells (for example, on/cast and off/block) and some complex spells (for example, spells requiring up to 3 wand motions) over short, medium and long range distances, but not more complex spells requiring 4 or more wand motions. Users of Level-4 wands would be able to cast all types and varieties of simple and complex spells over short, medium and long distances using any number of wand motions as desired. Certain "master" level users may also be able to program or define their own spells and share them with other users. There is no limit to the number and complexity of spells and corresponding special effects that may be created.

Wand levels can easily be set and changed, for example, by accessing the internal circuitry of each wand and flipping various dip switches to change the address or coding of the internal RF/IR transmitter. Alternatively, within a play facility wand levels may be set and stored at the receiver/controller level by tracking each wand unique ID code (UPIN/UGIN) and using a computer and an indexed data-base to look up the corresponding wand level and any other relevant gaming information associated with each unique UPIN/UGIN. Preferably, when a user reaches the appropriate number of points or experience for advancement to the next level, a special congratulatory effect is actuated and the user is thereby notified that he or she has earned additional magic powers. If desired, a short graduation ceremony may be presided over by a "Grand Wizard" while the user's wand is upgraded with new magic powers (for example, insertion of new electronics and/or adjustment of various dip switches, circuit jumpers, combinations of the same or the like).

Wand Fabrication, Assembly and Detailing

One particularly exciting and rewarding aspect of an immersive interactive magic experience in accordance with the present invention is providing users with an opportunity to select, build and/or decorate their own magic wands. Accordingly, preferably all or most of the wand components are standardized, modularized and interchangeable so that various prefabricated wand components and starting materials can be stocked (for example, in a "wizards workshop") and individually purchased by users to create an endless variety of unique and individualized finished wands having evolving powers, abilities and/or aesthetics.

For the most fully immersive experience possible it is most desirable that users are not distracted by the underlying technology that makes the wand work, but simply enjoy the immersive fantasy experience of practicing, performing and mastering "real" magic using a "real" magic wand. Thus, preferably most, if not all, of the wand components are simple in outward appearance and preferably contain no conspicuous outward manifestations (or have only minimal outward manifestations) of the technology within. Wand materials and components fabricated from natural or simulated natural materials, such as wood, bone leather, minerals (metals) and crystals are particularly preferred, although certainly not required.

The base wand component comprises the wand shaft 110. This may be a hollow plastic, wood or metal shaft provided in various materials and colors. For beginners or entry level users, a finished wand may be constructed by simply selecting a wand shaft 110 and then fitting it with one or more magnetic end caps 216, as illustrated. This provides a entry level wand (Level-1) that can be used to activate a variety of simple effects such as illustrated and described above in connection with FIGS. 17A-17C. If desired, a small wood lathe 230 can be used to create a custom wand handle 120 fabricated from a selected wood stock and a user's choice of any one of a number of available template patterns. If further desired, the end of the handle may be center-drilled to accommodate a threaded stud 121, bolt or other means for removably securing a selected decorative metal, wood and/or crystal knob 123a-123f. Such knobs may comprise, for example, any one of a number of standard, internally threaded cabinet knobs or drawer-pulls such as available from Emtek Products Inc. A Level-1 wand constructed in this fashion preferably facilitates basic game play within a compatible play facility, but is not fully functional and, therefore, may not be capable of achieving some of the more desirable play effects or play experiences available.

The next level wand (Level-2) would preferably include, in addition, a simple passive RFID transponder 118 inserted and secured at one end thereof. The transponder 118 provides relatively short-range RF communications and also stores a unique person identifier number ("UPIN") and an optional unique group identifier number ("UGIN"). The UPIN and UGIN may be used to identify and track individual wands and play participants. The RFID transponder 118 also stores certain information identifying each play participant and/or describing certain powers or abilities possessed by an imaginary role-play character represented by the wand. These stored character attributes may be easily and conveniently transported with the wand to various compatible play facilities, games, video games, home game consoles, hand-held game units, and the like. If desired, the transponder 118 may be encapsulated in a colored epoxy, Lucite or the like and thereby disguised as a natural crystal or mineral/stone. A Level-2 wand preferably facilitates basic and intermediate game play within a compatible play facility. It has more functionality than a Level-1 wand, but is still not fully functional and, therefore, may not be capable of achieving some of the most desirable play effects or play experiences available.

The next level wand (Level-3) would preferably include, in addition, an active RF/IR module and associated wand activation circuitry for wirelessly casting a simple spell (for example, ON/OFF) over longer distances. For example, this would be similar to the wand 100d, illustrated and described above in connection with FIG. 12. Preferably, the wand would be self powered, requiring no batteries or other replaceable internal power source. However, if replaceable batteries are desired, they may optionally be encapsulated in a colored epoxy, Lucite or the like and thereby disguised and sold in the form of a natural "energy crystal" or mineral/stone. A Level-3 wand preferably facilitates basic, intermediate and some advanced game play within a compatible play facility. It has more functionality than a Level-1 and Level-2 wand and can cast simple spells over long distances, but is not able to cast more complex spells. Therefore, it may not be capable of achieving some of the most advanced and desirable play effects or play experiences available.

The highest level wand (Level-4) would preferably include, in addition, circuitry and/or structure(s) for selecting and casting more advanced and/or complex spells (for example, ON/OFF, increase/decrease, UP/DOWN, change colors, simulated levitation, or the like). For example, this would be similar to the wands 100f-100h, illustrated and described above in connection with FIGS. 14-16. Preferably, the wand would be self powered, requiring no batteries or other replaceable internal power source. A Level-4 wand preferably facilitates basic, intermediate and all advanced game play within a compatible play facility. It has more functionality than a Level-1, Level-2 and Level-3 wand and can cast a variety of simple or complex spells over long distances to achieve the most advanced and spectacular magical play effects.

Figure 19G:
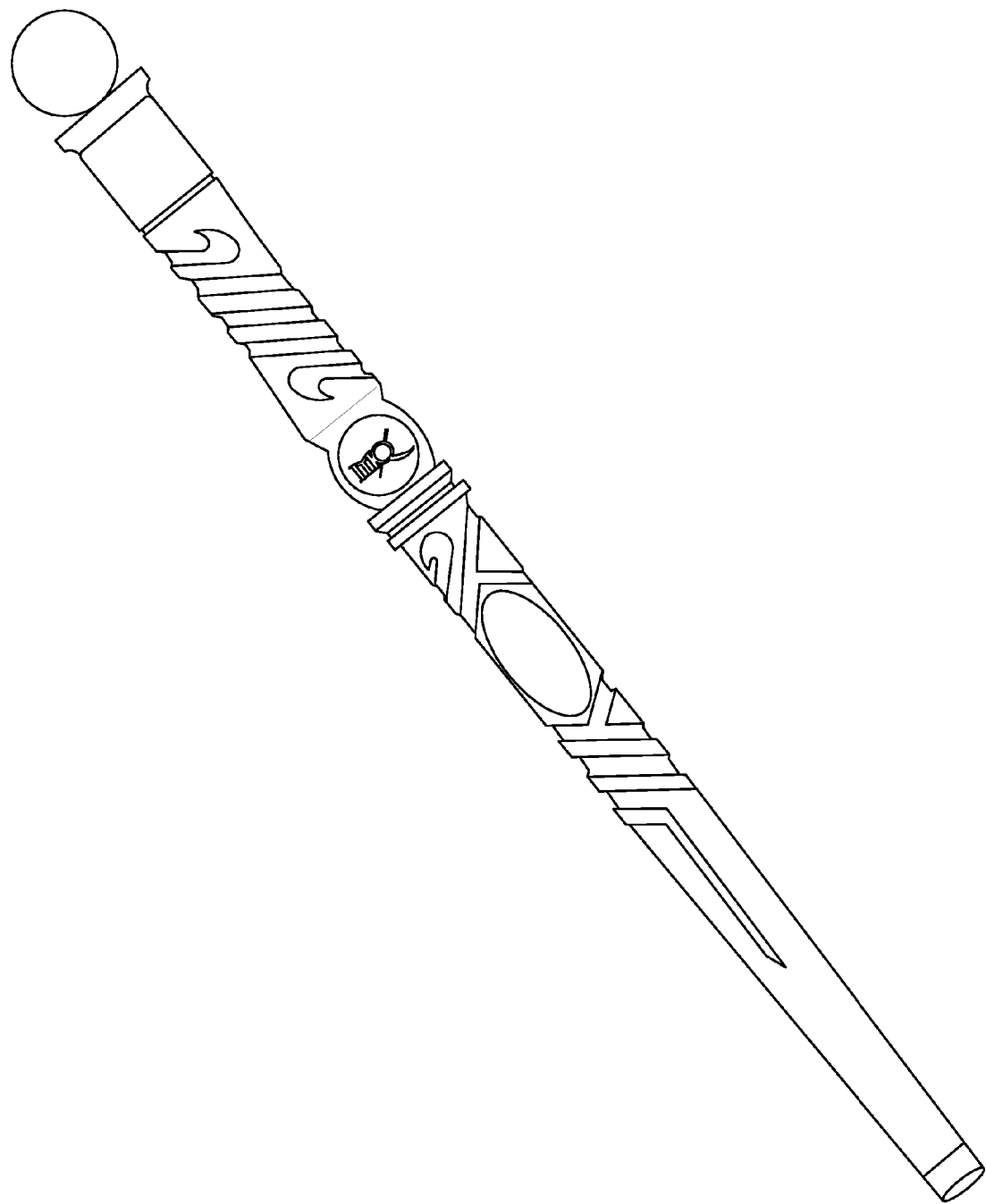
FIGS. 19A-19P are schematic illustrations showing various possible constructions, configurations and finishes of interactive wand toys having features and advantages in accordance with the present invention.
Figure 19H:
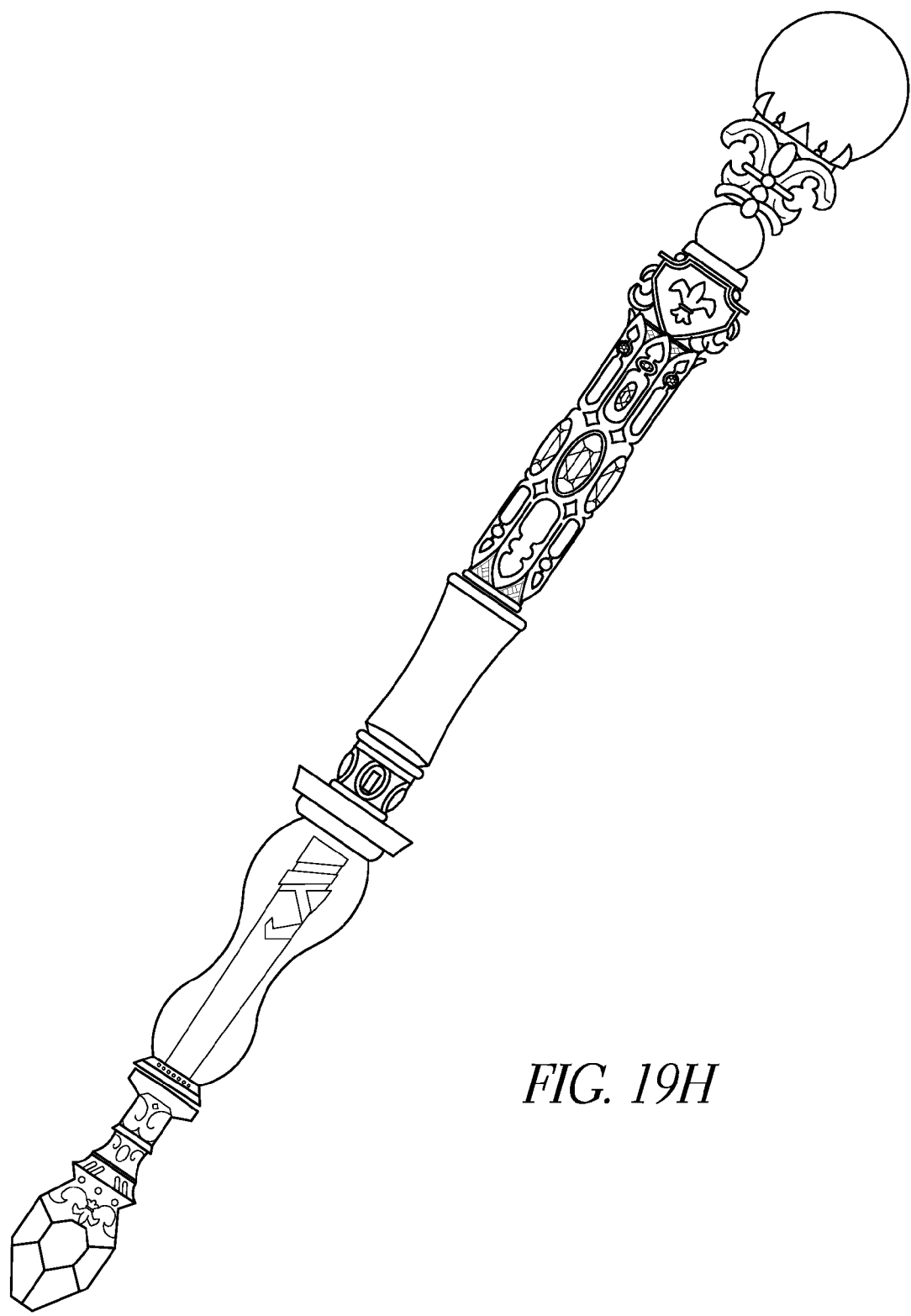
Figure 19I:
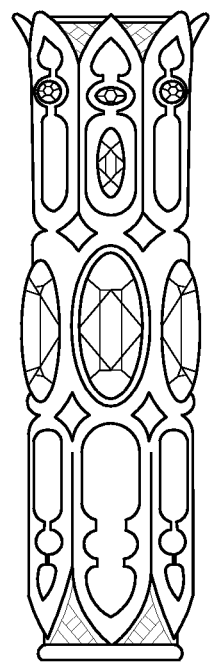
Figure 19J:
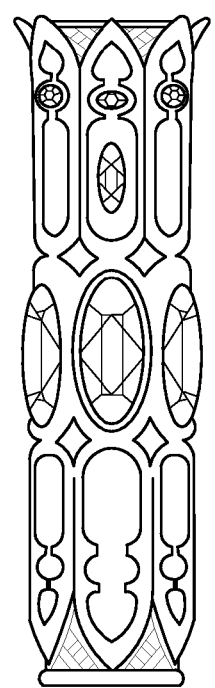
Figure 19K:
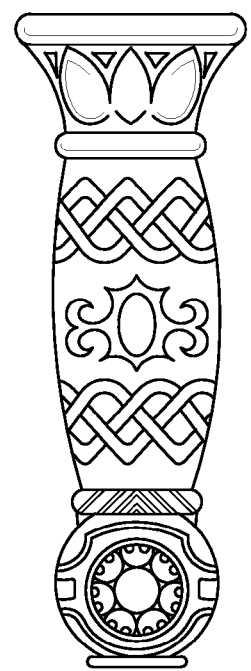
Figure 19L:
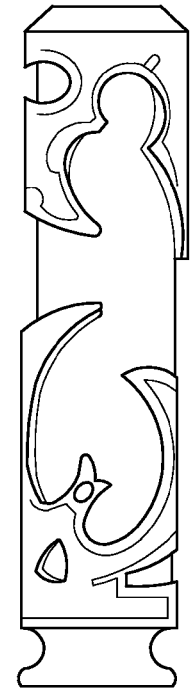
Figure 19M:
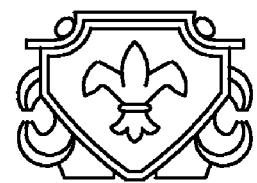
Figure 19N:
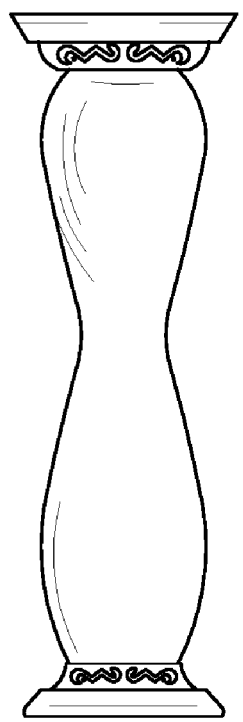
Figure 19O:
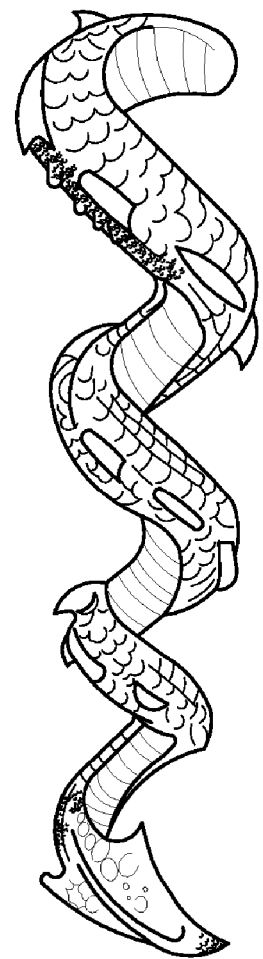
Figure 19P:
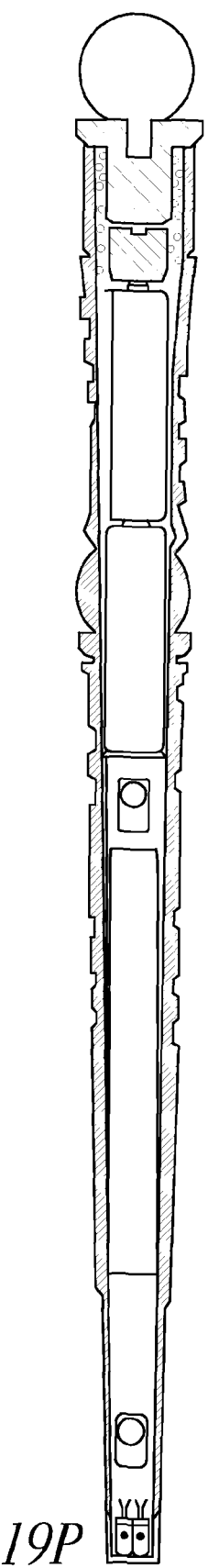

Preferably, in all cases described above, the wand shaft 110, handle 120 and/or knob 123 may be further decorated and/or individualized, as desired, with various monograms, engravings, stickers, stains, custom paint and the like, to suit the tastes of each individual user. For example, various assembly and fabrication stations may preferably be provided within a dedicated "workshop" area whereby wand purchasers may personally attend to the selection, fabrication, assembly and final detailing of their personal wands. Similarly, wand "kits" may also be selected, packaged and sold whereby purchasers can assemble and decorate their own wands in the convenience of their own home using the wand components, materials and decorative elements illustrated and described above. FIGS. 19A-19P illustrate various examples of wands, wand handles or grips, wand add-ons, and wand knobs that have been fabricated, assembled and detailed in a manner as described above.

RFID Tags/Transponders

Many of the preferred embodiments of the invention illustrated and described above are RFID-enabled—that is, they utilize RFID technology to electrically store and communicate certain relevant information (for example, UPIN and UGIN, game levels, points, combinations of the same or the like) and/or to wirelessly actuate or control various magical play effects. RFID technology provides a universal and wireless medium for uniquely identifying objects and/or people and for wirelessly exchanging information over short and medium range distances (10 cm to 10 meters). Commercially available RFID technologies include electronic devices called transponders or tags, and reader/writer electronics that provide an interface for communicating with the tags. Most RFID systems communicate via radio signals that carry data either uni-directionally (read only) or, more preferably, bi-directionally (read/write).

Figure 21A:
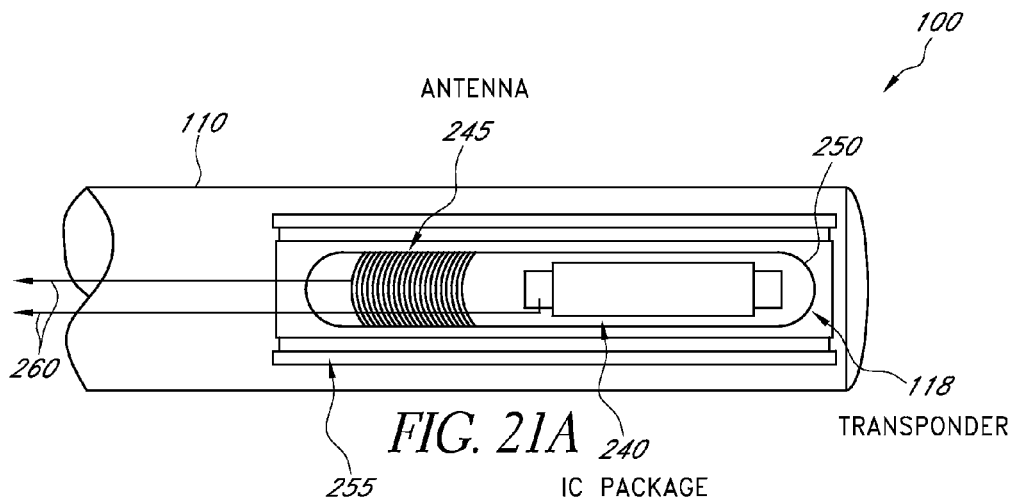
FIG. 21A is a partial cross-section detail view of the distal end of the interactive wand toy of FIG. 1, illustrating the provision of an RFID transponder device therein.

Several examples of RFID tags or transponders particularly suitable for use with the present invention have been illustrated and described herein. For example, in the particular preferred embodiments illustrated and described above, a 134.2 kHz/123.2 kHz, 23 mm glass transponder is preferably selected, such as available from Texas Instruments, Inc. (http://www.tiris.com, for example, Product No. RI-TRP-WRHP). As illustrated in FIG. 21A, this transponder basically comprises a passive (batteryless) RF transmitter/receiver chip 240 and an antenna 245 provided within an hermetically sealed vial 250. A protective silicon sheathing 255 is preferably inserted around the sealed vial 250 between the vial and the inner wall of the tube 110 to insulate the transponder from shock and vibration. If desired, the RFID transponder 118 may be modified to provide an optional external interrupt/disable line 260, such as illustrated in FIG. 21A and as described in more detail above in connection with FIGS. 1 and 5.

However, those skilled in the art will readily appreciate from the disclosure herein that the invention is not limited to the specific RFID transponder devices disclosed herein, but may be implemented using any one or more of a wide variety of commercially available wireless communication devices such as are known or will be obvious from the disclosure herein to those skilled in the art. These include, without limitation, RFID tags, EAS tags, electronic surveillance transmitters, electronic tracking beacons, Wi-Fi, GPS, bar coding, and the like.

Of particular interest for purposes of practicing the present invention is the wide variety of low-cost RFID tags that are available in the form of a printed circuit on a thin, flat adhesive-backed substrate or foil. For example, the 13.56 mHz RFID tag sold under the brand name Tag-it™ and available from Texas Instruments, Inc. (http://www.tiris.com, Product No. RI-103-110A) has particular advantages in the context of the present invention. Paper thin and batteryless, this general purpose read/write transponder is placed on a polymer tape substrate and delivered in reels. It fits between layers of laminated paper or plastic to create inexpensive stickers, labels, tickets and badges. Tag-it™ inlays have a useful read/write range of about 25 cm and contain 256 bits of on-board memory arranged in 8×32-bit blocks which may be programmed (written) and read by a suitably configured read/write device.

Another RFID tagging technology of particular interest for purposes of practicing the present invention are the so-called "chipless" RFID tags. These are extremely low-cost RFID tags that are available in the form of a printed circuit on a thin, flat adhesive. These tags are similar in size, shape and performance to the Tag-it™ inlays described above, except that these tags require no on-board integrated circuit chip. Chipless RFID tags can be electronically interrogated to reveal a pre-encoded unique ID and/or other data stored on the tag. Because the tags do not contain a microchip, they cost much less than conventional RFID tags. An adhesive-backed chipless RFID tag with up to 10 meters range and 256 bits of data, can cost one tenth of their silicon chip equivalents and typically have a greater physical performance and durability. For example, a suitable chipless RFID tag is being made available from Checkpoint Systems under its ExpressTrak™ brand. Very inexpensive chipless RFID tags (and/or other types of RFID tags) may also be directly printed on paper or foil substrates using various conductive inks and the like, such as are available from Parelec Inc. under its Parmod VLT™ brand.

In the context of carrying out an interactive gaming experience, play experience or entertainment experience, such as the type generally disclosed and described herein, such adhesive-backed tag devices and the like are highly advantageous. They are inexpensive, disposable, and may be easily secured or applied to virtually any play object, wand, wristband, badge, card or the like, for electronically storing and retrieving desired user-specific or object-specific information. Such information may include, for example, UPIN, UGIN, object type/size/shape/color, first and/or last name, age, rank or level, total points accumulated, tasks completed, facilities visited, combinations of the same or the like. For example, FIG. 20A illustrates one preferred embodiment of a wand toy 100i having an adhesive-backed RFID tag 322 secured thereon for enabling the wand 100i to interact with various play effects located within an RFID-enabled play facility or play environment. FIG. 20B illustrates a second preferred embodiment of a wand toy 100j having an adhesive-backed RFID tag 322 secured thereon for enabling the wand 100j to interact with various play effects located within an RFID-enabled play facility or play environment. Similar RFID tags may also be applied to any of the other wands 100a-h disclosed and described herein or any other toys, play objects, jewelry, trinkets, action figures, collectibles, trading cards and generally any other items desired to be incorporated as part of an RFID-enabled gaming experience.

FIGS. 20E and 20F illustrate one possible preferred embodiment of a key chain trinket 321 incorporating an RFID tag 322 suitable for use in various RFID-enabled gaming and entertainment experiences as disclosed herein. Such RFID-enabled items not only make the overall gaming and entertainment experience more exciting and enjoyable, but they can create unique branding opportunities and additional lucrative revenue sources for a play facility owners/operators. Moreover, and advantageously, character attributes developed during a play a participant's visit to a local play facility are stored on the tag 322. When the play participant then revisits the same or another compatible play facility, all of the attributes of his character are "remembered" on the tag so that the play participant is able to continue playing with and developing the same role-play character. Similarly, various video games, home game consoles, and/or hand-held game units can be and preferably are configured to communicate with the tag in a similar manner as described above and/or using other well-known information storage and communication techniques. In this manner, a play participant can use the same role play character he or she has developed with specific associated attributes in a favorite video action game, role-play computer game or the like.

Trading cards incorporating RFID tags are also particularly advantageous in the context of an interactive role-playing game such as disclosed herein. For example, FIGS. 20B and 20C are front and rear views, respectively, of an optional RFID-enabled trading card 325 for use within an interactive gaming experience as described herein. For example, such RFID-enabled trading cards may be used instead of or as an adjunct to the wand 100 with RFID transponder 118 as illustrated and described above in connection with FIG. 1. Each card 325 preferably comprises a paper, cardboard or plastic substrate having a front side 328 and a back side 330. The front 328 of the card 325 may be imprinted with graphics, photos, or any other information as desired. In the particular embodiment illustrated, the front 328 contains an image of a magical wizard character 332 in keeping with an overall magic or wizard theme. In addition, the front 328 of the card may include any number of other designs or information 334 pertinent to its use and application in the game. For example, the character's special magic powers, skills and experience level may be indicated, along with any other special powers or traits the character may possess.

The obverse side 330 of the card preferably contains the card electronics comprising an RFID tag 336 pre-programmed with the pertinent information for the particular person, character or object portrayed on the front of the card. The tag 336 generally comprises a spiral wound antenna 338, a radio frequency transmitter chip 340 and various electrical leads and terminals 342 connecting the chip to the antenna. If desired, the tag may be covered with an adhesive paper label 344 or, alternatively, the tag may be molded directly into a plastic sheet substrate from which the card is formed. Preferably, the tag 336 is passive (requires no batteries) so that it is inexpensive to purchase and maintain. The particular tag illustrated is the 13.56 mHz tag sold under the brand name Taggit™ available from Texas Instruments, Inc. (http://www.tiris.com, Product No. RI-103-100A). The tag may be "read/write" or "read only", depending on its particular gaming application. Optionally, less expensive chipless tags may also be used with equal efficacy.

Those skilled in the art will readily appreciate from the disclosure herein that a variety of trading card designs having features and advantages as disclosed herein may be used to play a wide variety of unique and exciting games within an RFID-enabled play facility and/or using an RFID-enabled gaming device or game console. Alternatively, persons skilled in the art will appreciate from the disclosure herein that such games may be carried out using a conventional computer gaming platform, home game console, arcade game console, hand-held game device, internet gaming device or other gaming device that includes an RFID interface. Advantageously, play participants can use trading cards 325 to transport information pertinent to a particular depicted person, character or object to a favorite computer action game, adventure game, interactive play facility or the like. For example, a suitably configured video game console and video game may be provided which reads the card information and recreates the appearance and/or traits of particular depicted person, character of object within the game. If desired, the game console may be further be configured to write information to the card in order to change or update certain characteristics or traits of the character, person or object depicted by the card 325 in accordance with a predetermined game play progression.

Advantageously, RFID-enabled character trading cards and character traits, including special powers, and the like, need not be static in the game, but may change over time according to a central story or tale that unfolds in real time (for example, through televised shows or movies released over the course of weeks, months or years). Thus, a character trading card that may be desirable for game play this week (for example, for its special magic powers or abilities), may be less desirable next week if the underlying character is injured or captured in the most recent episode of the story. Another significant and surprising advantage of RFID-enabled trading cards is that multiple cards can be stacked and simultaneously read by a single RFID reader even where the cards are closely stacked on top of one another and even though the reader may be hidden from view. This feature and ability creates limitless additional opportunities for exciting game complexities, unique game designs and gaming strategies heretofore unknown.

Of course, those skilled in the art will readily appreciate from the disclosure herein that the underlying concept of an RFID-enabled card 325 and card game is not limited to cards depicting fantasy characters or objects, but may be implemented in a wide variety of alternative embodiments, including conventional playing cards, poker cards, board game cards and tokens, sporting cards, educational cards and the like. If desired, any number of other suitable collectible/tradable tokens, coins, trinkets, simulated crystals or the like may also be provided and used with a similar RFID tag device for gaming or entertainment purposes in accordance with the teachings of the present invention.

For example, RFID tag devices may be included on "magic articles" that may be purchased or acquired in a gaming or interactive play system. For instance, a user may purchase an invisibility cloak, magic beads, belts, and the like during an interactive play experience. The RFID tags may be used to communicate to a central database that a certain person has purchased or is possession of the tagged item. The central database may then track the tagged items and/or may cause those in possession of the tagged items to have increased "magical" skills or powers, such as additional protection from the spells "cast" by opposing players.

RFID Readers/Writers

In accordance with another preferred embodiment of the invention various RFID readers and associated play effects are distributed throughout an entertainment facility and are able to read the RFID tags described herein and to actuate or control one or more effects in response thereto. For example, the UPIN and UGIN information can be conveniently read and provided to an associated computer, central network, display system or other tracking, recording or display device for purposes of interacting with an associated effect and/or creating a record of each play participant's experience within the play facility. This information may be used for purposes of interactive game play, tracking and calculating individual or team scores, tracking and/or locating lost children, verifying whether or not a child is inside a facility, photo capture and retrieval, and many other useful purposes as will be readily obvious and apparent from the disclosure herein to those skilled in the art.

Figure 21B:
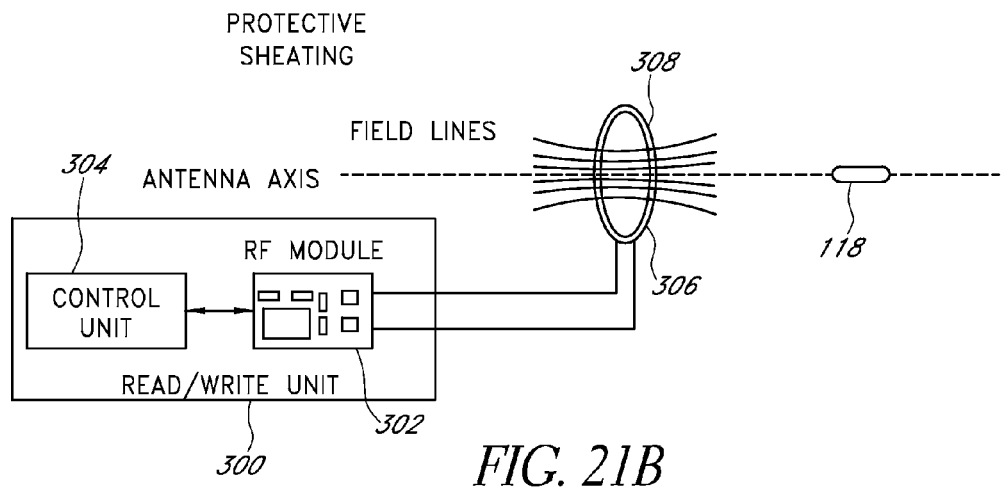
FIG. 21B is a schematic illustration of an RFID read/write unit for use with the interactive wand toy of FIG. 1 having features and advantages in accordance with the present invention.

FIG. 21B is a simplified schematic diagram of one embodiment of an RFID reader/writer 300 for use with the wand and RFID transponder 118 of FIG. 21A. A preferred reader/writer device is the Series 2000 Micro Reader available from Texas Instruments, Inc. (http://www.tiris.com, for example, Product No. RI-STU-MRD1). As illustrated, the reader/writer 300 basically comprises an RF Module 302, a Control Unit 304 and an antenna 306. When the distal end of wand 100 and its internally contained transponder 118 comes within a predetermined range of antenna 306 (about 20-200 cm) the transponder antenna 245 is excited by the radiated RF fields 308 and momentarily creates a corresponding voltage signal which powers RF transmitter/receiver chip 240. In turn, the RF transmitter/receiver chip 240 outputs an electrical signal response which causes transponder antenna 245 to broadcast certain information stored within the transponder 235 comprising, for example, 80 to 1000 bits of information stored in its internal memory. This information preferably includes a unique user ID (UPIN/UGIN), magic level or rank and/or certain other items of information pertinent to the user, the wand and/or the game or play experience.

A carrier signal embodying this information is received by antenna 306 of RFID reader/writer 300. RF Module 302 decodes the received signal and provides the decoded information to Control Unit 304. Control Unit 304 processes the information and provides it to an associated logic controller, PID controller, computer or the like using a variety of standard electrical interfaces (not shown). Thus, the information transmitted by transponder 118 and received by reader/writer 300 may be used to control one or more associated play effects through a programmable logic controller, for example. In one embodiment, the information transmitted includes data relating to the activation of the sensors 122, 124 of the wand 100. In other embodiments, the transmitted information may include timing information, such as the duration of time that a sensor is activated and/or the duration of time between successive activations of the sensors 122, 124. Play effects, may include, for example, lighting effects, sound effects, various mechanical or pneumatic actuators and the like.

Preferably, RFID reader/writer 300 is also configured to broadcast or "write" certain information back to the transponder 118 to change or update information stored in its internal memory, for example. The exchange of communications occurs very rapidly (about 70 ms) and so, from the user's perspective, it appears to be virtually instantaneous. Thus, the wand 100 may be used to "magically" actuate and/or communicate with various associated effects by simply touching or bringing the tip of the wand 100 into relatively close proximity with the antenna 306 of a reader/writer unit 300.

Figure 21C:
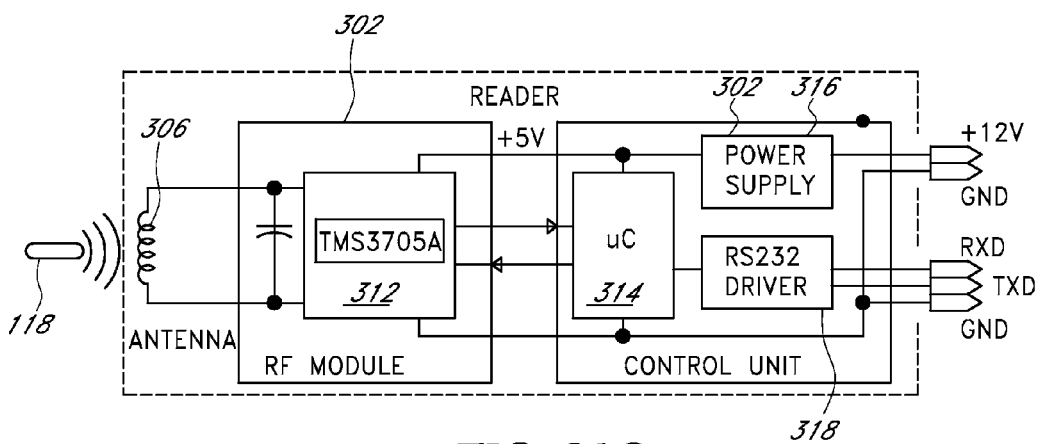
FIG. 21C is a simplified circuit schematic of the RFID read/write unit of FIG. 21B having features and advantages in accordance with the present invention.

FIG. 21C is a simplified circuit schematic of the reader/writer unit 300 of FIG. 21B. The read or write cycle begins with a charge (or powering phase) lasting typically 15-50 ms. During this phase, the RF Module 302 causes the antenna 306 to emit an electromagnetic field at a frequency of about 134.2 kHz. The antenna circuit is mainly formed by the resonance capacitor C1 and the antenna coil 306. A counterpart resonant circuit of the transponder 118 is thereby energized and the induced voltage is rectified by the integrated circuit 240 and stored temporarily using a small internal capacitor (not shown).

The charge phase is followed directly by the read phase (read mode). Thus, when the transponder 118 detects the end of the charge burst, it begins transmitting its data using Frequency Shift Keying (FSK) and utilizing the energy stored in the capacitor. The typical data low bit frequency is 134.2 kHz and the typical data high bit frequency is 123.2 kHz. The low and high bits have different duration, because each bit takes 16 RF cycles to transmit. The high bit has a typical duration of 130 µs, the low bit of 119 µs. Regardless of the number of low and high bits, the transponder response duration is generally less than about 20 ms.

The carrier signal embodying the transmitted information is received by antenna 306 and is decoded by RF module 302. RF Module 302 comprises integrated circuitry 312 that provides the interface between the transponder 118 and the Control Module 304 (data processing unit) of the Reader/Writer Unit 300. It has the primary function and capability to charge up the transponder 118, to receive the transponder response signal and to demodulate it for further digital data processing.

A Control Unit 304, comprising microprocessor 314, power supply 316 and RS232 Driver 318, handles most data protocol items and the detailed fast timing functions of the Reader/Writer Module 300. It may also operate as interface for a PC, logic controller or PLC controller for handing display and command input/output functions, for example, for operating/actuating various associated play effects.

Long Range Transmitter and Receiver

In many of the preferred embodiments of the invention as illustrated and described herein it is disclosed to use a radio frequency (RF) and/or infrared (IR) transmitter to send wand command signals over relatively long range distances (for example, 10-100 meters or more). For example, wand 100A illustrated and described in connection with FIG. 7 includes an internal RF/IR Module 150 for communicating various command signals to one or more remote RF/IR receivers and associated effects. Command signal receivers may be located, for example, on a remote roof or ceiling surface of a compatible play facility, a retail mall, restaurant, destination resort facility or even an outdoor public play area. Internal RF/IR Module 150 can comprise any number of small, inexpensive RF transmitters such as are commercially available from Axcess, Inc., of Dallas, Tex. If directionality is desired, any number of small, inexpensive infrared LED transmitters may be used, such as the type commonly employed in television remote controls, keyless entry systems and the like.

Figure 22A:
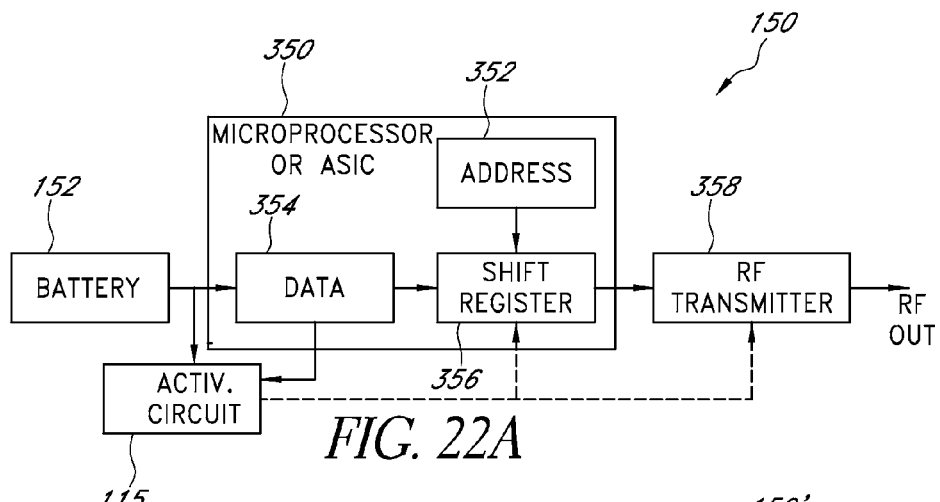
FIG. 22A is a simplified schematic block diagram of an RF transmitter module adapted for use in accordance with one preferred embodiment of the present invention.

FIG. 22A is a schematic block diagram of a particularly preferred transmitter module 150 adapted for use in accordance with the present invention. The transmitter module 150 generally comprises an RF transmitter 358 driven and controlled by a microprocessor or ASIC 350. ASIC 350 includes address storage module 352, data storage module 354 and shift register 356. Address storage module 352 includes a stored address or coded value, for example, in parallel bit format, that is a preselected coded value that may be uniquely associated with a particular transmitter module 150. Address storage module 352 applies the address coded value to an encoder, such as shift register 356 which, when enabled, encodes the coded value by converting it from parallel bit format to serial bit format which is applied to radio frequency (RF) transmitter 358. Similarly, data storage module 354 may include coded data or commands provided by a user (for example, via any of the various command input circuits and structures described above in connection with FIGS. 14-16). Data storage module 354 applies the coded data values to shift register 356 which, when enabled, encodes the coded data by converting it from parallel bit format to serial bit format which is also applied to radio frequency (RF) transmitter 358. Radio frequency transmitter 358 modulates the coded address and data values which is encoded in serial bit format onto a radio frequency carrier signal which is transmitted as an RF output signal ($RF_{Out}$) such as via a simple loop antenna.

Application of electrical power from an internal battery source 152 (or one or more self-generating power sources as described herein) is preferably controlled via wand activation circuitry 115 such as illustrated and described above in connection with FIGS. 1-6. Thus, transmitter module 150, address storage module 352, data storage module 354, shift register 356 and/or RF transmitter 358, are powered are preferably only powered for a short period of time when the wand circuitry 115 is successfully actuated and a corresponding command signal is to be transmitted. Those skilled in the art will recognize from the disclosure herein that transmitter module 150 may be implemented in a variety of known electrical technologies, such as discrete electronic circuits and/or integrated circuits. An implementation employing an integrated microprocessor or an application specific integrated circuit (ASIC) 350 is shown diagrammatically in FIG. 22A. Preferably, integrated circuitry technology and/or surface mount components are used to reduce the physical size of the circuit 150 such that it is able to fit within the relatively small cavity 116 of wand shaft 110 or handle 120 (see FIG. 1).

Figure 23A:
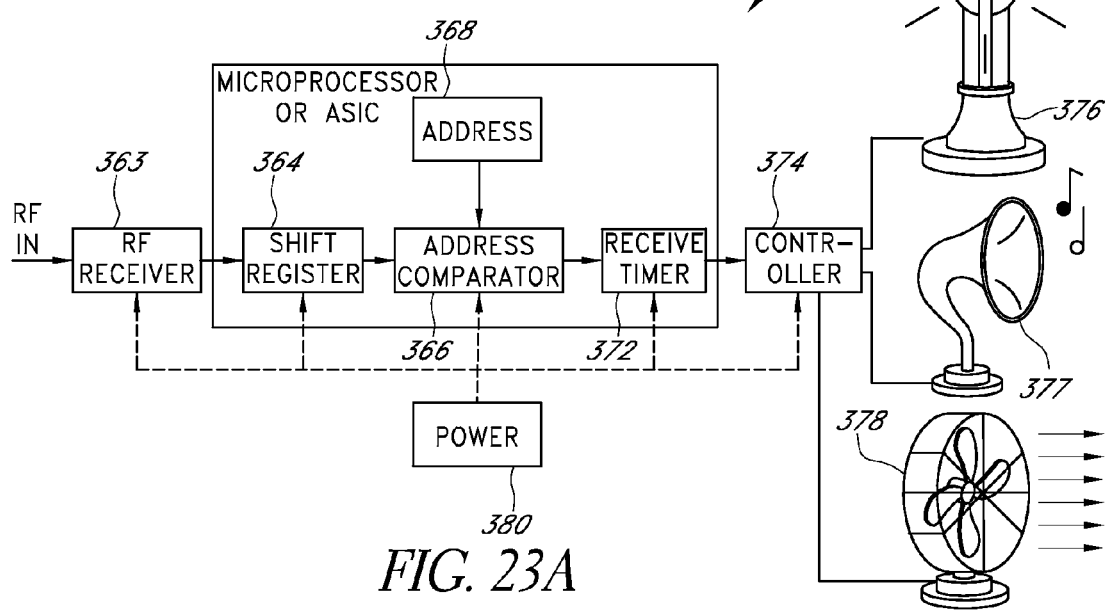
FIG. 23A is a simplified schematic block diagram of an RF receiver module and controller adapted for use in accordance with one preferred embodiment of the present invention.

FIG. 23A is a schematic block diagram of receiver module 362 which operates in conjunction with transmitter module 150 previously described. Radio frequency command signals transmitted by transmitter module 150 are provided as input signals ($RF_{In}$) to RF receiver 363 which may comprise a simple tuned circuit with loop antenna (not shown). Command signals received by RF receiver 363 are applied to a decoder, such as shift register 364 which converts the coded value therein from a serial bit format to a parallel bit format. Address comparator 366 receives at one input the transmitter module coded address value in parallel bit format from shift register 364 and at its other input a preselected fixed or dynamically stored coded value from address storage 368. The preselected coded value from address storage 368 corresponds to the preselected coded value of the transmitter module 150 with which receiver module 362 is associated or compatible. In other words, the preselected coded value stored in transmitter address storage 352 of transmitter module 150 is the same as or compatible with a preselected coded value as is stored in address storage 368 of receiver module 362 with which it is associated or compatible. If the coded address value in the received command signal matches all or a predetermined portion of the preselected fixed or dynamic coded value stored in address storage 368, this coincidence is detected by address comparator 370 and is applied to restart or reset receive timer 372. Receive timer 372 preferably has a time-out period of, for example, 0.5-3 seconds and, if it is not restarted or reset within this time period, it produces a command termination signal which tells an associated controller 374 to process the received command signals(s) and to actuate one or more corresponding play effects such as lighting effects 376, sound effects 377 and motorized actuators 378. In other embodiments, the receive timer 372 may determine the type and/or intensity of the play effect based on the amount of time between command signals. For example, shorter durations of time between command signals may cause higher-intensity play effects, and longer durations of time may cause lower-intensity play effects. Each of the functional elements of receiver module 362 and controller 374 receive electrical power from a suitable power source 380, as illustrated.

In operation, a user activates circuitry 150 by appropriately waving or moving the wand. This causes electrical voltage from battery 150 to be applied across the RF transmitter module 150, thereby causing the RF transmitter module 150 to transmit a desired command signal ($RF_{Out}$) including coded address and optional coded data information. This signal is received and decoded by receiver module 362 as input signal ($RF_{In}$). The decoded transmitter address information is compared to a fixed or dynamically stored coded value from address storage 368. Preferably, an immediate effect such as a pulsing light or sound is actuated by controller 374 in order to provide visual and/or aural cues that a command signal was received. Receive timer 372 is initiated and the RF receiver module 362 awaits the next command signal. If no further signal is received before the time times out, then the spell is assumed to be complete and the controller 374 is instructed to process the received command signal(s) and actuate the appropriate relay(s) thereby triggering whatever appropriate effect(s) correspond to the spell received. Preferably, as noted above, if the spell is incomplete or is inaccurate only a "swoosh" or similar sound effect is triggered indicating that a spell was cast but did not work. For simple spells, a fixed coded value may be stored in address storage 368. For complex spells, the stored coded value may be dynamically changed to match an expected or required series or progression of command signals. Alternatively, address storage 368 may be fixed and command signals may be carried and communicated to controller 374 as decoded data corresponding to data stored in data storage module 354 (FIG. 22A).

For applications supporting multiple wands (i.e., multiple RF transmitter modules 150) within a single play space, the address comparator 366 of receiver module 362 is preferably configured to accept either: (1) a range of valid "compatible" addresses from the set of RF transmitter modules 150; or (2) any valid address from a list of valid addresses stored in address storage module 368. In the first case, each transmitter module 150 within a defined group of transmitter modules (for example, all Level-1 wands) would preferably be configured to have a coded address value having a portion of address bits that are identical and a portion of address bits that may be unique, but unique data bits as selected by each user. The receiver module 362, upon detecting a compatible address bit sequence, decodes the data bits thereof and sets a latch selected by those particular data bits. A number of such latches, may be provided, for example, for recognizing and distinguishing further such command signals originating from multiple users and/or wands. In the second case, the receiver module 362 stores a list of specific coded values, i.e. valid addresses, in a memory, such as memory 368, and as transmitted addresses are received, they are compared to the valid addresses in this list. Thus, only signals transmitted by RF transmitter modules that are on the list of valid addresses are accepted by receiver module 362. In this manner, for example, command signals sent by Level-1 wands can be distinguished from command signals sent by Level-2 wands, which can be distinguished from Level-3 wands, etc.

Figure 22B:
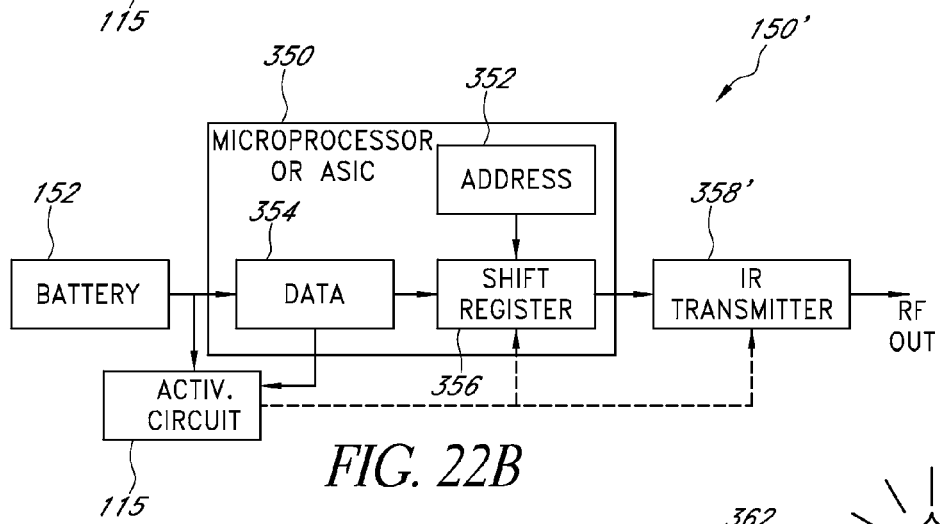
FIG. 22B is a simplified schematic block diagram of an IR transmitter module adapted for use in accordance with one preferred embodiment of the present invention.
Figure 23B:
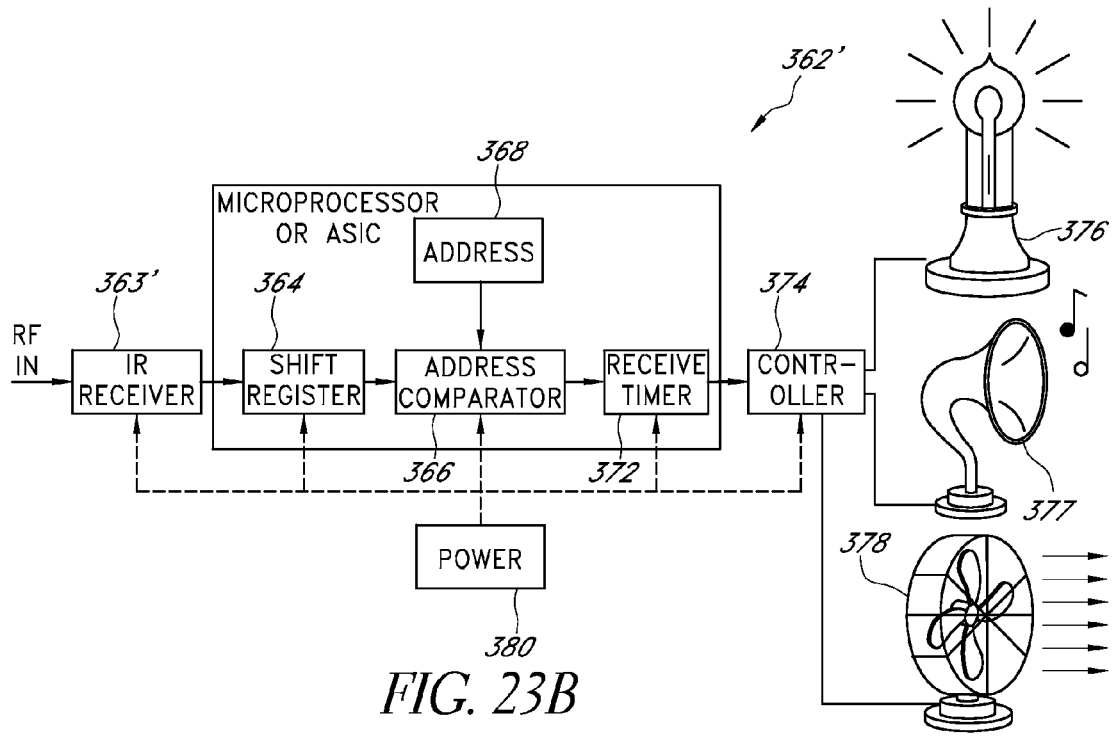
FIG. 23B is a simplified schematic block diagram of an RF receiver module and controller adapted for use in accordance with one preferred embodiment of the present invention.

Although the transmitter module 150 of FIG. 22A and the receiver module 362 of FIG. 23A are described with reference to RF technology, a skilled artisan will recognize from the disclosure herein that other types of wireless technology may also be used. For example, FIG. 22B depicts an IR transmitter module 150' having an IR transmitter 358' that may be used to transmit signals such as the type commonly employed in television remote controls, keyless entry systems and the like. The other components of the IR transmitter module 150' may also be modified such that the IR transmitter module 150' is capable of functioning similarly to the RF transmitter module 150 discussed with reference to FIG. 22A. In addition, FIG. 23B illustrates an IR receiver module 362' having an IR receiver 363' usable to operate with the IR transmitter module 150' of FIG. 22B. The other components of the IR receiver module 362' may also be modified such that the IR receiver module 363' is capable of functioning similarly to the RF receiver module 363 discussed with reference to FIG. 23A.

Figure 24:
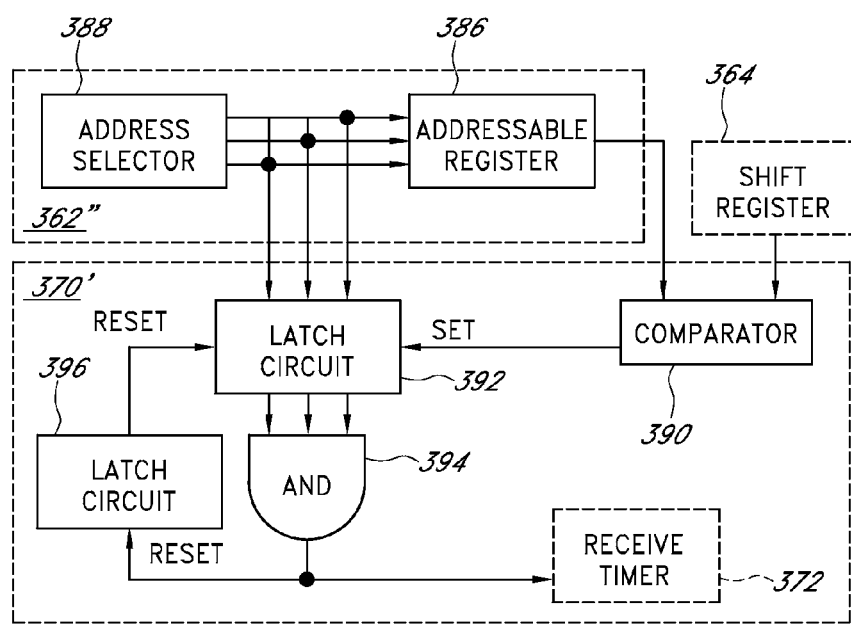
FIG. 24 is a simplified schematic diagram of an alternative embodiment of a portion of the RF receiver module of FIG. 23A adapted for use in accordance with one preferred embodiment of the present invention.

FIG. 24 is a schematic block diagram of a portion of a receiver module 362" including an embodiment of address comparator 370' and of address storage 368' particularly suited for operating with a plurality of simultaneously operating transmitter modules 150 or 150'. For example, blocks in FIG. 24 that are the same as blocks in FIG. 23A and described above are shown in phantom and are identified by the same numeric designation as in FIG. 23A. Address storage 368' includes addressable registers or memory 386 in which are stored the preselected coded identification values corresponding to the preselected coded identification value of each of a plurality of compatible RF transmitter modules 150 desired to be operably associated with receiver 362". Address selector 388 repetitively generates a sequence of addresses including the addresses of all the registers of addressable register 386 within a relatively short time period less than about 50-100 milliseconds. Thus the complete set of preselected stored coded values are applied to one input of coded value comparator 390 whereby the received coded identification value received and decoded at the output of shift register 364 and applied to the other input of coded value comparator 390 is compared to each one of the stored coded values of the set thereof stored in addressable register 386.

Although the receiver module 362" of FIG. 24 is disclosed with reference to particular embodiments, a skilled artisan will recognize from the disclosure herein a wide variety of alternative structures and uses for the receiver module 362". For example, the receiver module 362" may be capable of receiving an IR signal and structured similarly to the IR receiver module 362' of FIG. 23B.

Comparator 370' preferably includes a latch circuit 392 having an addressable latch corresponding to each register in addressable register 386 and that is addressed by the same address value generated by address selector 388 to address register 386. When there is a match at the inputs of coded value comparator 390 between the received coded value and the then produced stored coded value, the occurrence of the match is stored by setting the designated corresponding latch in latch circuit 392. If received coded identification values corresponding to all of the stored fixed coded values are received and properly decoded, then all of the latches in latch circuit 392 will be set, thereby making a "true" condition at the inputs of AND gate 294 and causing its output to become "true." This "true" signal from AND gate 294 resets receive timer 372, as described above in connection with FIG. 23A, and also activates a reset circuit 296 to reset all the latches of latch circuit 392 so that the comparison sequence of received coded identification values to the set of stored fixed coded values begins again. If all of the preselected received coded values are not received, then all of the latches in latch circuit 392 are not set, the output of AND gate 294 does not become "true", and receive timer 372 times out and issues the command termination signal discussed above.

Figure 25:
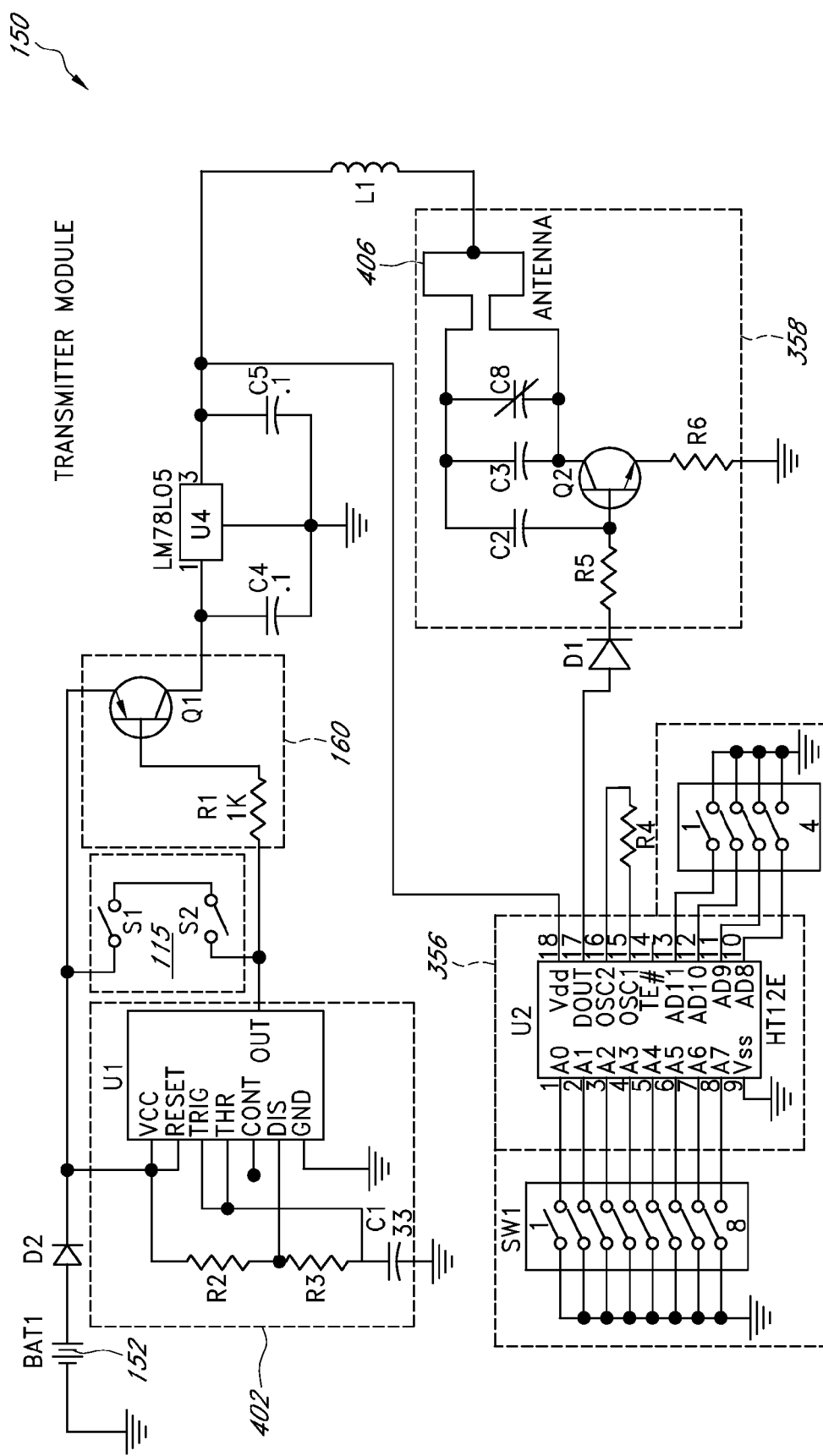
FIG. 25 is a detailed electrical circuit schematic of the RF transmitter module of FIG. 22A adapted for use in accordance with one preferred embodiment of the present invention.

FIG. 25 is a detailed electrical schematic diagram of an exemplary embodiment of transmitter module 150 illustrated and discussed above. Electrical power is provided by one or more batteries 152 and/or other power sources as illustrated and described herein. This power is preferably switched by wand activation circuit 115 and/or optional timer module 402. Electrical power is provided via diode D2 to the transmit timer U1, such as an integrated circuit one-shot multivibrator type LM555 available from National Semiconductor Corporation. The time-out interval of multivibrator U1 is established by resistors R2, R3 and capacitor C1 which need not be high precision components. When wand activation circuit 115 is activated, a voltage is applied through resister R1 to the gate of a transistor Q1. This causes electrical power to be applied from battery 152 to a five-volt voltage regulator U4 such as a type LM78L05 also available from National Semiconductor Corporation. Alternatively, the periodic output from U1 may be applied to the gate of a transistor Q1 to the same effect (for example, for sending periodic "beacon" transmissions).

Regulated voltage from regulator U4 is applied to shift register 356 (pin 18) and RF transmitter 358. Shift register 356 is implemented by an encoder integrated circuit U2 such as a 212 series encoder type HT12E available from Holtek Microelectronics in Hsinchu, Taiwan, R.O.C. Non-volatile address storage 352 is implemented by twelve single pole switches in switch packages SW1 and SW2 which are set to produce a twelve-bit coded value which is applied in parallel bit format to encoder integrated circuit U2 of shift register 356. Once set by the manufacturer or the user, the preselected coded value stored in address storage 352 is fixed and will not change absent human intervention. However, in alternative embodiments SW2 may be replaced in whole or in part by wand command selection circuitry such as touch switches, mercury tilt switches and the like illustrated and described above in connection with FIGS. 14-16. Such circuitry enables users to actively select and change the coded data impressed upon address lines 8-10 of encoder integrated circuit U2. Integrated circuit U2 reproduces the coded address and data values in pulse-width modulated serial-bit format and applies it through diode D1 to RF transmitter 358. RF transmitter 358 includes a class B biased transistor Q2 in an L-C tuned RF oscillator transmitter coupled to a loop antenna 406 for transmitting the command signal coded values (address bits coded by SW1 and data bits coded by SW2) produced by encoder U2.

Transmitter module 150 need only employ a small antenna such as a small loop antenna and is not required to have optimum antenna coupling. In a typical embodiment, with a transmitter frequency of about 915 MHZ, a transmitter peak power output of less than or equal to one milliwatt produces a transmission range R of about 20-30 meters. Other frequencies and power levels may also be employed. The low transmitter power is particularly advantageous in that it allows the size of transmitter module 150 to be made very small.

Figure 26:
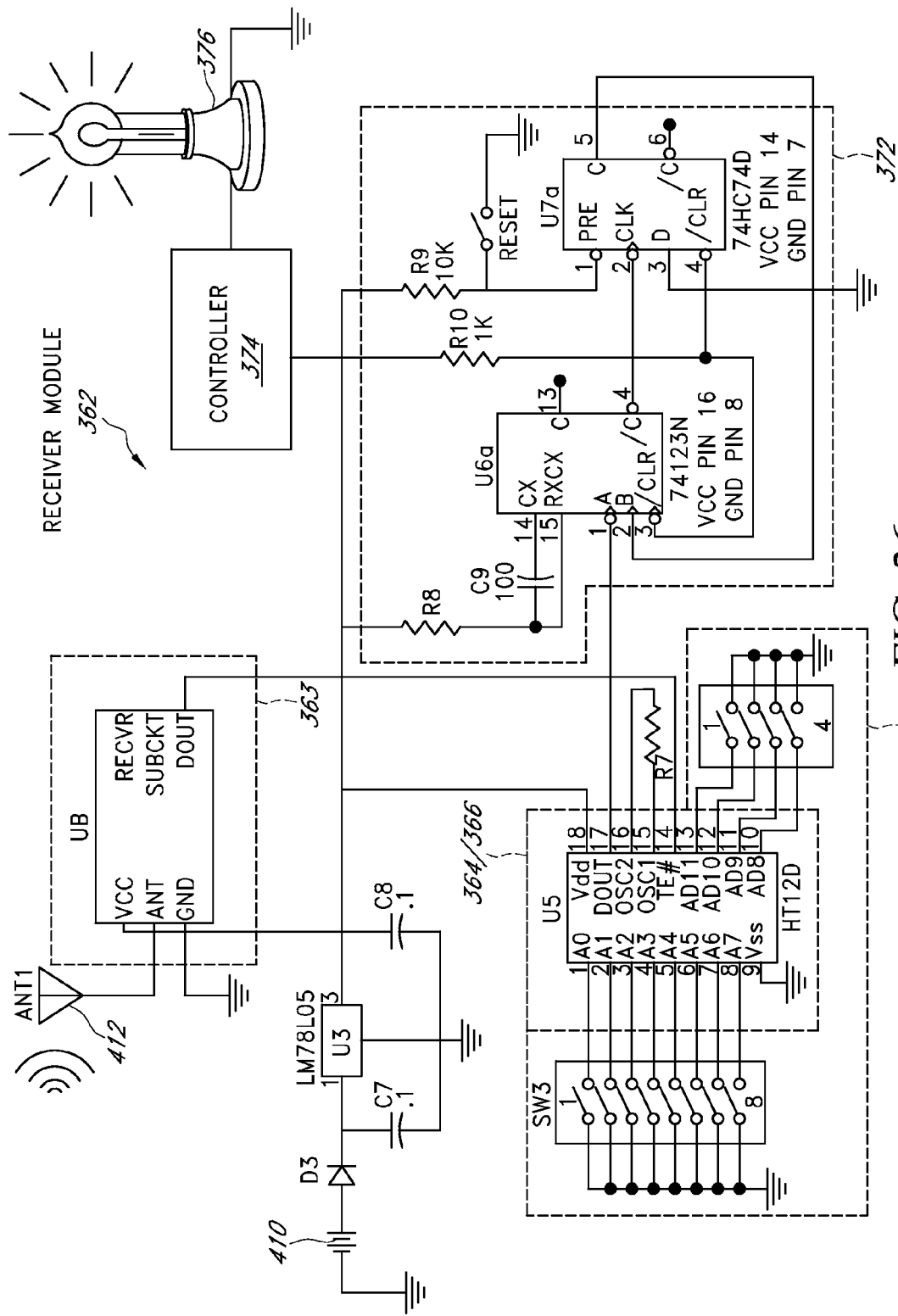
FIG. 26 is a detailed electrical circuit schematic of the RF receiver module of FIG. 23A adapted for use in accordance with one preferred embodiment of the present invention.

FIG. 26 is an electrical schematic diagram of an exemplary embodiment of receiver module 362 illustrated and discussed above. Power is supplied by a voltage source 410 which can be either a battery or a DC power supply. Voltage from voltage source 410 is regulated by voltage regulator circuit U3 such as type LM78L05 to produce a regulated +5 volt power supply for the functional blocks of receiver module 362. In operation, command signals transmitted from transmitter modules are received at loop antenna 412 and applied to RF receiver 363 including a receiver sub-circuit integrated circuit U8 such as type RX-2010 available from RF Monolithics in Dallas, Tex. The identification signal, including the twelve bit coded value in serial-bit format is coupled from the output of receiver sub-circuit U8 to shift register decoder and address comparator 364/366 which are implemented in an integrated circuit U5, such as a 212 series decoder type HT12D also available from Holtek Microelectronics. Decoder U5 converts the coded value in serial-bit format to parallel-bit format and compares that received coded value to the preselected stored coded fixed reference value in parallel bit format determined, for example, by the positions of the twelve single pole switches in switch packages SW3, SW4 of address storage module 368.

Receive timer 372 is implemented by one-shot timer integrated circuit U6a such as type 74123N and D-flip flop U7a such as type 74HC74D, both of which are available from National Semiconductor Corporation of Santa Clara, Calif. When comparator 366 detects a match between the received coded value from transmitter module 150 and the coded value stored in address storage 368 it resets one-shot timer U6a. If one-shot timer U6a is not again reset within the time determined by timing resistor R8 and timing capacitor C9, U6a then sets flip-flop U7a and its Q output becomes low thereby applying a voltage input to controller 374 signifying the end of a transmitted simple or complex spell. Controller 374 then processes the received command signal or signals (for example, stored in a stack register) and appropriately operates one or more associated play effects 376.

Those skilled in the art will appreciate that the switch positions of the twelve switches SW1, SW2 of transmitter module 150 correspond to the switch positions of the corresponding twelve switches SW3, SW4 of receiver module 362. These preset values may be fixed or dynamic, as discussed above. The twelve-bits available for storing coded values may be apportioned in a convenient way, for example, into an address portion and into a data portion. For example, the twelve-bit coded value can be apportioned into a ten-bit address portion (1024 possible combinations) and a two-bit data portion, which would accommodate up to four different transmitter command signals. If desired, the ten-bit address portion can be further divided into various logical portions representing, for example, the designated wand level (for example, 1, 2, 3 or 4), special acquired magic powers or skills, experience levels and the like. This coded data would preferably be shared and coordinated between all transmitter modules 150 and receiver modules 362 such that each wand effectively would have its own unique powers and abilities as represented and identified by the coded address data. Thus, certain receivers and associated play effects would not be actuated by certain wands unless the address coding of the transmitter module thereof is coded with the appropriate matching data. In addition, the timing between received signals may be used to determine the appropriate play effect or intensity of a play effect caused by operation of the wand 100. Persons skilled in the art will recognize also that recoding of transmitter modules is a convenient way to provide for advancement of game participants within an interactive gaming experience. For example, this can be accomplished manually (for example, by flipping dip switches SW1/SW2) or automatically/wirelessly (for example, via RF programmable code latching circuitry, not shown).

While the foregoing embodiments have been described in terms of a radio frequency (RF) transmission between a transmitter module 150 and receiver module 362, various alternative embodiments could also readily be implemented such as, for example, replacing (or complimenting) RF transmitter and receiver set (358, 363) with an appropriately selected infrared (IR) transmitter and receiver set or a laser or light system. The IR or laser system would have particular advantage where, for example, it is desired to provide directional control of a transmitted command signal such as may be useful for directional spell casting, target practice, and wand-based shooting galleries.

Light-Activated Interactive Play System

Figure 27:
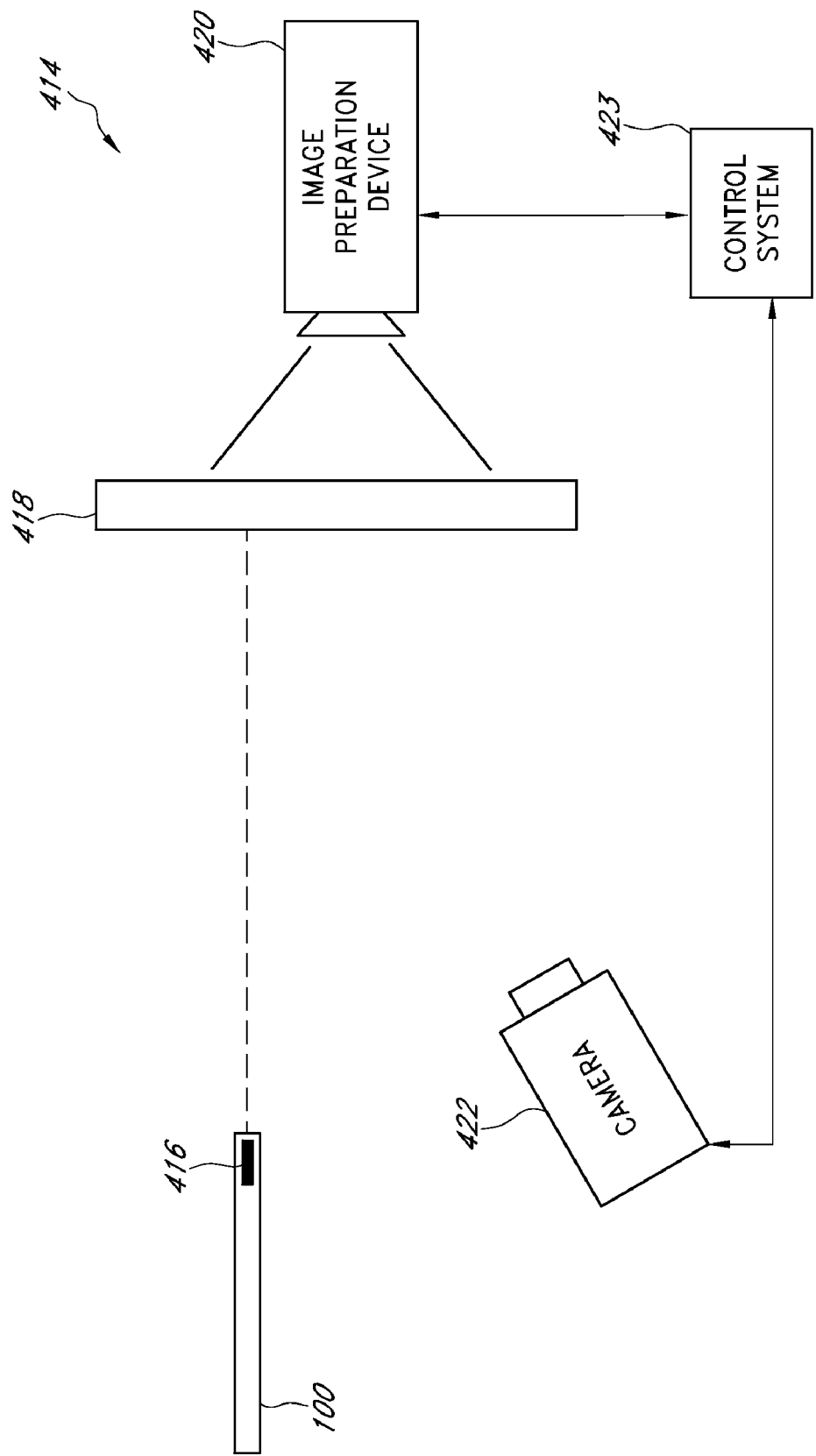
FIG. 27 is a simplified illustration of an interactive play system usable with light-activation in accordance with one preferred embodiment of the present invention.

For example, FIG. 27 illustrates an exemplary embodiment of a light-activated interactive play system 414 for use with embodiments of the invention utilizing laser technology. As shown in FIG. 27, the interactive play system 414 comprises the magic wand 100 having a light emitting module 416, a display device 418, an image preparation device 420, a camera 422, and a control system 423.

The light emitting module 416 of the wand 100 advantageously emits a directional signal, such as, for example, visible or infrared light. In one embodiment, the light emitting module 416 comprises a semiconductor laser. The signal output from the light emitting module 416 is emitted from an end opening of the wand 100 in a direction substantially parallel to the wand body. The signal may be generated from particular motions of the wand 100, as described herein, or from other input from the user.

In one embodiment, the user operates the wand 100 such that the signal emitted from the light emitting module 416 is directed to the display device 418. The display device 418 may comprises any device, apparatus or medium usable to intercept, reflect, and/or capture the signal emitted from the light emitting module 416 at an arbitrary position on the display device. In one embodiment, the display device 418 comprises a screen. In other embodiments, the display device 418 may comprise a wall, a mist, a door, a transparent surface, or the like.

Furthermore, the illustrated interactive play system 414 comprises the image preparation device 420, which operates to cause at least one image to appear on the display device 418. In one embodiment, the image preparation device 420 projects a video image and/or a still image onto the display device 418. For example, the image preparation device 420 may comprise a video projector, an LCD projector, or the like. In other embodiments, the image preparation device 420 may comprise multiple devices usable to project or to cause an image to appear on the display device 418. A skilled artisan will recognize from the disclosure herein a wide variety of objects, characters, and/or images that may be projected on the display device 418. For instance, the image preparation device 420 may project the image of mythical creatures, such as a dragon or a unicorn; magical objects, such as a flying carpet; or fantasy characters, such as a wizard or an elf; combinations of the same or the like.

In the illustrated embodiment, the display device 418 comprises a translucent material and is arranged in front of the image preparation device 420. In such an arrangement, the user's view of the image preparation device 420 may be partially or entirely obstructed by the display device 418. In other embodiments, the image preparation device 420 may be located near, to the side of, or in front of the display device 418 so long as an image may appear on the display device 418. In yet other embodiments, the image preparation device 420 is electrically coupled to the display device 418 through a wired or wireless transmission medium so as to cause images to appear on the display device.

In an embodiment, the camera 422 is directed at the display device 418 and advantageously captures, detects and/or records the arbitrary position of the signal emitted from the light emitting module 416 as the signal is intercepted by the display device 418. For example, the camera 422 may comprise a high-speed still camera or a specialized video camera used to take periodic or continuous photographs of a surface of display device 418. In an embodiment of the invention in which the light emitting module 416 outputs an infrared signal, the camera 422 is configured to record the infrared signal as it is intercepted by the display device 418. The camera 422 advantageously outputs a signal based on the captured image data to the control system 423, which captured image data includes information indicative of the position of the signal output by the light emitting module 416. In yet other embodiments, multiple cameras 422 are used in the interactive play system 414 to capture, detect, or record the position of the light emitting module signal as it is intercepted by the display device 418. For example, multiple cameras 422 may be directed at different sections of the display device 418 and/or may record or capture data from different angles.

In one embodiment, the control system 423 advantageously communicates with at least the image preparation device 420 and the camera 422. For example, the control system 423 may comprise a general purpose or a special purpose processor. However, an artisan will recognize that the control system 423 may comprise an application-specific integrated circuit (ASIC) or one or more modules configured to execute on one or more processors.

The control system 423 receives and processes the image data received from the camera 422. In one embodiment, the control system 423 analyzes the position and/or movement of the signal from the light emitting module 416 to determine modifications to be made to the subsequent images to be produced by the image preparation device 420. For example, the control system 423 may determine from the image data that a user has cast a certain "spell" by motioning the wand 100, and therefore the light emitting module 416, in a particular recognizable pattern. The control system 423 may make this determination by tracking the movement(s) of the light emitting module signal across the display device 418, which movement is recorded in the image data output from the camera 422.

For example, the control system 423 may initially command the image preparation device 420 to project an image of a brick wall onto the display device 418. The user, who sees the image of the brick wall, points his or her wand 100 toward the brick wall such that the light emitting module 416 outputs a signal, such as a red dot caused by a laser, onto the brick wall (and the display device 418). The user then motions the wand in a particular pattern, such as is described herein, to cause a desired motion of the red dot across the display device 418. The camera 422 records this movement in its image data, which is output to the control system 423 for processing. If the control system 423 determines from the image data that a certain spell has been cast, such as a "move wall" spell, the control system 423 causes the image preparation device 420 to project an image of the wall disappearing or moving out of the path or view of the user.

Although the interactive play system 414 is disclosed with reference to particular embodiments, a skilled artisan will recognize from the disclosure herein a wide variety of alternatives usable with the system 414. For example, the display device 418 may comprise a large liquid crystal display (LCD) screen coupled to an image preparation device 420 comprising a digital video source, such as a memory. Furthermore, sensors, such as optical or infrared sensors, usable to detect the position and/or movement of the light emitting module signal may be used in place of, or in combination with, the camera 422.

In yet another embodiment, the control system 423 may be in communication with a central system or database and/or various receivers capable of causing one or more play effects. Thus, the control system 423 may, in response to the signal emitted from the light emitting module 416, control or cause play effects other than modifications to the image on the display device 418. For example, the control system 423 may command a light to turn on or a book to open based on the signal captured by the camera 422.

Figure 27A:
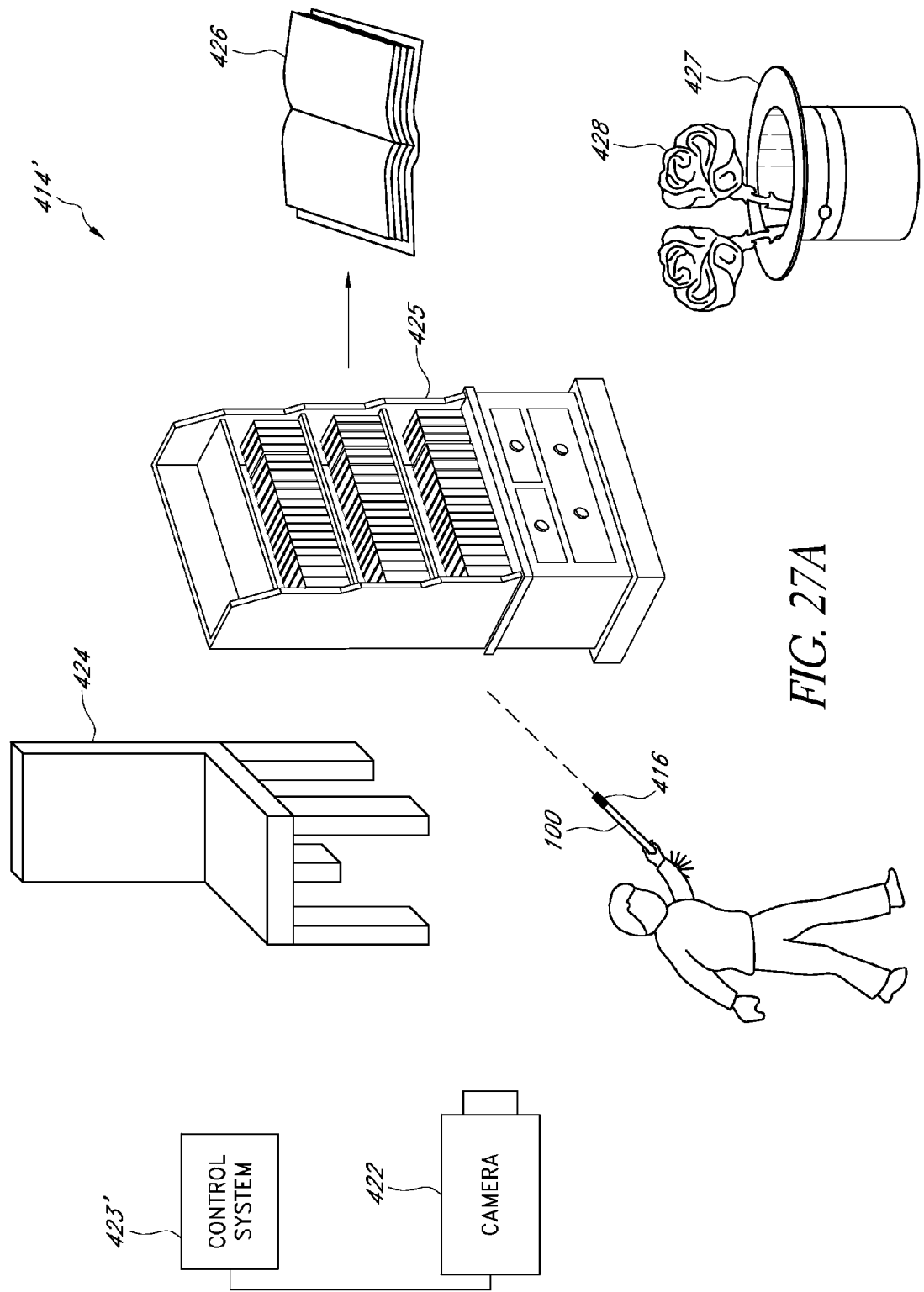
FIG. 27A is a simplified illustration of another embodiment an interactive play system usable with light-activation.

FIG. 27A depicts yet another embodiment of an interactive system for use with light-activation. As shown, a light-activated interactive play system 414' includes similar components as the interactive play system 414 of FIG. 27. In particular, the illustrated interactive play system 414' includes the camera 422 that advantageously captures, detects and/or records the position of a signal emitted from the light emitting module 416 of the wand 100. In one embodiment, the camera 422 is located within a substantially enclosed area, such as, for example, a room, and detects the signal emitted from the light emitting module 416 within the room and/or directed at objects or effects within the room. In other embodiments, multiple cameras 422 are located within a single room.

The camera 422 communicates with a control system 423'. Similar to the control system 423 of FIG. 27, the control system 423' receives and processes the image data received from the camera 422. For example, the control system 423' may analyze the position and/or movement of the signal from the light emitting module 416 within a room. In one embodiment, the control system 423' advantageously communicates with one or more effects, such as through wired or wireless communications, to control or trigger the effects based on the image data from the camera 422. For example, as illustrated in FIG. 27A, the interactive play system 414' includes effects such as a chair 424, a bookshelf 425 having at least one book 426, and a magic hat 427 with flowers 428.

An embodiment of a method for interactive game play will now be described with reference to FIG. 27A. A user or game participant enters a room having the interactive system 414'. The user then maneuvers his or her wand 100 such that the light emitting module 416 emits its signal in a certain direction and/or pattern, which signal is captured by the camera 422. The control system 423' then receives image data from the camera 422 that includes information relating to the position and/or movement of the signal within the room. Using this image data, the control system 423' triggers and/or controls at least one special effect.

For example, in one embodiment, if the user directs the signal from the light emitting module 416 toward the chair 424, the control system 423' causes the chair to "levitate" or to move. If the user directs the signal from the light emitting module 416 toward the bookshelf 425, the control system 423' may cause the book 426 to move or to open. If the user directs the signal from the light emitting module 416 toward the magic hat 427, the control system 423' may cause the flowers 428 to appear. Each of these described special effects may be controlled by associated effects controllers, such as motors and/or processors, that are in communication with the control system 423'. In addition, a skilled artisan will recognize from the disclosure herein a wide variety of special effects usable with the interactive system 414'. For example, the control system 423' may trigger a cuckoo clock, a light to turn on, an inanimate object to speak, and so forth.

In yet other embodiments of the invention, the user performs a predetermined pattern or movement of the wand 100 to initiate a "magic spell." The movement of the wand 100 causes a corresponding movement of the signal emitted by the light emitting module 416, which signal is captured by the camera 422. The control system 423' then processes the image data received from the camera 422 to determine which "spell" was cast and to cause or trigger the special effect(s) associated with the particular spell.

Competitive Games and Play Effects

It will be apparent to those skilled in the art from the disclosure herein that the invention disclosed and described herein facilitates a plethora of new and unique gaming opportunities and interactive play experiences heretofore unknown in the entertainment industry. In one embodiment the invention provides a unique play experience that may be carried out within a compatible play facility, retail space and/or other facility utilizing a wand as disclosed and described herein. With a wand or other similarly enabled device, play participants can electronically and "magically" interact with their surrounding play environment(s) to produce desired play effect, thereby fulfilling play participants' fantasies of practicing, performing and mastering "real" magic.

For example, FIG. 28 illustrates one preferred embodiment of a wand-actuated play effect comprising a player piano 429 that is adapted to be responsive to or controlled by an RF command signal transmitted by magic wand toy 100. Those skilled in the art will readily appreciate that an RF receiver and associated controller, such as disclosed and described herein, can easily be concealed within the piano 429 and/or in the vicinity thereof such that it electronically interfaces with and directs various selected control circuitry associated with the piano 429. These may include, for example, circuitry for controlling: power on/off, song selection, playing speed and volume, instrument selection and special sound effects, sound sampling, combinations of the same or the like. In operation, user 430 would waive the wand 100 in accordance with one or more specific learned motions selected by the user to achieve a desired effect (for example, piano on/off, play next song, speed-up/slow down, change piano sound, combinations of the same or the like.). Most preferably, the wand 100 contains internal activation circuitry, such as described herein, such that the wand may be activated by the motion induced thereon by a user and so that actuation and control of the special effect appears to be, and has the feeling to user 430 of being, created by "real" magic.

Figure 29:
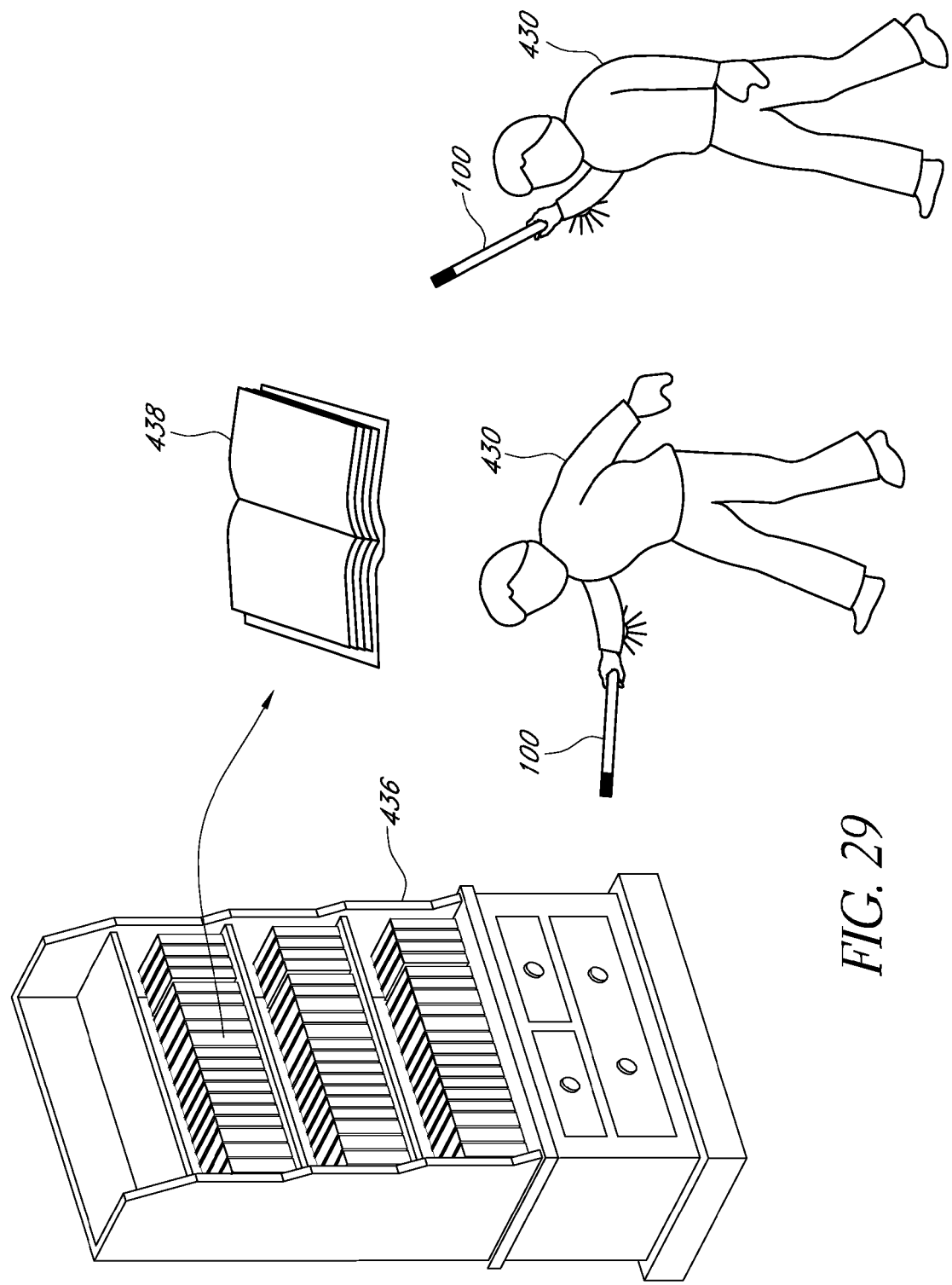
FIG. 29 is a perspective illustration of another preferred embodiment of a wand-actuated play effect comprising bookshelves with simulated levitating books controlled at least in part by the output of an RF receiver and/or magnetic reed switch having features and advantages in accordance with the present invention.

FIG. 29 illustrates another preferred embodiment of a wand-actuated play effect comprising magical or "enchanted" bookshelves 436. The bookshelves contain multiple shelves of simulated or real books 438 that are controlled by one or more concealed actuators. The actuators are preferably positioned and arranged such that, when actuated, they cause one or more selected books to move, vibrate or levitate. Again, those skilled in the art will readily appreciate that an RF receiver and/or associated controller, such as disclosed and described herein, can easily be concealed within the bookshelves 436 and/or in the vicinity thereof. Movement and vibration of selected books can be provided, for example, by various linear stepper-motor actuators associated with one or more of the books 438. Each actuator may be controlled, for example, by a magnetic reed switch closure hidden behind the binder of each book. As a user 430 lightly touches the binder of each book with a magnetically-tipped wand 100 the associated reed switch (not shown) is closed, connecting power to an associated vibrator/actuator. Then, as the user 430 waives the wand 100 in one or more particular ways the selected book appears to vibrate or move as if it is being lifted or controlled by the magic wand 100. More spectacular effects may include, for example: (i) an effect that causes all or some of the books 438 to vibrate or move violently, randomly and/or in a rhythmic pattern (for example, as if dancing); (ii) an effect that causes one or more books to appear as if floating or levitating; (iii) an effect that causes all or some of the books to magically rearrange themselves; (iv) an effect that causes one or more selected books to talk or tell stories; and (v) an effect that causes two or more books to appear to have a quarrel, argument or debate (for example, about an interesting historical fact or event). Some or all of these larger, more spectacular effects may be, and preferably are, restricted to only users 430 who possess and have learned to use, for example, a Level-3 wand or above. Thus, for example, a goal-oriented or object-driven, interactive game may be provided wherein play participants compete with one another to learn and master certain game tasks in order to achieve successively more challenging goals or objectives and to thereby earn additional powers, spells, abilities, points, special recognition and/or other rewards within the context of an overall game experience. Preferably, in each case and regardless of the level of wand used, actuation and control of the special effect appears to be, and has the feeling to user 430 of being, created by "real" magic. Of course, many other possible fun and/or exciting special effects will be readily apparent and obvious from the disclosure herein to persons skilled in the art.

Figure 30:
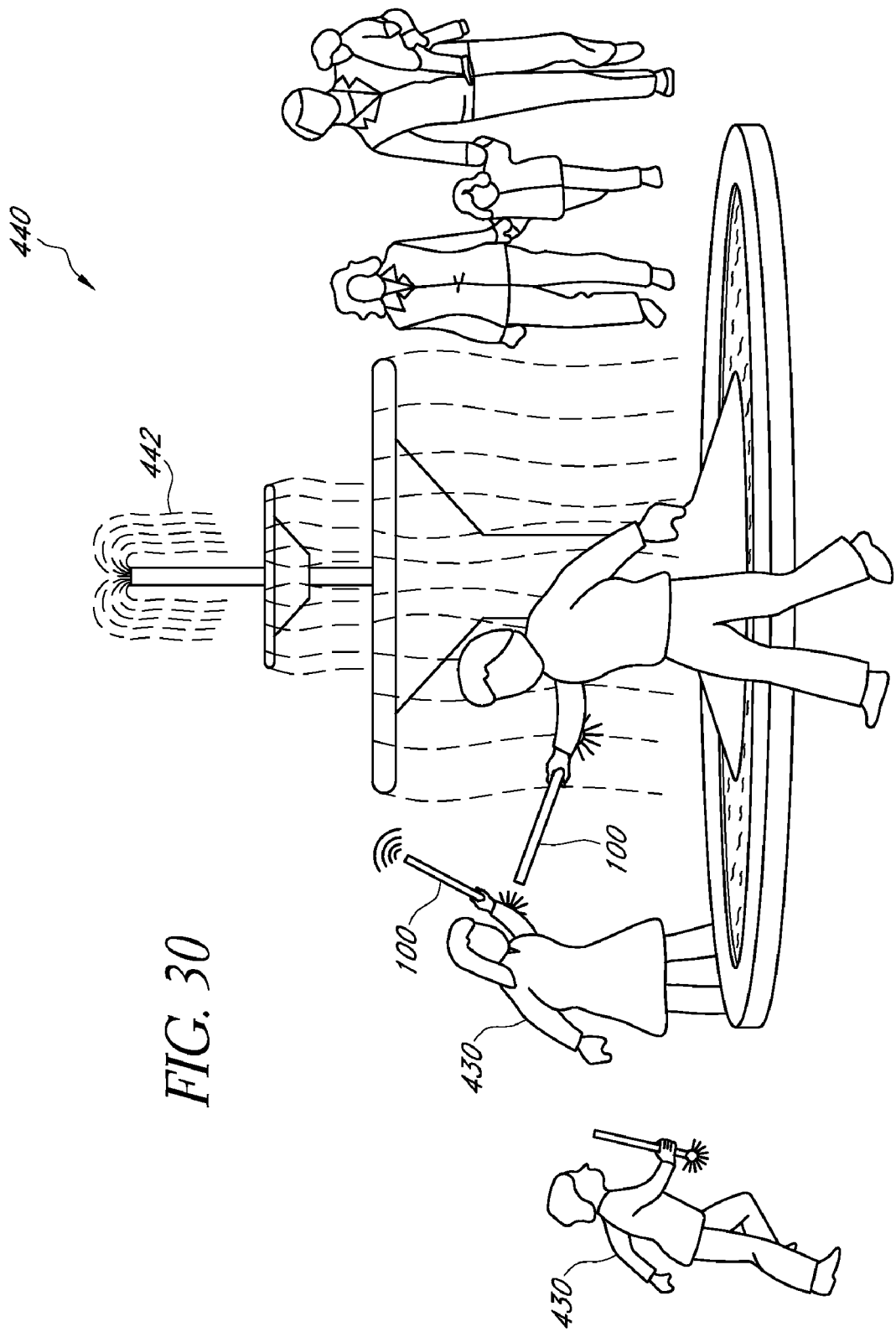
FIG. 30 is a perspective illustration of another preferred embodiment of a wand-actuated play effect comprising a water fountain effect controlled at least in part by the output of an RF receiver and/or magnetic reed switch having features and advantages in accordance with the present invention.

FIG. 30 illustrates another preferred embodiment of a wand-actuated play effect comprising a water fountain 440 having one or more associated water features 442 responsive to or controlled by an RF command signal transmitted by one or more wands 100. An RF receiver and associated controller, such as disclosed and described herein, can easily be placed within an associated fountain control system or panel, electronically interfacing therewith to direct or control various selected fountain features or functions. These may include, for example, on/off control of water flow, fountain lighting, special water features 442, combinations of the same or the like. In operation, one or more users 430 would waive their wands 100 in accordance with one or more specific learned motions selected by each user to achieve a desired effect (for example, fountain on, next water feature, increase/decrease water feature, change lighting intensity/color, or the like). Most preferably, each wand 100 contains internal activation circuitry, such as described herein, such that each wand may be activated by the motion induced thereon by each user and so that actuation and control of the special effect appears to be, and has the feeling to users 430 of being, created by "real" magic.

FIGS. 31A and 31B are time-lapsed schematic illustrations of a preferred embodiment of a play facility or play center constructed in accordance with the present invention. The play facility may comprise a family entertainment center, retail entertainment space, arcade, theme park, destination resort, restaurant, or the like, themed as a magic training center or any variety of other suitable themes as may be desired. The play facility preferably comprises multiple wand-actuated play effects 400, such as talking animals 452, magic hats 454, crystal balls 456, enchanted books 458, and various shooting-gallery-style pop-up target effects 460, 462. These may be physical play objects configured with special effects, as illustrated, and/or they may be graphical or computer-generated images displayed, for example, on one or more associated computer monitors, TV monitors, DVD display monitors, or computer gaming consoles and the like. Those skilled in the art will readily appreciate from the disclosure herein that all of these effects and many other possible play effects may be actuated or controlled by wand 100 using one or more RF receivers, RFID reader/writers and/or magnetic reed switches, as disclosed and described above.

Some interactive play effects 400 may have simple or immediate consequences, while others may have complex and/or delayed consequences and/or possible interactions with other effects. Some play effects 400 may local (short range) while other effects may be remote (long range). Each play participant 430, or sometimes a group of play participants working together, preferably must experiment with the various play effects using their magic wands 100 in order to discover and learn how to create one or more desired effect(s). Once one play participant figures it out, he or she can use the resulting play effect to surprise and entertain other play participants. Yet other play participants will observe the activity and will attempt to also figure it out in order to turn the tables on the next group. Repeated play on a particular play element can increase the participants' skills in accurately using the wand 100 to produce desired effects or increasing the size or range of such effects.

Most preferably, a live-action object-oriented or goal-oriented, interactive game is provided whereby play participants compete with one another (and/or against themselves) within a compatible play space to learn and master certain play effects and game tasks in order to achieve successively more challenging goals or game objectives and to thereby earn additional powers, spells, abilities, points, special recognition and/or other rewards within the context of an overall game experience. For example, play participants can compete with one another to see which participant or group of participants can create bigger, longer, more accurate or more spectacular effects. Other goals and game objectives may be weaved into an entertaining story, such as a magical quest or treasure hunt in which play participants immersed. The first task may be to build a magic wand. The next task may be to learn to use the magic wand to locate an open a secret treasure box filled with magical secrets (for example, various spell formulas or magical powers). The ultimate goal may be to find and transform a particular frog (identified by, for example, secret markings or other secret characteristics) into a prince/princess. Of course, many other gaming and theming possibilities and possible and desirable. Optionally, various "take home" play effects can also be provided for the purpose of allowing play participants to continue the magical experience (and practice their skills) at home.

In one preferred embodiment, a user 430 would preferably point and/or waive the wand 100 in accordance with one or more specific learned motions or "spells" selected to achieve a desired effect on one or more selected objects. For example, as illustrated in FIG. 31B, one spell may cause rabbit 452 to talk; another spell may cause hat 454 to magically sprout flowers 464; another spell may cause book 458 to open with a frog 466 jumping out; another spell may cause an image of a wizard 468 to magically appear (with optional sound and lighting effects) within crystal ball 456; another spell may cause candle 462 to magically light itself with a pop-up flame 470. Most preferably, wand 100 contains internal activation circuitry, such as described herein, such that the wand may be activated by the motion induced thereon by user 430 and so that actuation and control of the special effect appears to be, and has the feeling to users 430 of being, created by "real" magic. To provide added mystery and fun, certain effects 400 may be hidden such that they must be discovered by play participants. If desired, various clues can be provided such as, for example, part of a magical mystery game.

In each of the play effects described above, it is possible, and in many cases desirable, to provide additional control interlocks so that multiple input signals are required to actuate a given desired effect. For example, a proximity sensor may be provided associated with a given effect and electronically interlocked with the effect controller such that the effect cannot be operated if the proximity sensor is not also actuated. This could help reduce inadvertent or random actuation of the various effects. Similarly, voice activated controls and voice recognition software could also be implemented and interlocked with the effect controller so that, for example, a user 430 would need to say a particular "magic" word or phrase while waiving the magic wand 100 in order to actuate a desired effect.

As mentioned, the proximity sensor may be used to provide a "hover" effect that is indicative of the initialization of a control interlock. For example, when a proximity sensor in the wand 100 is moved with a particular distance of a receiver and/or effects controller, a "hover" effect occurs, such as, for example, the turning on of a light, the movement or vibration of an object, or any other perceptible signal (visual or audible) that notifies the user that a play effect may be initiated. This "hover" effect may notify the user that a spell may be cast so as to cause one or more effects.

In other embodiments, an RFID reader is preferably interlocked with one or more effects controllers in order to provide more precise control of various effects and also improved tracking of game progress, points, or the like. For example, one or more objects or targets 452, 454, 456, 458, 462 can be selected at close range using an RFID transponder and associated RFID reader. Once all such desired objects have been selected, the long range RF capabilities of the wand 100 can be used to control all of the selected objects/effect simultaneously. Those skilled in the art will readily appreciate from the disclosure herein that similar functionality can be easily provided with various magnetic reed switches and the like provided in association with each object or target. If desired, various pop-up targets 462 and the like may be arranged in a shooting gallery 460 whereby a user 430 can practice aiming the wand 100 and casting various spells at one or more desired targets 462. In this case the wand 100 preferably is adapted to send directional signals, such as infrared or laser, instead of or in addition to RF signals as described herein.

FIGS. 32A-D illustrate one preferred embodiment of a wand-actuated game 500 having unique features and benefits in accordance with the present invention. The game 500 basically comprises a 3×7 grid of lighted squares (including optional visual graphics and/or sound effects) that are controlled by a game effects controller (not shown) and one or more RF receivers (not shown). Those skilled in the art will readily appreciate and understand from the disclosure herein how to set up and program a game controller and/or one or more RF receivers as disclosed and described herein so as to achieve the game functionality and various effects as will be described herein below. Preferably, one RF receiver (or IR receiver, RFID receiver, or the like) is provided for each play participant 430 so that command signals from each player can be distinguished. For example, multiple RF receivers may be directionally focused or range-adjusted so as to receive RF command signals only from a selected corresponding player 430a or 430b.

Individual squares within a defined playing field 504 are preferably lit or dimmed in a timed sequence in response to one or more predetermined RF command signals ("spells") received from one or more RF-enabled wands 100. Preferably, special 3×1 arrays of squares 510a, 510b (labeled 1-2-3) are provided at opposite ends of a playing field 504 and are adapted to respond to a signal imposed by, for example, the presence, proximity or weight of play participants 430a, 430b, as they stand on each square. These special squares may be raised or otherwise differentiated, as desired, to indicate their special function within the game 500. Actuating individual squares within arrays 510a and 510b (for example, by stepping or standing on them) allows play participants 430a, 430b to select a corresponding column of squares in the playing field 504 in which they may desire to launch an attack, counterattack or defense using various learned spells or incantations. Spells may be actuated, for example, by waiving wand 100 in one or more particular learned motions selected to produce a desired play effect or spell. An infinite variety of such spells are possible as described above.

Preferably, when a spell is successfully cast by a player 430a or 430b, the first square immediately in front of the player lights up or is otherwise controlled to produce a special effect indicating that a spell has been cast. Other squares in the same column are then preferably lit in a timed sequence or progression moving toward the opposing player (see, for example, FIGS. 32B and 32C). Most preferably, the lighting effects for each square and/or other associated special effects are controlled or varied in a way to indicate the type of spell cast (for example, a fire ball spell, ice spell, transforming spell, or the like). For example, various colors or patterns of lights may be used to indicate each spell. Alternatively, various graphic images and/or associated sound effects may be used to indicate each spell. These may be displayed, for example, on an overhead TV or associated computer monitor (not shown).

Figure 32A:
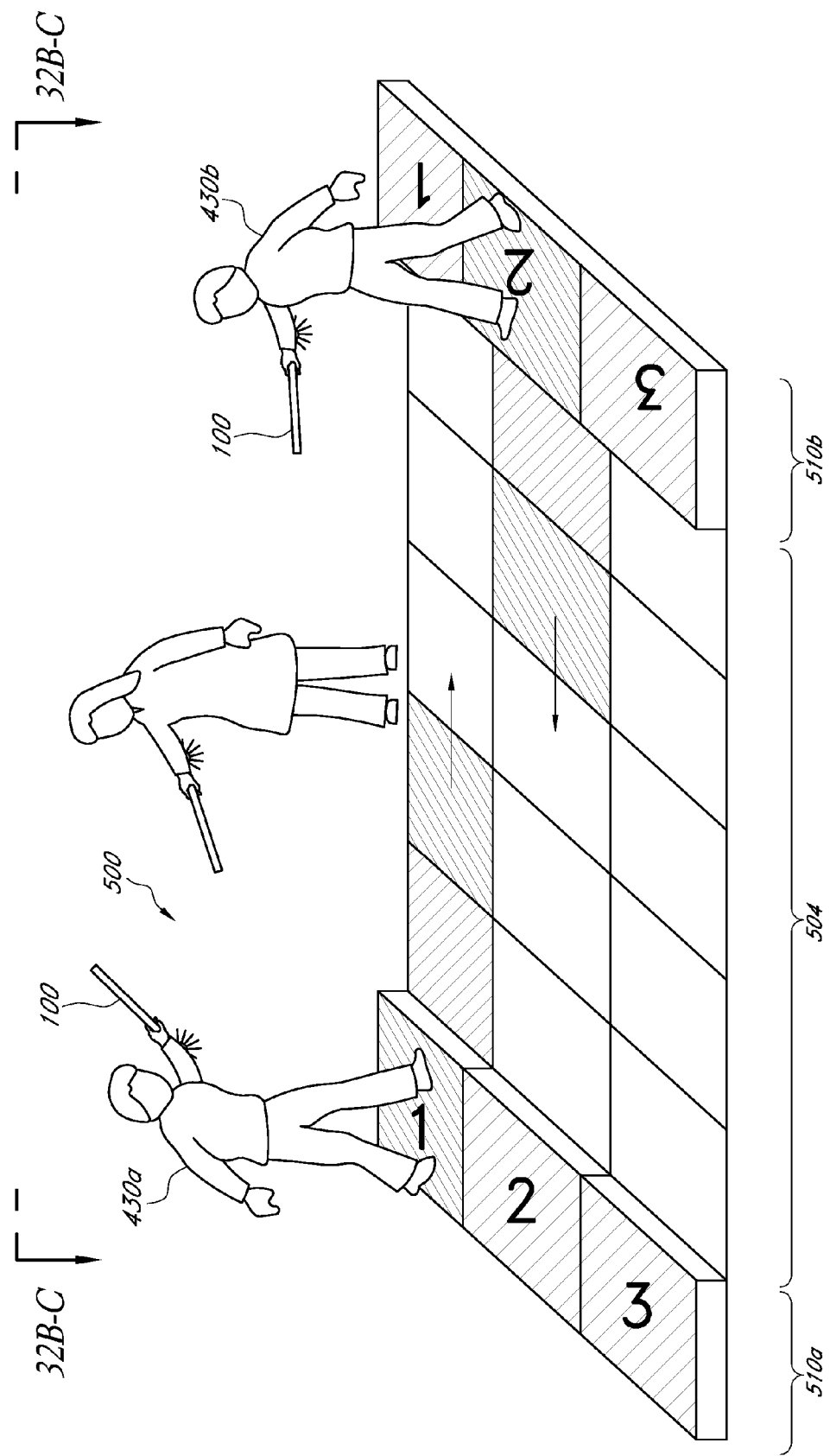
FIG. 32A is a perspective illustration of one preferred embodiment of a wand-actuated game comprising a grid of lighted squares that are controlled at least in part by one or more RF receivers and/or magnetic reed switches having features and advantages in accordance with the present invention.
Figure 32B:
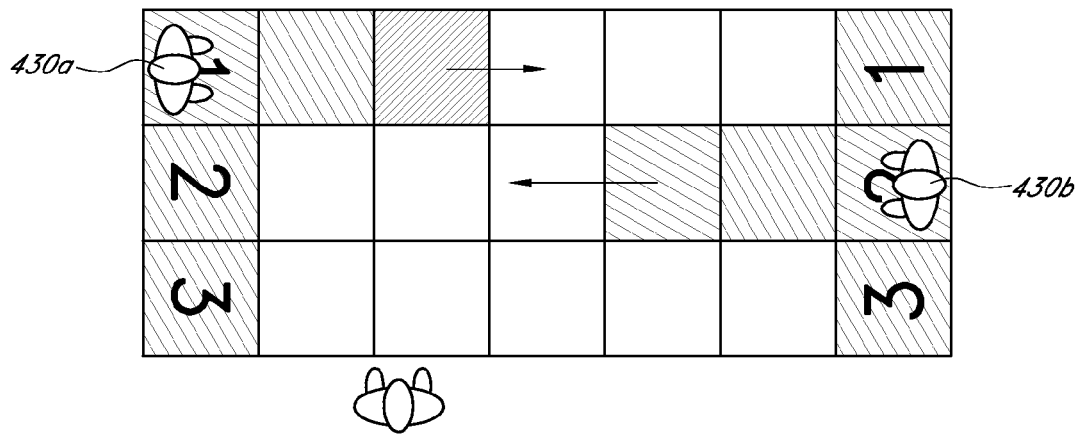
FIGS. 32B-32D are time-sequenced top plan views of the wand-actuated game of FIG. 32A, illustrating the preferred operation thereof and having features and advantages in accordance with embodiments of the present invention.
Figure 32C:
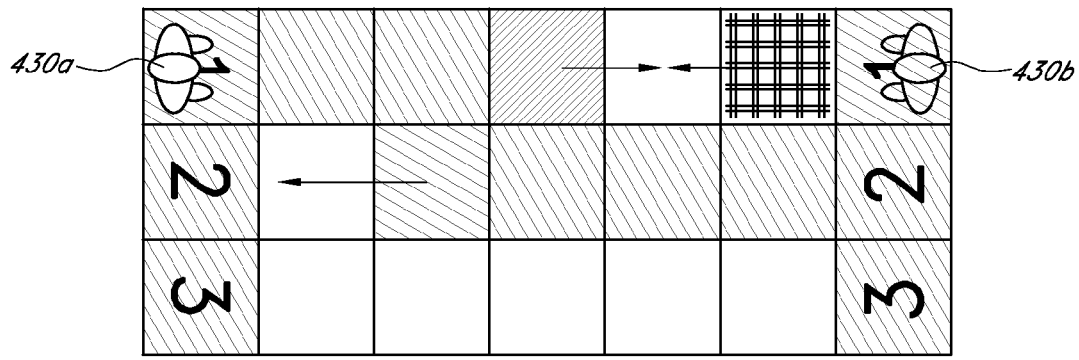
Figure 32D:
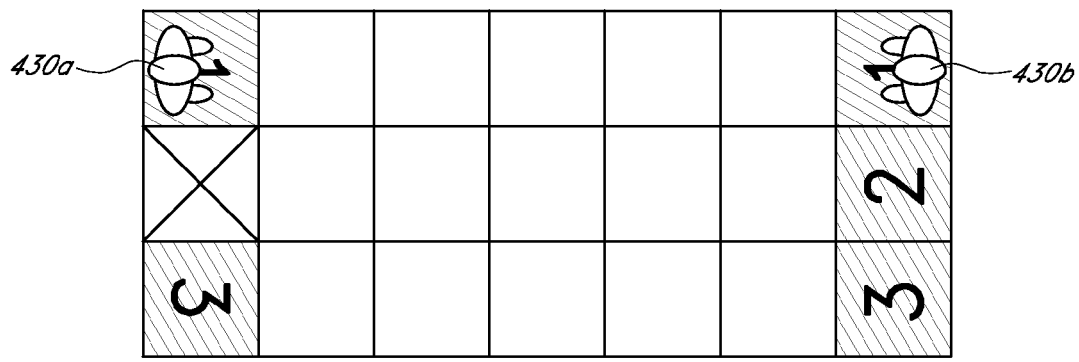

When an opposing player perceives that a spell has been cast and is moving toward him, that player (for example, player 430b in FIG. 32B) attempts to quickly identify the type of spell and to cast in the same column a counter-measure or "blocking spell" in an attempt to neutralize or block the advancing spell (see, for example, FIG. 32C). The blocking spell may be cast, for example, using the same particular wand motion or series of wand motions used to cast the "forward spell", except with a "block" command added. Thus, a blocking spell is launched toward the advancing spell, as indicated by a progression of lighted squares and/or other effects controlled in a similar fashion as described above. If the blocking spell is effective (i.e., properly selected and executed), then the advancing spell is neutralized and the lighted column of squares is cleared (see, for example, FIGS. 32C and 32D). If the blocking spell is ineffective, then the advancing spell continues until it reaches the end of the column. Preferably, whenever a spell reaches the opposing side, points and/or other gaming advancements are awarded to the successful player. These may vary, for example, depending upon the difficulty level of the spell, the experience level of the opposing player, and the like. In one particularly preferred embodiment, successful players are rewarded (and unsuccessful players are punished) by allowing certain spells to "capture" or disable the opposing player's special square in each corresponding column (see, for example, FIG. 32D). Once all of a player's special squares 510a, 510b have been captured or disabled the game is ended.

Preferably, the speed of game play progresses and becomes faster and faster as game play continues (for example, spells move faster). In this manner, the game 500 continually challenges game participants to improve their reaction speed and spell accuracy. The game also encourages players to learn and master more difficult or complex spells, as these will be typically be harder and take longer for an opponent to successfully block. Certain additional spells or advanced commands may also be provided for speeding up a spell or slowing down an advancing spell. Any infinite variety and possibility of other spells and game play nuances are possible and desirable in accordance with the fundamental aspects of the invention disclosed and described herein.

Those skilled in the art will also recognize from the disclosure herein that the game 500 is not limited to use with RF-enabled input devices, such as wands, cards, tokens and the like, as described herein. Alternatively, the game 500 may be readily adapted and used with a wide variety of other input devices, including, without limitation, RFID tracking, magnetic actuators, joysticks, push-buttons, computer mouse or keypad, foot pedals, motion sensors, virtual-reality gloves and the like, proximity sensors, weight sensors, or the like. Similarly, the game 500 is not limited to use with a magic theme, but may be implemented in a wide variety of other suitable themes such as, without limitation, war games, martial arts, "shoot-out" games, alien invasion, memory games, board games, educational games, trivia games, strategy games, and the like. It is also specifically contemplated that the game 500 may be expanded or modified to accommodate 3 or more players. For example, a six-sided game field accommodating up to six different players may easily be implemented using a similar playing field made up of hexagonal "squares."

Master System

In addition, a skilled artisan will recognize from the disclosure herein that the foregoing competitive games and/or play effects may use a central or master system to coordinate, control, and/or monitor the status of the games or effects in a particular area. For example, a central database may be used to monitor the skill levels of all those who are participating in the competitive game in a particular location. In other embodiments, the central system may comprise a centralized computer network that monitors the operation of each wand 100 (for example, the play effects caused by operation of the wand) within a particular area. In yet other embodiments, the wands 100 may automatically download information from the central system.

Interactive Game

Figure 33:
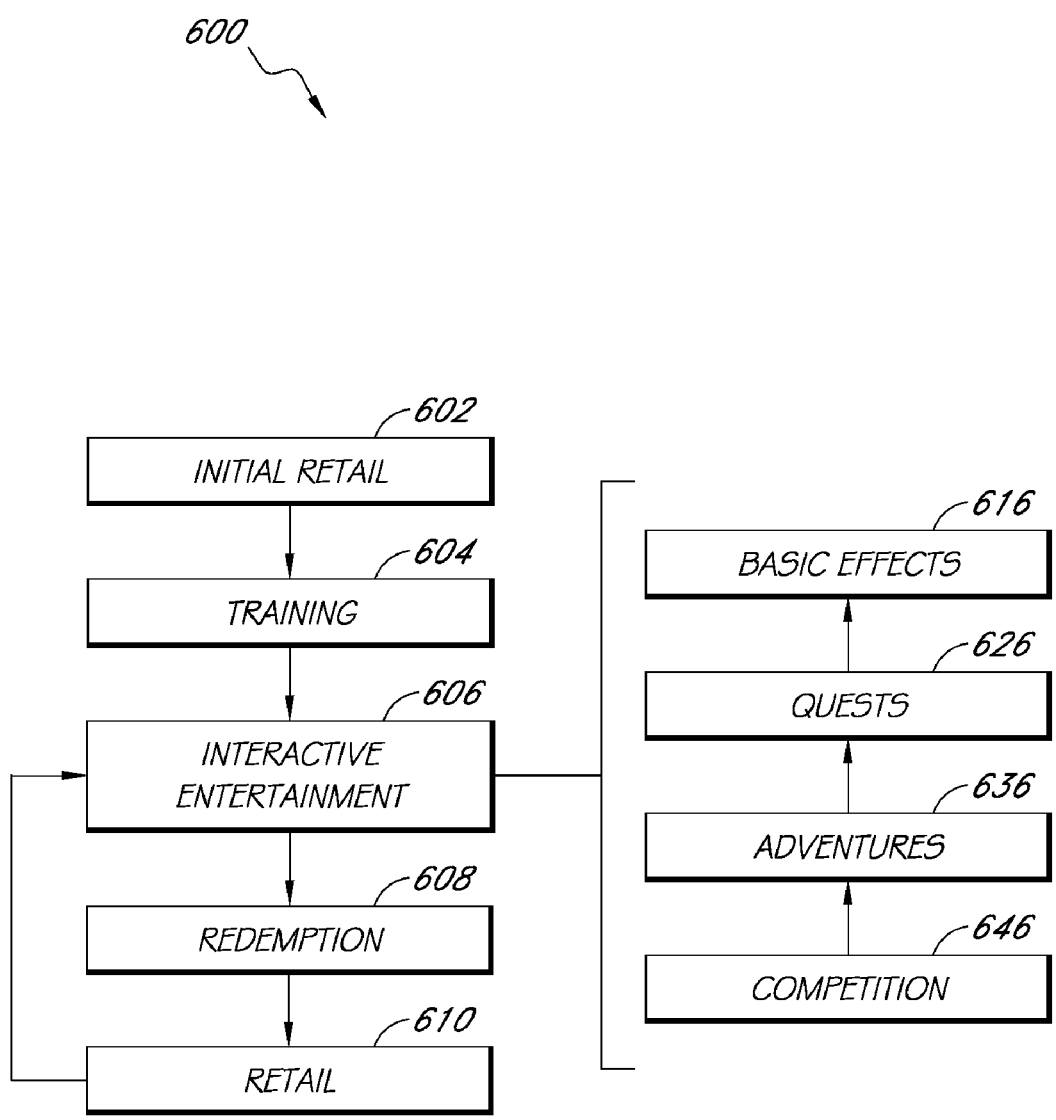
FIG. 33 illustrates a flowchart of a multi-layered interactive game that utilizes both retail and entertainment phases, according to certain embodiments of the invention.

As discussed above, systems and methods described herein may be utilized in an interactive game environment, wherein an experience of a game participant may dynamically change based on a variety of factors. FIG. 33 illustrates a flowchart of a multi-layered interactive game 600 that interleaves retail and entertainment phases, according to certain embodiments of the invention. For exemplary purposes, the interactive game 600 will be described with reference to a magic-themed game wherein game participants use a magic wand to accomplish a variety of tasks, such as one of the wands described previously. It is recognized that the interactive game 600 may be used in a variety of environments.

As shown in FIG. 33, the interactive game 600 begins with an initial retail phase (Block 602). During the retail phase, the game participant acquires (for example, purchases) an item that allows the participant to enter and participate in a gaming area or entertainment space. In certain embodiments, the item allows the participant to interact with a physical space, such as with other objects and/or other game participants. For instance, the participant may purchase a magic wand that allows the participant to pass through an entrance gate into a game area. The magic wand may then activate one or more sensors around a play space that allow a computer to track the participant's movement and progress within the game 600.

In certain embodiments, the retail phase may be performed near a gaming area, such as in an adjacent room. For instance, the retail phase may take place in a gift shop or the like. In yet other embodiments, the retail phase may be performed online by the game participant. For example, the participant may purchase an item over the Internet or other network or virtual environment.

After the retail phase, the game participant moves to the training phase (Block 604). During the training phase, the participant is provided with information relating to his or her participation in the game. For example, the participant may be provided with the rules and/or guidelines for the game via a video and/or a game character. In some embodiments, the game participant may bypass the training phase (Block 604), such as, for example, if the game participant is already familiar with the game 600 or if the game 600 does not include training.

Following the training phase, the participant moves to the interactive entertainment phase (Block 606). During the interactive entertainment phase, the participant is involved in one or more activities through which the participant may progress and/or advance in the game 600. For instance, the participant may advance through a series of clues to obtain a variety of virtual objects. A computer system may track, such as through a database, information regarding the actions of the participants during the interactive entertainment phase.

In certain embodiments, the interactive entertainment phase is dynamic and changes based on the status, experiences and/or items acquired by the participant. For example, during the interactive entertainment phase, the participant may acquire virtual objects that give the participant new abilities or spells. The computer system may then update this new information in the database and modify the interactive entertainment accordingly.

In certain embodiments, and as described in more detail below, the interactive entertainment phase comprises a variety of levels and/or layers that are interrelated. For instance, the progress of the participant during one level may directly affect the participant's advancement to and/or success in a subsequent level.

From the interactive entertainment phase, the participant may move to the redemption phase (Block 608). During the redemption phase, the participant may redeem virtual items and/or points that he or she has acquired for real items that may be obtained in a store. For instance, a participant who has acquired a certain level of points may redeem the points for a rune, such as an artifact or a jewel.

The participant may also have the option of directly purchasing an item from the retail location (Block 610). In such circumstances, the participant need not redeem or have acquired any points or objects to purchase the desired item. For example, the participant may pass through a gift shop when leaving the game area and may purchase even more items for use inside the game or as a souvenir. In other embodiments, only participants who have reached a certain level can purchase an item and/or purchase the item at a "special" and/or reduced price.

As shown in FIG. 33, once the participant has redeemed and/or purchased an item from the retail location, the participant may return to the interactive entertainment phase (Block 606) to complete one or more challenges. In certain embodiments, the items that the participant has acquired from the retail store may be decorative and/or may further assist the participant in the interactive game.

In certain embodiments, an item that is purchased from the retail area is associated with a higher "power" or strength than the powers associated with a similar item acquired through redemption and/or as a result of one or more activities. For instance, a rune that is purchased through a retail store may give a participant more powers in the interactive entertainment phase than the same rune that has been acquired by another participant through an interactive quest or may allow the participant access to certain features of the game to which participants without the rune are not allowed access.

In certain embodiments, the participant is able to end the interactive game 600 at his or her convenience. Because a computer system records the progress of the participant, the participant is able to return to the interactive game 600 at a later time and/or another day and is able to continue his or her game where he or she left off. Such a game advantageously provides for virtually endless possibilities in managing the game and allows for additional layers to be added to the interactive entertainment phase as previous phases are completed.

Although the interactive game 600 has been described with reference to particular embodiments, a wide variety of alternative sequences may be used. For example, the blocks described herein are not limited to any particular sequence, and the acts relating thereto can be performed in other sequences that are appropriate. For example, described acts or blocks may be performed in an order other than that specifically disclosed, or multiple acts or blocks may be combined in a single act or block or be performed substantially currently.

For instance, in certain embodiments, the participant may not be required to initially purchase an item (Block 602) to enter the interactive entertainment phase. Instead, the participant may be provided with a "loaner" wand for use in the interactive entertainment phase. The participant may then be given the option to purchase the wand at the end or during the game play. The participant may also be given one or more objects that may be discarded or "upgraded."

Furthermore, FIG. 33 illustrates a plurality of blocks comprised by the interactive entertainment phase represented by Block 606. In particular, the interactive entertainment phase comprises a plurality of layers that are interrelated such that progress in one or more layers may affect the participant's experience in one or more other layers. In certain embodiments, the layers are hierarchal and include upper layers that encompass one or more lower layers. As a participant completes a task or activity in one of the lower layers, he or she may be given access to, or his or her interactive experience may change, with respect to one or more of the higher layers.

As shown in FIG. 33, the interactive entertainment phase has a basic layer (Block 616). In certain embodiments, the basic layer is the first layer of game play and includes a simple magic effect, such as at least one audio, visual and/or physical effect that is activated or triggered by a device associated with the participant, such as, for example, a magic wand. For instance, a participant may enter the game place with his or her magic wand in an effort to find one or more objects. The participant may then maneuver his or her magic wand to activate a box that lights up and shows the words "You found the forest fern" or that shows a picture of a forest fern.

In other embodiments, at least one of a plurality of simple effects may be activated by the participant in the basic layer, including, but not limited to: the playing of a sound, such as a voice or a musical tone; the lighting of a crystal; the opening of a treasure chest, the playing of a musical instrument; the turning on of a video display, such as a picture; the lighting of a lantern; the talking of a book; the sounding of thunder and/or the shaking of a ground surface beneath the play participant as strobe lights flash; and combinations of the same and the like.

During the basic phase, the participant may be awarded points for the each time he or she activates an effect. In certain embodiments, the points may be in the form of "gold" and/or experience points. For instance, the more experience points a participant has, the further the participant progresses in the game. The participant may even be awarded a certain level or title as he or she gathers points (for example, 0-1000 points is an Apprentice Magi; 1000-2000 points is a Beginning Magi; 2000-5000 points is an Advanced Magi; and over 5000 points is a Master Magi).

The basic layer is advantageously adapted to the beginner-level participant. Even young children, such as three- to five-year old children may enjoy an extended period of time activating various audio and/or visual effects. Such a layer is also adapted to those who are not interested in performing a more involved quest but enjoy observing the different effects possible through the use of the magic wand. In other embodiments, the basic layer is limited to participants who have purchased only the basic wand and/or a basic entrance pass.

For many participants, however, the basic layer serves as a platform to a subsequent layer, such as the quests layer illustrated by Block 626 in FIG. 33. In certain embodiments, the quests layer includes one or more interactive challenges that a participant experiences and/or completes to advance in the interactive game 600. An exemplary embodiment of such challenges is detailed below.

The quests layer may comprise a plurality of "missions" that are given to the participant by a "GameMaster" or a "QuestMaster." The participant is provided with a screen that lists all of the available quests and their associated "runes" and/or tokens. As the participant completes each quest and collects the rune(s), the magic wand of the participant is given new powers, and the participant acquires additional gold and/or experience points.

In certain embodiments, the quest sequence begins with the participant activating a main quest screen by waving his or her magic wand. A sensor near the screen detects and identifies the wand, which has a unique identification stored in the computer system. For instance, the wand may be identified by an alphanumeric code and may be associated with a participant named "Jimmy." The main quest screen then greets Jimmy by name by displaying the phrase "Welcome Magi Jimmy" and provides Jimmy with a number of options. For example, the main quest screen may allow Jimmy to select a "Quests" option, an "Adventures" option or a "Status" option. In certain embodiments, by selecting the "Status" option, the main quest screen displays the total gold and/or experience points Jimmy has acquired and his progress on any quest or adventure he has commenced.

Figure 34A:
FIGS. 34A-34E illustrate screen shots usable with the multi-layered interactive game depicted in FIG. 33, according to certain embodiments of the invention.

When Jimmy selects the "Quests" option, a display appears on the main quest screen showing twelve runes. FIG. 34A illustrates an example screen shot 650 depicting twelve different runes that are each associated with a different quest and/or that represent a special power that is granted when the participant completes the quest.

Figure 34B:
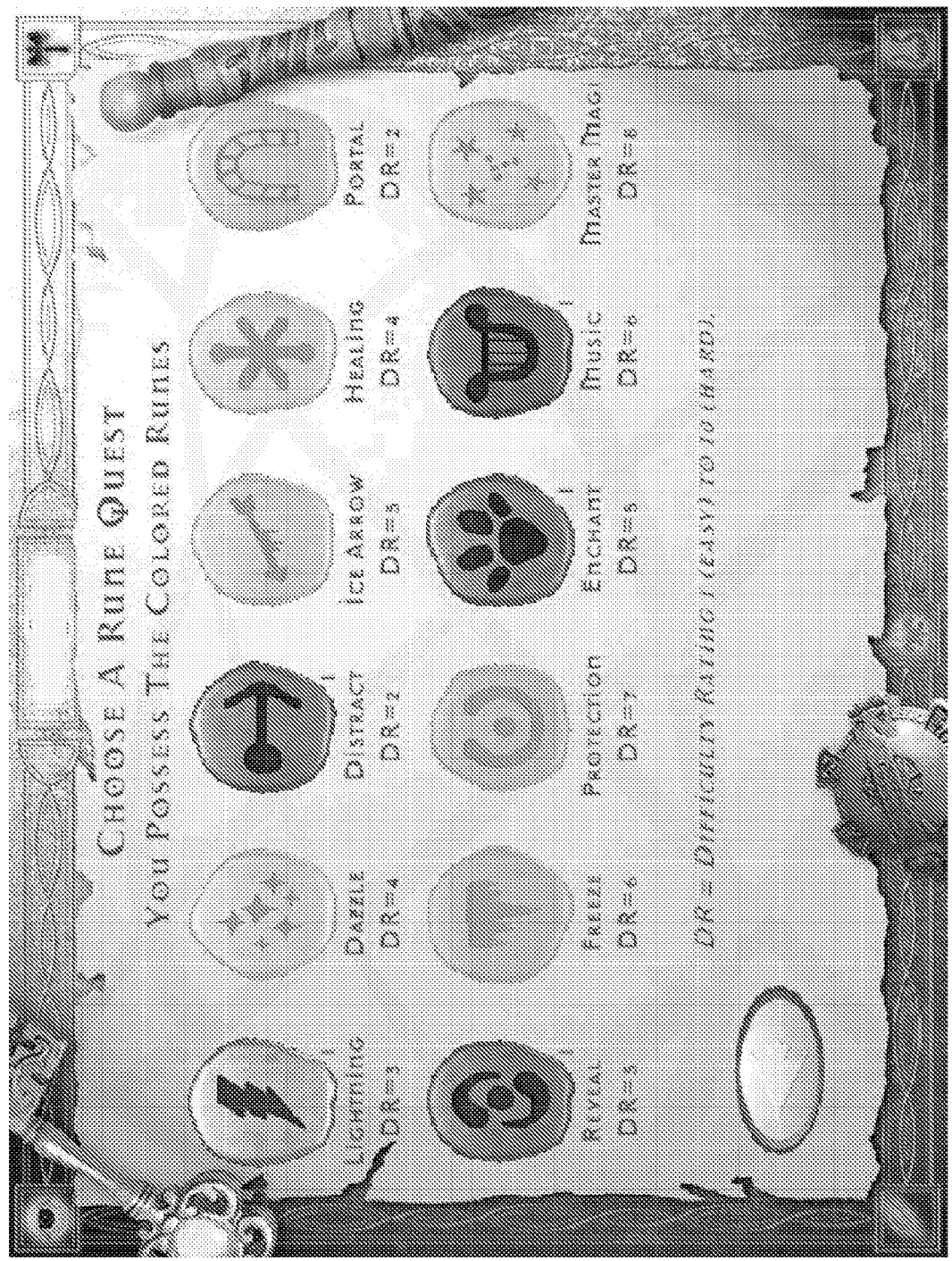

In certain embodiments, when Jimmy selects a particular rune (for example, through pointing his magic wand), the QuestMaster appears on the screen (for example, as a full motion live action or an animated character) and tells Jimmy a story about the rune, its powers and what Jimmy must accomplish to earn the rune. Once the QuestMaster has finished talking, another screen appears that shows Jimmy the physical items that he must find in the interactive game area. Each time Jimmy finds a particular item, the item is highlighted on the screen with a surrounding glow. This allows Jimmy to monitor which items have been found and those items that he still has yet to obtain. For instance, FIG. 34B illustrates an exemplary screen shot of a plurality of runes that can be obtained through a plurality of quests. As shown five of the runes, which are highlighted, have already been obtained by the participant (i.e., a Lightning Rune 661, a Distract Rune 662, a Reveal Rune 663, a Enchant Rune 664, and a Music Rune 665).

To accept a quest, Jimmy, selects an "Accept" button. This notifies the computer system that the wand associated with Jimmy is now active with respect to the selected quest. Thus, when Jimmy finds the right item, the computer system recognizes the item and rewards Jimmy accordingly. In certain embodiments, if Jimmy obtains the wrong item, the computer system may notify him as well.

Figure 34C:

Quests may take on many different forms. For instance, a quest may comprise of one or more scavenger hunts wherein the participant is required to find one or more objects identified by a list. For example, in order to complete a "Lightning Quest," a participant may be required to find a suit of armor, a shield, a sword in a stone, and a Book of Lightning. FIG. 34C illustrates an exemplary screen shot 670 that depicts the items needed to complete the Lightning Quest. Each of these items may be tangible items that are located and/or hidden in a predefined play space and identified by a sensor located on or approximate thereto. For example, the participant may "acquire" the item by waving his magic wand (or like device) at the item such that the sensor detects the wand and outputs a signal to the computer system, which records the participant's obtaining of the particular item. In other embodiments, the items may be virtual items that may be acquired when the participant completes one or more tasks and/or activities.

In certain embodiments, once the participant has acquired all the items, the participant is given one final task to collect the rune and/or complete the quest. For example, the participant may be required to contact a Duel Master, which may be an animated or live action character depicted on a screen.

In certain embodiments, a quest may contain one or more characters that respond to signals from the magic wand or like device depending on the progress of the participant in the interactive game 600. These characters may "live" in the game by being continuously depicted on a screen (whether or not they are "active"). For example, a Dragon may be asleep in his lair, snoring and exhaling smoke when no players are in the lair to challenge him. Likewise, the Duel Master may pace back and forth in his room until a player "activates" him.

For instance, the Duel Master may be activated by a participant who has completed all the elements of the particular quest (for example, finding all the items) and that directs his or her wand at the entrance to the Duel Master's house. The computer system then accesses its database to determine if the participant associated with the wand has completed all the tasks. If the participant has completed all the tasks, the computer system activates a new video sequence in which the Duel Master turns and looks at the camera, thanking the player for finding all of the items and rewarding them with the rune. An animated graphic of the Rune then appears on the screen with the Duel Master. When the participant later accesses the "Status" option on the main quest screen, the Rune is displayed as being earned by the participant and the participant may activate one or more powers associated with the Rune. For instance, a Lightning Rune may allow a participant to "zap" non-participant characters in the interactive game 600 and/or other participants in the gaming area or at a dueling station In other embodiments, a quest may comprise a timed event during which a participant is required to find one or more items. In yet other embodiments, a quest may comprise finding a particular object and delivering the object to another character. A skilled artisan will recognize from the disclosure herein a wide variety of alternative forms of activities and/or tasks usable with one or more quests.

With reference to FIG. 33, the interactive game 600 may comprise a subsequent level to the quests layer. As shown, the quests layer may serve as a platform to an adventures layer (Block 636). For instance, once the participant has completed a plurality of quests, he or she may move on to an adventure. As another example, once the participant has purchased additional items and/or passes in combination with or in place of completing at least one quest, the participant may move on to an adventure.

Figure 34D:
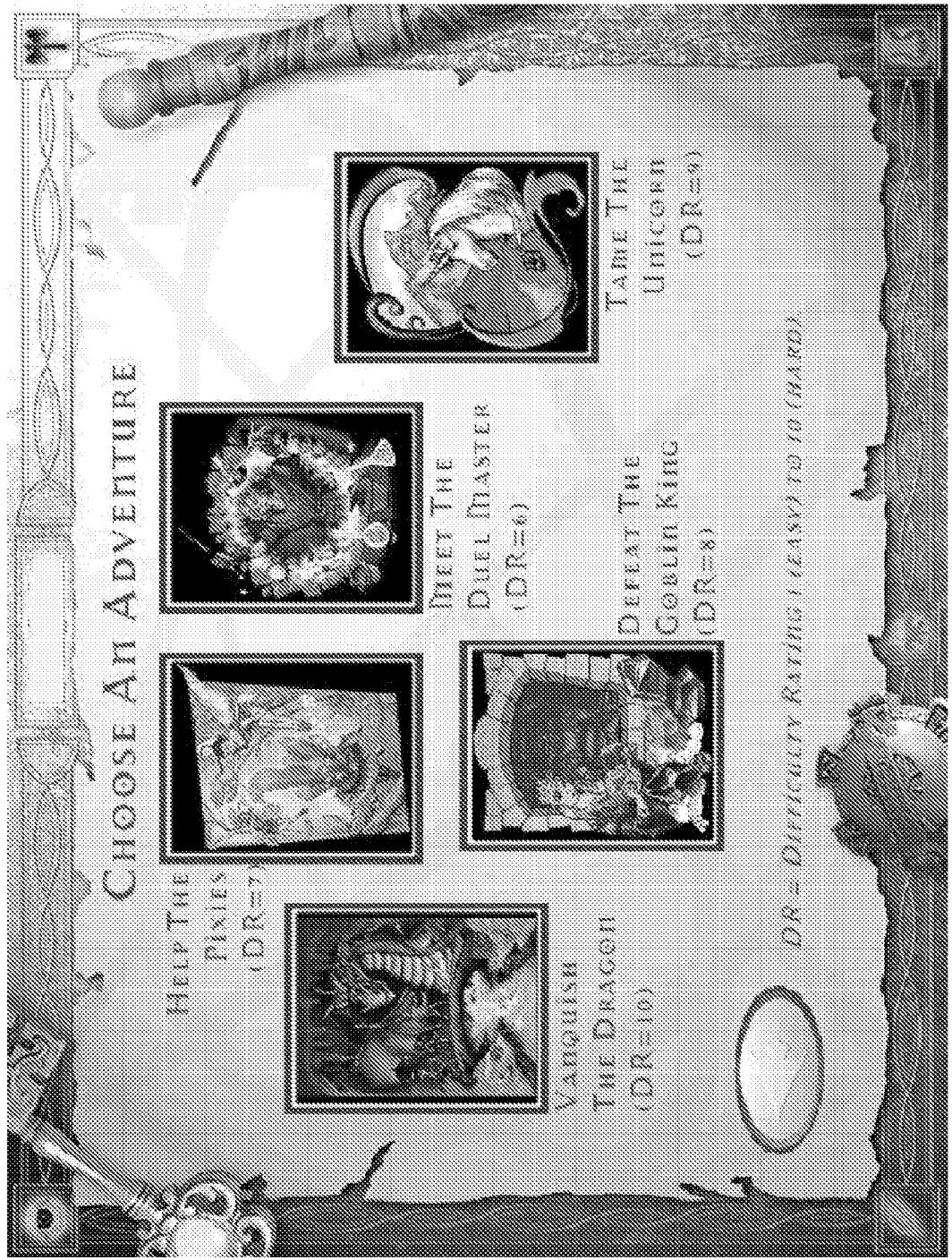

In certain embodiments, an adventure is a story within the interactive game 600 in which a participant may interact. For example, an adventure may comprise: battling a Goblin King; taming a Unicorn; assisting Pixies; meeting with the Duel Master, dueling the Dragon; and combinations of the same or the like. An example screen shot 675 for providing the participant with adventure selections is illustrated in FIG. 34D. An adventure may begin in a manner similar to a quest, wherein the participant selects from a screen a particular adventure. The QuestMaster may then deliver to the participant a story about a problem in the kingdom and the first task that must be accomplished by the participant to solve the problem. As one example, the problem may be that Dungeon Goblins have stolen a Princess's jewels. The participant may then need to battle the Goblin King to obtain the jewels and return them to the Princess.

In certain embodiments, the participant is required to complete a plurality of tasks or steps prior to completing the adventure. For instance, the participant may be required to complete one task before being informed as to the subsequent task. As one example, the participant may need to light torches, open a gate, distract a guard, battle the Goblin King, find the jewels scattered around the dungeon, and then return the jewels to the Princess.

In certain embodiments, in order to successfully complete each step of an Adventure, the participant must have acquired one or more particular runes during the quest layer. For example, to open the gate, a participant may need a Portal Rune. To distract the guard, the participant may need a Distraction Rune. To battle the Goblin King, the participant may need the Lightning Rune. As can be seen, a participant may complete an adventure only after he or she has completed particular quests.

Figure 34E:

In certain embodiments, each adventure advantageously includes an ending in which, once the adventure has been completed, a game character gives the participant a virtual magic item. FIG. 34E illustrates an exemplary screen shot 680 that depicts various awards for completing certain adventures. In certain embodiments, the virtual magic item gives the participant more power and/or ability to progress in the interactive game 600. Furthermore, the virtual magic item may also be purchased in the retail store, such as during either of the retail phases illustrated by Blocks 602 and 610. In yet other embodiments, if the participant has both purchased and earned the virtual magic item, the participant may be awarded with certain enhanced power that may be used during the interactive game 600, such as at a dueling station.

With reference to FIG. 33, the interactive game 600 may comprise a subsequent level to the adventures layer. As shown, the adventures layer may serve as a platform to a competition layer (Block 636). For instance, once the participant has completed one or more adventures, he or she may advance to the competition layer to compete with one or more other game participants. As another example, once the participant has purchased additional items and/or passes in combination with or in place of completing at least one adventure, the participant may move on to the competition layer.

The competition layer will be described hereinafter with respect to a dueling competition, wherein at least two players face off against each other by casting certain spells and using powers that they have acquired during their quests and adventures. That is, the power and/or strength of each duel participant depends on the progress of the participant in one or more other activities (for example, quests, adventures). Of course, other types of competitive games may be used during the competition layer, as will be readily apparent from the disclosure herein.

In certain embodiments, the dueling competition utilizes dueling stations that are set up as an interactive arcade-type game. The dueling stations may be located in or near the gaming area used for the quests and/or adventures, or the dueling stations may be at a remote location. For instance, the dueling stations may be located at a fast food restaurant or another recreational facility or online.

Figure 35:
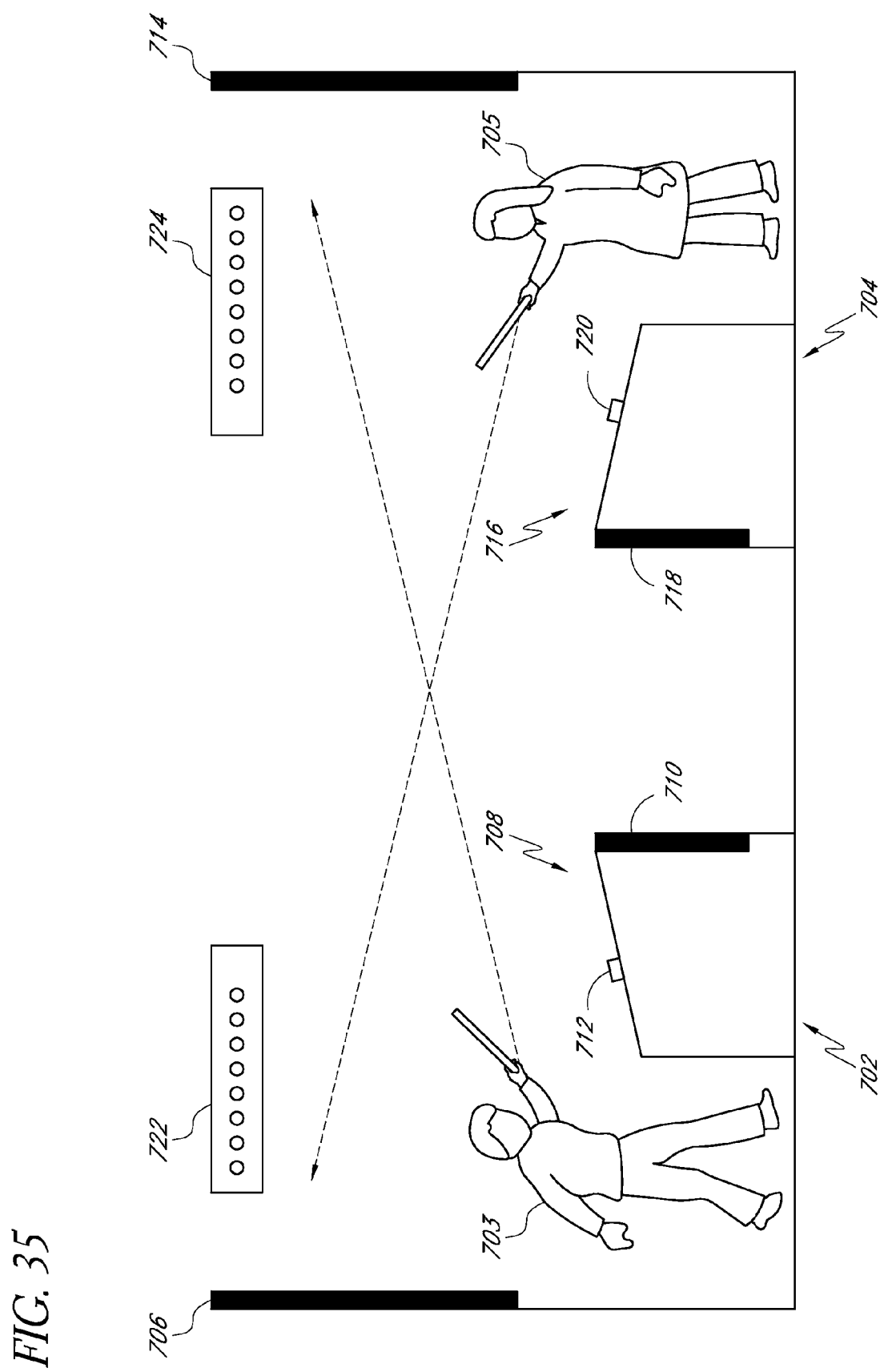
FIG. 35 illustrates dueling stations according to certain embodiments of the invention.

FIG. 35 illustrates an exemplary embodiment of dueling stations usable in the competition layer. In particular, a first dueling station 702 is used by a first participant 703 and is set up opposite a second dueling station 704 (for example, at a distance approximately twelve feet apart) usable by a second participant 705. The first dueling station 702 further includes a first rear display 706 and a first console 708, which further includes a first front display 710 and a first sensor 712. The second dueling station 704 includes a second rear display 714 and a second console 716, which further includes a second front display 718 and a second sensor 720. For example, in certain embodiments, each of the rear displays 706 and 714 comprises a projection screen, and each of the front displays 710 and 718 comprises a video monitor (for example, a 25-inch to 30-inch monitor).

The first participant 703 is advantageously positioned to view both the second rear display 714 and the second front display 718. In certain embodiments, the second rear display 714 shows the spells (such as, for example, attack, shield and/or heal spells) cast by the second participant 705 during the duel. The second front display 718 shows the spells cast by the first participant 703 during the duel. In situations where multiple spells are cast at the same time by a single participant, the attack graphic may appear first, followed by the shield or heal graphic.

The first dueling station 702 may also include a first "mana" pole 722 that displays the current power of the first participant 703. For instance, the first mana pole 722 may include a plurality of lights (for example, eight lights) that are initially lit up at the beginning of the duel and that successively turn off as the first participant 703 loses powers. When all the lights of the mana pole 722 turn off, the first participant is out of power and is defeated. In certain embodiments, each of the lights represents ten mana/points (for example, for a total of eighty mana/points).

The second participant 705 is advantageously positioned to view both the first rear display 706 and the first front display 710. The first rear display 706 shows the spells cast by the first participant 703 during the duel. The first front display 710 shows the spells cast by the second participant 705 during the duel. The second dueling station 704 also includes a second "mana" pole 724 that displays the current power of the second participant 705.

In certain embodiments, the dueling stations 702, 704 may also include a plurality of special effect devices to enhance the dueling experience. For instance, either or both of the dueling stations 702 and 704 may include at least one fan to simulate "wind," a heating element to simulate "fire," a vibratable floor, a fog machine, multi-colored overhead lights (for example, bright white, red, blue and/or purple lights), an integrated sound system (for example, with speakers at the base of the dueling station), and combinations of the same and the like.

In certain embodiments, the sensors 712, 720 comprise illumination devices and detect "spells" cast by the participants 703, 705, respectively, maneuvering their magic wands. For instance, the sensors 712, 720 may detect at least two different qualities of spells (for example, low quality and high quality), each of which results in a different effect. In certain embodiments, the low level spell is equal to the lowest level of mana (for example, ten mana/points). For instance, a participant who casts a low-level spell may cause damage of ten mana/points to his or her opponent, while a participant who casts a high-level spell may inflict damage of twenty or thirty mana/points.

In certain embodiments, the duel between the first participant 703 and the second participant 705 begins when each of the participants hovers his or her wand about the sensors 712, 720, respectively. Each of the front displays 710 and 718 then shows symbols representing the plurality a spells for use in dueling. Furthermore, the front displays 710, 718 may highlight the spells that have been earned by the particular play participant for use in the current duel. In certain embodiments, each participant is given fire (basic attack) and shield (basic defend) spells. Each attack spell is capable of damaging the opposing participant's mana. Once one participant's mana is depleted, the other participant wins. In certain embodiments, the successful participant also earns gold and/or powers to be added to his or her interactive game profile.

The dueling competition takes place with each of the participants casting a spell with his or her magic wand. Depending on the type and quality of each spell cast, either or both of the participants may lose or gain mana. For exemplary purposes, a list and brief description of spells available for certain embodiments of the invention are detailed below. The graphics discussed may appear on either or both of the rear displays 706, 714 and front displays 710 and 718. The special physical effects may be provided by one of the special effect devices detailed above, and the sound may be generated by the integrated sound system.

I. Standard Dueling Spells (unlimited use, can be repeated):

A. Fire (All Magi):
  1. Result: Fire Level 1-2 causes 10-20 mana damage; Fire Level 3+ causes 20-30 mana damage.
  2. Graphics: Fireball appears on rear display and gets larger and larger. At the end, a number appears in the center corresponding to the level of damage just taken (for example, −10, −20 or −30 mana).
  3. Physical Effect: Heat.
  4. Sound: Burning embers get louder and louder.

B. Shield (All Magi):
  1. Result: Shield Level 1-2 blocks 10-20 mana damage; Shield Level 3+ blocks 20-30 mana damage.
  2. Graphics: A medieval shield appears on screen, after which two swords appear one at a time to form an "X" pattern; A number then appears corresponding to the level of shielding just cast.
  3. Physical Effect: Fog and white light.
  4. Sound: Metal on metal (for example, "clang" sound).

C. The Fizzle (All Magi):
  1. Result: No effect on mana; Result of a poorly or improperly cast spell.
  2. Graphics: A small burst of colors moving in random directions.
  3. Sound: Winding down.

II. Clan Spells (may be used every other cast, cannot cast the same spell twice in a row, can cast two different clan spells in a row):

A. Lightning (Warrior Clan):
  1. Result: Lightning Level 1-2 causes 20-30 mana damage; Lightning Level 3+ causes 30-40 mana damage.

2. Graphics: Rumbling clouds with lighting flashes, and the amount of damage (for example, a number from −20 to −40) appears on the screen.
3. Physical Effect: Strobe lights and shake floor.
4. Sound: Thunder and lighting.

B. Summon Creature (Woodsy Clan):
1. Result: Summon Level 1-2 causes 10 mana damage and blocks 10 mana damage; Summon Level 3+ causes 20-30 mana Damage and blocks 20-30 mana damage.
2. Graphics: A small winged pixie appears behind the caster with a tiny wand in her hand. She waves her wand and an explosion of sparks and magical colors comes out of the wand growing bigger and bigger like the fireball, until it "explodes." The numbers −10/+10 or −20/+20 appear at the end.
3. Physical Effects: Colored lights, strobe lights, wind and/or shake floor.
4. Sound: Tinkling fairy effects culminating in small explosion.

C. Play Music (Trixster Clan):
1. Result: Caster is able to first see opponent's spell and then has a delay period (for example, three seconds) to cast his or her own counter spell.
2. Graphics: Swirling music notes and colors.
3. Physical Effect: Fog and multiple colored lights flashing on and off; Light movement of the floor.
4. Sound: Intense, up-tempo.

D. Distract (Shadow Clan):
1. Result: Opponent loses next turn.
2. Graphics: Shadow and darkness swirl onto the screen; Ending with phrase "Lose next turn."
3. Physical Effect: Fog and purple light; Opponent's screen turns black.
4. Sound: Ominous, dark music.

E. Heal (Majestic Clan):
1. Result: Heal Level 1-2 restores 10-20 mana; Heal Level 3+: restores 20-30 mana.
2. Graphics: A heart in the middle of swirling magical stars that beats and gets bigger depending on the level. Inside the heart are the numbers "+20" or "+30."
3. Physical Effect: Fog and sparkling red lights.
4. Sound: Angels' choir, heavenly music.

III. Advanced Adventure Spells (Each spell may be cast once per duel until certain level, then each can be cast twice per duel.):

A. The Crystal Ring:
1. Result: Summons the Pixie; Restores all mana of the caster and deflects any damage that turn; If the Magi has purchased the Ring, it also does 10-30 damage to the opponent.
2. Graphics: The Pixie from the quest appears on the screen of the caster, flies around, then stops, hovers over and looks down at the caster, waves her wand creating a magical swirling of stars that flows down over the caster. The word "Restored" then appears.
3. Physical Effect: Wind and twinkling lights.
4. Sound: Pixie soundtrack combined with angels' choir.

B. Stone of Galdor:
1. Result: Unleashes the power of the Ancient Winds; Causes 30 mana damage and counters and destroys any summoned creature; If the Magi has purchased the Ancient Winds brace, the spell causes an additional 10-20 mana damage for a total of 40-50 damage.
2. Graphics: Swirling colors and sparkles that twirl faster and faster then sweep or blow off the screen ending with the number "−30."
3. Physical Effect: A blast of wind from the caster sweeps across the stage from behind the caster onto the opposing player.
4. Sound: Gathering and blowing winds.

C. Rune of Andover:
1. Result: Reverses the effect of the opponent's spell; If opponent's spell was an attack spell, the spell hits the opponent; If the opponent's spell was a heal or shield spell, the spell affects the caster; If the opponent's spell was a distract spell, the caster is distracted; If the Magi has purchased the Rune of Andover, the effect of the reflected spell is doubled (i.e., damage and/or healing is doubled).
2. Graphics: A rippling pool of water; A stone dropped into the water to cause concentric rings spreading out.
3. Physical Effect: Fog and red lights.
4. Sound: A magical "boingggggg!"

D. Medal of Baldor:
1. Result: Takes away one spell from the opponent for the duration of the duel (for example, the spell may be chosen at random by the computer); If the Magi has purchased the Medal, the spell takes away two spells.
2. Graphics: Flashing colors amid graphics for all the spells swirling around; the graphics are then drawn away to a single point.
3. Physical Effect: Fog and colored lights randomly flashing.
4. Sound: Swirling mechanical winds, ending in a "pop!"

E. The Rune of Dragons
1. Result: Causes 50 mana damage; If the Magi has purchased the Rune, the spell causes another 10-20 mana damage for 60-70 total damage.
2. Graphics: Dragon animation with sweeping fire ending in "−50" thru "−70."
3. Physical Effect: Heat, wind, red lights and floor shaker.
4. Sound: Dragons roar and sound of fire breath.

To illustrate how a dueling competition may take place, the following example of a competition between beginners Harry and Wanda is described.

After playing MagiQuest for about an hour, Harry and Wanda have decided they want to duel with their newly earned spells. They watch the other kids for a while to see how the game is played, and then they hover over the challenge station that automatically enters their names in the virtual queuing system. Harry and Wanda are informed that the dueling station will be available for them in about 15 minutes. They must return in 12 minutes or less and hover again to keep their place in the virtual "line" and then to get in the real line.

Relieved that they do not have to wait in line all day, Harry and Wanda head out to retail area to see what they might be able to talk their parents into buying. After 10 minutes, they return and hover again (re-registering), and the virtual guide tells them to stand on position number 3. As they wait at their positions, they review various graphic boards that look like ancient scrolls giving them graphic instructions and hints on playing the game. As the current duelists finish their game, the automatic gates open and a sign flashes that the Duel Master is now ready to receive players standing on the number 3 position, queuing Harry and Wanda to enter the arena.

They each step onto a platform that is dark, but when they hover their wand, large video screens above and behind them turn on, and various rune markings light up around the top of the console. Harry has 4 runes that light up: Fire, Shield, Lightning and the Dragon Belt. Wanda has five runes: Fire, Shield, Distract, Heal and the Stone of Galdor.

A booming voice welcomes them with a greeting, tells them that they have 80 mana each. The booming voice says, "Let the duel begin!" The screen behind each player erupts in a magical display of effects, after which five crystals appear on the screen: two red, two yellow, and one green. The crystals light up in quick sequence, from red to green, and as soon as the green crystal is lit, the players can hover and cast.

Harry quickly hovers his wand over the Fireball Rune then gives his wand a whip towards Wanda. Wanda simultaneously hovers over the Distract Rune and whips her wand towards Harry. Instantly, the fireball appears over Wanda's head, and a shadow of darkness creeps over the screen above Harry's head. Both can see the result of their casts on the screen behind their opponent. They can also see their opponent's spell on the monitor on the front of their opponent's station.

Harry's fireball "hits" Wanda and her mana pole drops by one light. Harry takes no damage, but is disappointed to see the shadow because he knows that the shadow signifies that Harry will lose his next turn. All the lights on Harry's console go out.

A big grin comes over Wanda's face as she realizes her brother can not do anything during his next turn. As the screen counts down, she scans her choices to select the most deadly spell. As soon as the green crystal is lit, she hovers over the Stone of Galdor and casts the power of the Ancient Winds. As Harry stands dejectedly with his hands at his side, swirling colors appear on the screen behind him and rush of wind blows over him. The screen behind him and in front of Wanda says "−5" in a swirl of colors because Wanda had bought the Stone at the store just minutes before the duel. She holds the Stone up, and shows it to Harry with a smirk.

Harry's mana pole now has just three lights lit. Wanda's pole still has seven lights.

Immediately, the lights of Harry's console light back up, and the crystal countdown begins again. Harry hovers over his most powerful spell, the Belt of Dragons. Sensing what is coming, Wanda hovers over her heal spell. They both cast their spells when the crystal turns green.

A fiery dragon appears over Wanda's head as a flush of heat blows over her. "−70" appears on the screen as Harry points to the Dragon Belt around his waist and smiles at Wanda. Soon the Dragon behind her disappears to be replaced by a beating heart in the midst of swirling colors with a "+2" in the center of it. Wanda loses seven lights, but two of the quickly return. She now has just two lights remaining. Harry has three lights.

The Dragon Belt and Rune Stone of Galdor spells are now dark and cannot be used anymore during the duel.

Wanda knows she is in trouble. She did not come into the duel with enough attack spells, so her only chance at winning is to heal herself back up before time runs out. As the crystals count down, Wanda hovers and casts the heal spell again. Unfortunately, she forgot that the same clan spell cannot be used twice in a row, so her spell fizzles with a splash of exploding sparkles on the screen accompanied by a winding down sound.

Harry knows that the right spell will finish his sister off, so he hovers over his lightning spell and casts. Bolts of lightning explode behind Wanda, a booming sound rumbles over her podium and the floor shakes beneath her. "−30" is displayed on the screen, and Wanda's mana pole drops to nothing. Harry's remains at three lights.

Both screens display "Congratulations Magi Harry. You have won the Duel. You have earned 100 experience points and 50 gold coins!" Both Harry and Wanda leave the dueling area thru the exit space as the screen announces, "Players #4, prepare to Duel." Johnny and Sally step thru the entry and onto the dueling stations.

Wanda is already scheming her revenge. She knows she needs more attack spells and vows to defeat the dragon to earn that belt. Harry returns to the retail area to see if there is anything else he can buy to surprise his sister next time. He loved the frustrated look on her face when he showed up with that Dragon Belt last time!

Although the dueling competition has been described with reference to particular embodiments, a wide variety of alternative systems and/or devices may be used For instance, one or more of the dueling stations may include a scoreboard that displays the current state of the duel, the names of the highest scoring players for the day, and/or current events relating to the gaming area.

Also, as will be recognized from the disclosure herein, additional layers may be added to the interactive game 600 as appropriate. For instance, the game 600 may further include an Expeditions layer, wherein the participant is required to complete one or more adventures and/or make certain purchases in order to participate an expedition. In addition, the competition layer may be implemented before of after different layers and/or may be integrated into the layers. Moreover, retail layers may be integrated into the training and interactive entertainment layers. For example, there may be certain basic effects, quests, adventures, or competitions that cannot be completed without a certain retail purchase, and/or the participant's strength or power may be increased during the levels based on certain retail purchases.

Furthermore, although the interactive game 600 has been described with reference to particular embodiments, devices other than a wand may be used. For example, the interactive game 600 may use cards with magnetic strips, a device with an embedded RFID reader or other like electronic tag or device that stores and/or outputs a readable signal. In certain embodiments, the participant may be further associated with a compass that tracks the location of the participant and/or allows others to locate or send messages to the participant (for example, a parent contacting his or her child in the game area).

The interactive game 600 may also be performed in a plurality of locations. For instance, the adventure layer represented by Block 636 of FIG. 33 may be performed in a location different than the location of the quests layer (Block 626) and/or the competition layer (Block 646).

In addition, although the interactive game 600 is explained herein with reference to a magical-themed environment, the interactive game 600 may adapted to, but not restricted to the following themes: space, pirates, dinosaurs, time travel, Tom Sawyer, Nickelodeon, Looney Tunes, Haunted Houses, and the like. For instance, the following provides and example of a racing themed, interlinked games wherein progress within one game and/or retail purchases effect the progress and/or advancement in a second linked game.

Interlinked Games

In certain embodiments, the systems and methods disclosed herein may provide interlinked games such that as a participant earns points, levels, strengths, and the like by playing one game, those earnings affect how the participant advances to or progresses in a second game.

For example, imagine that Joshua plays a first car racing game and reaches Level 5 of 10 which places him at "expert level driver" with "turbo boost" strength and "ten extra spare tires." Joshua then goes to play a second car racing game that is "linked" to the first car racing game. The second car racing game recognizes Joshua, his Level 5 status of "expert level driver," his turbo boost strength and ten extra spare tires. Thus, when Joshua starts to play the second car racing game, he starts at the equivalent of Level 5 and is able to use his turbo boost strength and ten extra spare tires.

Joshua then wants to earn rocket fuel, and he discovers that in order to have rocket fuel for playing the first car racing game and/or the second car racing game, he has to compete and place in the top three in a multiple-participant car racing game. If Joshua does so, he will earn rocket fuel and be able to use that fuel when he goes back to play the first car racing game and/or the second car racing game.

In addition, if Joshua wants to earn the "extreme exhaust system" for his car, then he has to purchase at least five HAPPY MEALS® at MCDONALD'S® and correctly answer twenty questions in an online quiz. Once he enters his receipt codes for his five HAPPY MEALS®, and enters the correct answers on the quiz, Joshua's status is updated to include the "extreme exhaust system." When he goes back to play the first car racing game and/or the second car racing game, the games will recognize that he has earned the extreme exhaust system.

Next, Joshua wants to obtain a "fire retardant driving jacket" to make him more likely to survive a crash in the first car racing game and/or the second car racing game. Joshua then goes to the local GYMBOREE® and purchases a particular jacket. With the particular jacket comes a special code that Joshua enters online to obtain the "fire retardant driving jacket." When Joshua returns to play the first car racing game and/or the second car racing game, the games will recognize that he has the fire retardant driving jacket. Thus, if Joshua crashes during the game, his character may survive the crash, whereas the game may end for another participant who did not get the fire retardant driving jacket.

While a car racing example has been used, it is recognized that the interlinked game system may be used in a variety of environments and may include participation in several different areas, including gaming, food service, clothing, toys, libraries, doctors, dentists, restaurants, and the like. In addition, a variety of different games could be interlinked including virtual and physical games and challenges.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A toy wand for use in an interactive play environment, the toy wand comprising:

an elongated body having a substantially tubular shape and distal and proximal ends, said elongated body substantially enclosing an internal cavity positioned along an axis extending through said distal and proximal ends;

a first tilt sensor and a second tilt sensor disposed within said internal cavity of said elongated body, said first and second tilt sensors being arranged in substantially opposing orientations such that at least one of said first and second tilt sensors is in an inactive state whenever said elongated body is in a substantially static position and such that a first particular motion of said elongated body causes or enables each of said first and second tilt sensors to be in an active state at least momentarily during a duration of said first particular motion;

a memory configured to store a unique identification associated with the toy wand; and a wireless transmitter electrically coupled to said first and second tilt sensors and to said memory and located within said elongated housing, said wireless transmitter being configured to transmit a first wireless signal in response to said first motion of said elongated body to one or more reader devices disposed within an interactive play environment to activate one or more play effects, said first wireless signal further comprising data indicative of said unique identification.

2. The toy wand of claim 1, wherein said first and second tilt sensors comprise, respectively, first and second ball switches.

3. The toy wand of claim 2, wherein said first and second ball switches are oriented in a transverse plane comprising said axis of said elongated body.

4. The toy wand of claim 2, wherein said first and second ball switches are separated by a distance of between approximately 8 and 12 centimeters along said axis of said elongated body.

5. The toy wand of claim 1, further comprising a microprocessor electrically coupled between said wireless transmitter and said first and second tilt sensors and, said microprocessor being configured to detect the states of said first and second tilt sensors and, in response to said detection, control transmissions by said wireless transmitter.

6. The toy wand of claim 5, wherein said microprocessor is further configured to determine a period of time during which said first and second tilt sensors are both in an active state.

7. The toy wand of claim 6, wherein said microprocessor causes said wireless transmitter to transmit a specific value in said first wireless signal indicative of a length of said period of time during which said first and second tilt sensors are both in an active state.

8. The toy wand of claim 7, further comprising a lookup table that associates a plurality of values with a plurality of lengths of time, wherein said microprocessor is configured to access said lookup table to determine said specific value for said first wireless signal.

9. The toy wand of claim 5, wherein said first and second tilt sensors are connected in series to an input of said microprocessor such that an open circuit is created when at least one of said first and second tilt sensors is in an inactive state.

10. The toy wand of claim 1, further comprising a third sensor configured to detect a second motion of said elongated body, wherein said second motion is different than said first motion, and wherein said wireless transmitter is configured to transmit a second wireless signal in response to said second motion, wherein said second wireless signal is different than said first wireless signal.

11. The toy wand of claim 10, wherein said first motion includes imparting different transient acceleration forces on said distal and proximal ends of said elongated body.

12. The toy wand of claim 1, further comprising a timer for measuring a duration in which both said first and second tilt sensors are in an active state.

13. The toy wand of claim 1, wherein said first and second tilt sensors are spaced apart from one another by between approximately 3 centimeters and approximately 12 centimeters.

14. The toy wand of claim 1, wherein said first and second tilt sensors are spaced apart from one another by between approximately 3 centimeters and approximately 8 centimeters.

15. The toy wand of claim 1, wherein said first and second tilt sensors are spaced apart from one another by between approximately 8 centimeters and approximately 12 centimeters.

16. A toy wand for use in an interactive play environment, the toy wand comprising:
an elongated housing having distal and proximal ends and an axis extending therethrough;
a first tilt sensor and a second tilt sensor substantially enclosed within said elongated housing, each of said first and second tilt sensors being arranged in substantially opposing orientations such that at least one of said first and second tilt sensors is an off state whenever said elongated housing is in a substantially static position and such that one or more particular motions of said elongated housing causes or enables both of said first and second tilt sensors to be in an on state at least momentarily during a duration of said one or more particular motions;
a wireless transceiver located proximate said distal end of said elongated housing;
a memory that stores a unique identifier; and
a microprocessor electrically coupled to said first and second tilt sensors and to said wireless transceiver, said microprocessor being configured to instruct said wireless transceiver to transmit a first wireless signal in response to said one or more particular motions of said elongated housing, said first wireless signal further comprising data indicative of said unique identifier.

17. The toy wand of claim 16, wherein said one or more particular motions comprises substantially circular movement of said distal end about the axis of said elongated housing.

18. The toy wand of claim 16, wherein said wireless transceiver comprises a radio frequency (RF) transceiver.

19. The toy wand of claim 18, wherein said memory comprises an RF identification (RFID) tag.

20. The toy wand of claim 16, wherein said wireless transceiver is configured to receive data indicative of a progress of a user of said toy wand in an interactive game.

21. The toy wand of claim 20, wherein said memory is configured to store said data indicative of said user progress.

22. The toy wand of claim 16, further comprising a switch module for detecting radial acceleration of at least a portion of said elongated housing.

23. The toy wand of claim 16, further comprising a timer for measuring a duration in which both said first and second tilt sensors are in an on state.

24. A motion-sensitive input device for use in an interactive play environment comprising a live-action game, a computer game, a video game or a home gaming console, the input device comprising:
a base component comprising an elongated body having distal and proximal ends, said elongated body substantially enclosing an internal cavity positioned along an axis extending through said distal and proximal ends, said base component further comprising:
a first arrangement of one or more sensors disposed within said internal cavity of said elongated body, said first arrangement of one or more sensors being arranged so as to generate a first input signal responsive to at least a first motion of said elongated body,
a memory configured to store: (i) a unique identification associated with the input device, and (ii) selected information identifying or describing certain powers, abilities or attributes associated with a user of said input device and/or an imaginary character created by the user of said input device,
an internal transmitter electrically coupled to said first arrangement of sensors, said internal transmitter being configured to transmit a first wireless signal containing information based at least in part on said first motion of said elongated body to one or more external receiver devices to activate or control one or more play effects, said first wireless signal further comprising data indicative of said unique identification, and
an internal receiver capable of wireless communication with one or more external transmitter devices, said internal receiver being configured to receive from said one or more external transmitter devices a data signal containing information relevant to a game played by the user of said input device and/or information relevant to the imaginary character created by the user; and
at least one auxiliary component configured and adapted to modularly attach to said base component, said at least one auxiliary component comprising a second arrangement of one or more sensors, said second arrangement of one or more sensors being arranged so as to generate a second input signal responsive to at least a second motion of said at least one auxiliary component, wherein said second motion is different than said first motion and said second input signal is different than said first input signal, and wherein said internal transmitter is further configured to transmit a second wireless signal containing information based at least in part on said first and second motions when said at least one auxiliary component is assembled with said base component,
wherein said base component is further sized, configured and adapted to enable the user to hold and manipulate said base component by moving, shaking, twisting, waving or pointing said base component in a particular manner to control or activate said one or more play effects, and wherein said base component is further configured and adapted to modularly attach to the at least one auxiliary component for thereby allowing a user to selectively create a modified input device having enhanced powers, abilities or aesthetics.

25. The input device of claim 24, wherein said at least one auxiliary component comprises a handle configured and adapted to modularly attach to the proximal end of said base component, said handle being further configured and adapted to be assembled substantially in axial alignment with said housing to thereby extend or lengthen said input device when said handle is modularly attached to said base component.

26. The input device of claim 24, wherein said input device, when modularly assembled, comprises a motion-sensitive toy themed according to a play theme of a particular game played by the user of said input device.

27. The input device of claim 26, wherein said input device, when modularly assembled, comprises at least one of the following motion-sensitive toys: magic wand, sword, staff, scepter, whip, paddle, nun chuck, cricket bat, baseball bat, sporting ball, musical instrument, flute, recorder, drum stick, rope, fishing rod, doll, action figure and stuffed animal.

28. The input device of claim 24, wherein said input device is further configured and adapted to produce light, vibration and/or sound effects in response to said received data signal from said one or more external transmitter devices.

29. The input device of claim 24, wherein said first or second arrangements of one or more sensors comprises at least one or more of the following: impact sensors, micro-sensors, gyro-sensors, force sensors, micro-switches, momentum sensors, gravity sensors, accelerometers, tilt sensors, orientation sensors and reed switches.

30. The input device of claim 24, wherein said second arrangement of one or more sensors is configured and arranged to sense axial rotation of said input device.

31. The input device of claim 24, wherein said memory stores information or attributes identifying or describing powers or abilities possessed by the imaginary character created by the user of said input device.

32. The input device of claim 24, wherein said memory stores information representing one or more purchases made by the user of said input device relevant to a particular game played by the user and/or the imaginary character created by the user.

33. The input device of claim 24, wherein said base component further comprises one or more user-activated switches, and wherein said base component is further sized, configured and adapted to enable the user to hold and manipulate said base component by moving, shaking, twisting, waiving or pointing said base component in a particular manner while simultaneously activating one or more of said user-activated switches to thereby control or activate said one or more play effects.

34. The input device of claim 24, wherein said base component and/or said at least one auxiliary component further comprises a proximity sensor configured or adapted to detect a distance between said input device and an associated transmitter or receiver.

35. The input device of claim 34, wherein said base component and/or said at least one auxiliary component further comprises an alerting device configured or adapted to generate a perceptible signal when said proximity sensor detects a particular distance between said input device and the associated transmitter or receiver that is shorter than a predetermined threshold distance.

36. The input device of claim 24, wherein said base component and/or said at least one auxiliary component further comprises a voice-activation system responsive to particular voice commands of the user of said input device.

37. The input device of claim 24, in combination with a video game system for generating desired play effects comprising one or more computer-generated images displayed on one or more associated computer monitors, TV monitors, DVD display monitors, or gaming consoles, said video game system comprising at least one gaming console configured and adapted to play a game selected by the user and at least one motion-sensitive input device adapted to control or activate said one or more of said desired play effects.

38. The combination of claim 37, further comprising a proximity sensor operatively associated with either said at least one gaming console and/or said at least one input device, said proximity sensor being configured or adapted to detect a distance between said at least one input device and a transmitter or receiver associated with said video game system, and wherein at least one of said play effects cannot be controlled or activated by the user of said at least one input device when the detected distance is greater than a predetermined threshold distance.

39. The input device of claim 24, in combination with one or more additional auxiliary components packaged together as a kit and wherein said base component is further configured and adapted to be modularly and interchangeably assembled with each of said one or more additional auxiliary components for thereby allowing the user to selectively create a modified input device having enhanced powers, abilities or aesthetics.

40. The input device of claim 24, in combination with one or more video games and wherein said input device, when modularly assembled, comprises a motion-sensitive toy themed according to a particular play theme associated with said one or more video games.

41. The combination of claim 40, wherein said input device, when modularly assembled, comprises one or more of the following motion-sensitive toys: magic wand, sword, staff, scepter, whip, paddle, nun chuck, cricket bat, baseball bat, sporting ball, musical instrument, flute, recorder, drum stick, rope, fishing rod, doll, action figure and stuffed animal.

42. A motion-sensitive wand for selectively controlling or activating one or more desired effects, said wand comprising:

an elongated body having a substantially tubular shape and distal and proximal ends, said elongated body substantially enclosing an internal cavity positioned along a central axis extending through said distal and proximal ends;

an arrangement of one or more sensors disposed within said internal cavity of said elongated body, said arrangement of one or more sensors being configured and arranged to generate a first input signal responsive to at least a first motion or orientation of said elongated body and a second input signal responsive to at least a second motion or orientation of said elongated body, wherein said first motion or orientation is different than said second motion or orientation, and wherein at least one of said first or second motions or orientations comprises axial rotation or angular orientation of said elongated body relative to said central axis of said elongated body;

a microprocessor electrically coupled to said arrangement of one or more sensors, said microprocessor being configured to receive said first and second input signals and to provide an output signal based at least in part on said first or second input signals;

a programmable memory electrically coupled to said microprocessor to store certain information relevant to one or more desired effects;

an internal transmitter located within said elongated housing and electrically coupled to said microprocessor, said internal transmitter being configured to receive said output signal from said microprocessor and to transmit a wireless command signal to one or more external receivers for activating or controlling said one or more desired effects, said wireless command signal containing information based at least in part on (i) said first or second motions or orientations of said elongated body and (ii) said information stored in said programmable memory relevant to said one or more desired effects; and an internal receiver capable of wireless communication with one or more external transmitters, said internal receiver being configured to receive from said one or more external transmitters a data signal containing information relevant to said one or more desired effects, wherein said wand is sized, configured and adapted to enable a user thereof to hold and manipulate said wand by moving, shaking, twisting, waving or pointing said wand in a particular manner to control or activate said one or more desired effects, and wherein said wand is further adapted to be programmed by the user to selectively respond to multiple unique wand manipulations and/or combinations of wand manipulations to selectively control or activate said one or more desired effects.

43. The motion-sensitive wand of claim 42, wherein said wand is further configured and adapted to produce light, vibration and/or sound effects in response to said received data signal.

44. The motion-sensitive wand of claim 42, wherein said arrangement of one or more sensors comprises at least one or more of the following: impact sensors, micro-sensors, gyro-sensors, force sensors, micro-switches, momentum sensors, gravity sensors, accelerometers, tilt sensors, orientation sensors and reed switches.

45. The motion-sensitive wand of claim 42, wherein said programmable memory is adapted to store therein a unique identification associated with said wand.

46. The motion-sensitive wand of claim 42, wherein said programmable memory has stored therein certain information representing one or more purchases made by the user of said wand.

47. The motion-sensitive wand of claim 42, wherein said wand further comprises one or more user-activated switches, and wherein said elongated body is further sized, configured and adapted to enable the user to hold and manipulate said elongated body by moving, shaking, twisting, waving or pointing the elongated body in a particular manner while simultaneously activating one or more of said user-activated switches to thereby control or activate said one or more desired effects.

48. The motion-sensitive wand of claim 42, further comprising a voice-activation system responsive to particular voice commands of the user of said wand.

49. The motion-sensitive wand of claim 42, in combination with a gaming system for generating desired effects comprising one or more computer-generated images displayed on one or more associated computer monitors, television monitors, DVD display monitors, or gaming consoles, said gaming system comprising at least one gaming console configured and adapted to play a game selected by the user and at least one motion-sensitive wand adapted to control or activate said one or more of said desired effects.

50. A toy wand for use in an interactive play environment, the toy wand comprising:
- an elongated body having a substantially tubular shape and distal and proximal ends, said elongated body substantially enclosing an internal cavity positioned along an axis extending through said distal and proximal ends;
- a first tilt sensor and a second tilt sensor disposed within said internal cavity of said elongated body, said first and second tilt sensors being arranged such that at least one of said first and second tilt sensors is in an inactive state when said elongated body is in a substantially static position and such that a first motion of said elongated body causes each of said first and second tilt sensors to be in an active state;
- a memory configured to store a unique identification associated with the toy wand;
- a lookup table that associates a plurality of values with a plurality of lengths of time;
- a transmitter electrically coupled to said first and second tilt sensors and to said memory and located proximate to said distal end of said elongated housing, said transmitter being configured to transmit a first wireless signal in response to said first motion of said elongated body to one or more reader devices to activate one or more play effects, said first wireless signal further comprising data indicative of said unique identification; and
- a microprocessor electrically coupled between said transmitter and said first and second tilt sensors, said microprocessor being configured to detect the states of said first and second tilt sensors and, in response to said detection, control transmissions by said transmitter, wherein said microprocessor is further configured to determine a period of time during which said first and second tilt sensors are both in an active state, and wherein said microprocessor causes said transmitter to transmit a specific value in said first wireless signal indicative of a length of said period of time during which said first and second tilt sensors are both in an active state, and wherein said microprocessor is configured to access said lookup table to determine said specific value for said first wireless signal.

51. A toy wand for use in an interactive play environment, the toy wand comprising:
- an elongated body having a substantially tubular shape and distal and proximal ends, said elongated body substantially enclosing an internal cavity positioned along an axis extending through said distal and proximal ends;
- a first tilt sensor and a second tilt sensor disposed within said internal cavity of said elongated body, said first and second tilt sensors being arranged such that at least one of said first and second tilt sensors is in an inactive state when said elongated body is in a substantially static position and such that a first motion of said elongated body causes each of said first and second tilt sensors to be in an active state;
- a third sensor different than said first and second tilt sensors and configured to detect a second motion of said elongated body, wherein said second motion is different than said first motion;
- a memory configured to store a unique identification associated with the toy wand; and
- a transmitter electrically coupled to said first and second tilt sensors and to said memory and located proximate to said distal end of said elongated housing, said transmitter being configured to transmit a first wireless signal in response to said first motion of said elongated body to one or more reader devices to activate one or more play effects, said first wireless signal further comprising data indicative of said unique identification, and wherein said transmitter is configured to transmit a second wireless signal in response to said second motion, wherein said second wireless signal is different than said first wireless signal.

52. The toy wand of claim 51, wherein the third sensor comprises one or more of the following: impact sensor, micro-sensor, gyro-sensor, force sensor, micro-switch, momentum sensor, gravity sensor, accelerometer, orientation sensor and reed switch.

53. The toy wand of claim 52, wherein said first motion includes imparting different transient acceleration forces on said distal and proximal ends of said elongated body.

* * * * *